US012752251B2

(12) United States Patent
Staufcik et al.

(10) Patent No.: US 12,752,251 B2
(45) Date of Patent: Oct. 6, 2026

(54) GAS-LIQUID CONTACTOR WITH PACKING FOR CAPTURING CARBON DIOXIDE

(71) Applicant: Carbon Engineering ULC, Squamish (CA)

(72) Inventors: Radek Staufcik, Squamish (CA); Andrew Logan Ostericher, Squamish (CA); Maxwell Douglas Horner, Squamish (CA); Douglas Edward Olmstead, Squamish (CA); Todd Ernest Wilke, West Vancouver (CA); David St. Angelo, Squamish (CA)

(73) Assignee: Carbon Engineering ULC, Squamish (CA)

( * ) Notice: Subject to any disclaimer, the term of this patent is extended or adjusted under 35 U.S.C. 154(b) by 718 days.

(21) Appl. No.: 17/742,334

(22) Filed: May 11, 2022

(65) Prior Publication Data

US 2022/0362737 A1 Nov. 17, 2022

Related U.S. Application Data

(60) Provisional application No. 63/187,089, filed on May 11, 2021.

(51) Int. Cl.

| | |
|---|---|
| ***B01J 19/32*** | (2006.01) |
| ***B01D 53/14*** | (2006.01) |
| ***B01D 53/18*** | (2006.01) |

(52) U.S. Cl.

CPC .......... *B01J 19/32* (2013.01); *B01D 53/1475* (2013.01); *B01D 53/18* (2013.01);

(Continued)

(58) Field of Classification Search

CPC ................ B01J 19/32; B01J 2219/3221; B01J 2219/32237; B01J 2219/32286;

(Continued)

(56) References Cited

U.S. PATENT DOCUMENTS

| | | | | |
|---|---|---|---|---|
| 2,562,827 A | | 7/1951 | Simpson | |
| 2,809,818 A | * | 10/1957 | Georg | F28F 25/06 261/24 |

(Continued)

FOREIGN PATENT DOCUMENTS

| | | |
|---|---|---|
| CN | 2148306 | 12/1993 |
| CN | 2270957 | 12/1997 |

(Continued)

OTHER PUBLICATIONS

Holmes et al., "An air-liquid contactor for large-scale capture of CO2 from air," Phil. Trans. R. Soc. A., 2012, 370:4380-4403.

(Continued)

*Primary Examiner* — Qianping He

(74) *Attorney, Agent, or Firm* — Fish & Richardson P.C.

(57) ABSTRACT

A packing for capturing carbon dioxide ($CO_2$) from a dilute includes at least one panel that includes a mesh material configured to be wetted by a $CO_2$ capture solution and that defines a gas channel having a first dimension defined along a first direction and a second dimension defined along a second direction different than the first direction, the gas channel configured to receive a flow of $CO_2$-laden gas from the dilute gas source in the second direction and contact the flow of $CO_2$-laden gas with the $CO_2$ capture solution on the mesh material.

42 Claims, 24 Drawing Sheets

(52) U.S. Cl.
CPC .................. *B01J 2219/3221* (2013.01); *B01J 2219/32237* (2013.01); *B01J 2219/32286* (2013.01); *B01J 2219/32491* (2013.01)

(58) Field of Classification Search
CPC ....... B01J 2219/32491; B01D 53/1475; B01D 53/18; B01D 2257/504; B01D 53/78; B01D 47/14; B01D 53/14; B01D 53/185; B01D 53/62; B01D 3/22; B01D 53/77; Y02C 20/40
USPC ........... 95/211; 261/97, 100, 112.1, DIG. 72; 55/440; 96/356, 189
See application file for complete search history.

(56) References Cited

U.S. PATENT DOCUMENTS

| | | | | |
|---|---|---|---|---|
| 3,363,885 | A | 1/1968 | Meek | |
| 3,738,626 | A | 6/1973 | Norback | |
| 4,022,596 | A | 5/1977 | Pedersen | |
| 4,178,333 | A | 12/1979 | Shepherd | |
| 4,361,426 | A | 11/1982 | Carter et al. | |
| 4,455,339 | A | 6/1984 | Meier | |
| 4,557,878 | A | 12/1985 | Fulkerson | |
| 4,562,015 | A | 12/1985 | Lefevre | |
| 4,781,869 | A | 11/1988 | Wiltz | |
| 4,929,398 | A | 5/1990 | Pedersen | |
| 5,474,832 | A | 12/1995 | Massey | |
| 5,536,454 | A * | 7/1996 | Fujii | B01D 53/185 261/97 |
| 5,653,126 | A | 8/1997 | Harada et al. | |
| 6,119,481 | A | 9/2000 | Sunder | |
| 6,206,350 | B1 | 3/2001 | Harrison et al. | |
| 6,378,332 | B1 | 4/2002 | Billingham et al. | |
| 7,655,069 | B2 | 2/2010 | Wright et al. | |
| 8,973,908 | B2 | 3/2015 | Park | |
| 8,999,279 | B2 | 4/2015 | Wright et al. | |
| 9,095,813 | B2 | 8/2015 | Keith et al. | |
| 9,291,083 | B2 | 3/2016 | Panziera | |
| 10,046,502 | B2 | 8/2018 | Park | |
| 10,953,382 | B2 | 3/2021 | Nieuwoudt et al. | |
| 11,014,064 | B2 | 5/2021 | Clifford et al. | |
| 11,293,705 | B2 | 4/2022 | Kulick, III et al. | |
| 11,305,230 | B1 | 4/2022 | Keshner et al. | |
| 11,369,940 | B2 | 6/2022 | Headley | |
| 11,590,447 | B2 | 2/2023 | Yeganeh et al. | |
| 2001/0051119 | A1 | 12/2001 | Overbeek et al. | |
| 2003/0098515 | A1 | 5/2003 | Smith et al. | |
| 2003/0190461 | A1* | 10/2003 | McKeigue | F25J 3/04678 428/184 |
| 2004/0060769 | A1 | 4/2004 | Hentschel et al. | |
| 2006/0001182 | A1 | 1/2006 | Kinney, Jr. et al. | |
| 2006/0051274 | A1 | 3/2006 | Wright et al. | |
| 2006/0186562 | A1 | 8/2006 | Wright et al. | |
| 2009/0176052 | A1* | 7/2009 | Childs | B01D 71/281 428/101 |
| 2014/0131902 | A1* | 5/2014 | Huang | B01D 53/1475 261/112.1 |
| 2014/0190199 | A1 | 7/2014 | Park | |
| 2014/0326020 | A1 | 11/2014 | Park | |
| 2015/0300231 | A1 | 10/2015 | Panziera | |
| 2016/0121297 | A1 | 5/2016 | Wehrli | |
| 2016/0250564 | A1 | 9/2016 | Thomas | |
| 2018/0207544 | A1* | 7/2018 | Iso | B01D 3/26 |
| 2018/0283744 | A1 | 10/2018 | Pahwa et al. | |
| 2019/0344217 | A1* | 11/2019 | Heidel | B01F 23/20 |
| 2020/0230548 | A1* | 7/2020 | Libert | B01D 53/62 |
| 2021/0101107 | A1 | 4/2021 | Heidel et al. | |
| 2022/0176312 | A1 | 6/2022 | Olmstead | |
| 2022/0178619 | A1 | 6/2022 | Rousselet et al. | |
| 2023/0184495 | A1 | 6/2023 | Rousselet et al. | |

FOREIGN PATENT DOCUMENTS

| | | | |
|---|---|---|---|
| CN | 2408963 | | 12/2000 |
| CN | 101936678 | | 1/2011 |
| CN | 201819580 | | 5/2011 |
| CN | 201999911 | | 10/2011 |
| CN | 202853421 | | 4/2013 |
| CN | 103375998 | | 10/2013 |
| CN | 302937628 | | 9/2014 |
| CN | 104197741 | | 12/2014 |
| CN | 303288615 | | 7/2015 |
| CN | 205332839 | | 6/2016 |
| CN | 205425947 | | 8/2016 |
| CN | 205892755 | | 1/2017 |
| CN | 206469731 | | 9/2017 |
| CN | 206527925 | | 9/2017 |
| CN | 206553295 | | 10/2017 |
| CN | 206683431 | | 11/2017 |
| CN | 206872429 | | 1/2018 |
| CN | 108201785 | | 6/2018 |
| CN | 109399828 | | 3/2019 |
| CN | 208635595 | | 3/2019 |
| CN | 208818028 | | 5/2019 |
| CN | 209013780 | | 6/2019 |
| CN | 209745088 | | 12/2019 |
| CN | 111066640 | | 4/2020 |
| DE | 3346432 | | 6/1984 |
| EP | 0273191 | | 7/1988 |
| EP | 0606964 | | 7/1994 |
| EP | 1004839 | | 5/2000 |
| EP | 3480293 | | 5/2019 |
| FR | 1268649 | | 8/1961 |
| GB | 950448 | | 2/1964 |
| GB | 962984 | | 7/1964 |
| GB | 1202704 | | 8/1970 |
| GB | 1318646 | | 5/1973 |
| GB | 1449872 | | 9/1976 |
| GB | 2402087 | | 12/2004 |
| JP | H11-218397 | | 8/1999 |
| JP | 2018134604 | | 8/2018 |
| JP | 2004351416 | A | 12/2022 |
| WO | WO 2019/204320 | | 10/2019 |
| WO | WO 2020/068143 | | 4/2020 |
| WO | WO 2020/106919 | | 5/2020 |
| WO | WO 2020/113064 | | 6/2020 |
| WO | WO 2020/221116 | | 11/2020 |
| WO | WO 2021/073860 | | 4/2021 |
| WO | WO 2022/225708 | A1 | 10/2022 |
| WO | WO 2024/039656 | | 2/2024 |

OTHER PUBLICATIONS

Kimre [online], "General Company Brochure, 2020 Edition," available on or before Jun. 19, 2021, via Internet Archive: Wayback Machine URL <http://web.archive.org/web/20210619152440/https://www.kimre.com/wp-content/uploads/2019/12/Kimre-Brochure-General-2020-CM.pdf>, retrieve on May 18, 2022, URL <https://www.kimre.com/wp-content/uploads/2019/12/Kimre-Brochure-General-2020-CM.pdf>, 16 pages.

International Search Report and Written Opinion in International Application No. PCT/US2022/028854, dated Aug. 23, 2022, 15 pages.

Indian Patent Appln. No. 0624/CHE/2014, filed on Jan. 29, 2015, 10 pages.

International Preliminary Report on Patentability in International Appln. No. PCT/US2021/062247, mailed on Jun. 22, 2023, 14 pages.

International Preliminary Report on Patentability in International Appln. No. PCT/US2022/052175, mailed Jun. 20, 2024, 13 pages.

International Search Report and Written Opinion in International Appln. No. PCT/US2021/062247, mailed May 25, 2022, 22 pages.

International Search Report and Written Opinion in International Appln. No. PCT/US2022/052175, mailed Apr. 20, 2023, 18 pages.

Invitation to Pay Additional Fees in International Appln. No. PCT/US2021/062247, dated Apr. 4, 2022, 16 pages.

(56) References Cited

OTHER PUBLICATIONS

Thompson et al., "Advancing Post-Combustion CO2 Capture through Increased Mass Transfer and Lower Degradation," The University of Kentucky Research Foundation, Dec. 23, 2022, 1-61.
International Preliminary Report on Patentability in International Application No. PCT/US2022/028854, mailed on Nov. 23, 2023, 9 pages.
SA Office Action in Saudia Arabian Appln. No. 523451461, mailed on Dec. 27, 2025, 13 pages (with English translation).
Office Action in Japanese Appln. No. 2023-569993, mailed on Mar. 17, 2026, 18 pages (with English translation).
Notice of Allowance in Saudi Arabia Appln. No. 523451461, mailed on Jun. 16, 2026, 2 pags (English machine translation).
Office Action in Saudi Arabia Appln. No. 525472498, mailed on Jun. 30, 2026, 15 pages (English machine translation).
Office Action in Australian Appln. No. 2022273707, mailed on Aug. 20, 2026, 5 pages.
Office Action in European Appln. No. 22727614.4, mailed on Jul. 15, 2026, 10 pages.

* cited by examiner

1700

GAS-LIQUID CONTACTOR WITH PACKING FOR CAPTURING CARBON DIOXIDE

CROSS-REFERENCE TO RELATED APPLICATIONS

This application claims priority under 35 U.S.C. § 119 to U.S. Provisional Patent Application No. 63/187,089, filed May 11, 2021, the entire contents of which are incorporated by reference herein.

TECHNICAL FIELD

This disclosure describes systems and methods for capturing $CO_2$.

BACKGROUND

Global warming resulting from rising atmospheric $CO_2$ concentrations is considered an imminent threat to society. According to the National Oceanic and Atmospheric Administration (NOAA) (Linsday, 2020), global atmospheric carbon dioxide was 409.8±0.1 ppm in 2019, a new record high. That is an increase of 2.5±0.1 ppm from 2018, the same as the increase between 2017 and 2018. In the 1960s, the global growth rate of atmospheric carbon dioxide was roughly 0.6±0.1 ppm per year. Between 2009-2018, however, the growth rate has been 2.3 ppm per year. Techniques to remove carbon dioxide emissions from the atmosphere have become a critical area of research.

Additionally, low carbon, carbon neutral, or carbon negative consumer goods and services have become important on the global market. It is also important to minimize the energy and environmental impacts of the production, use, and disposal of manufactured goods, which range from fundamental commodities such as metals and chemicals to sophisticated final-use products such as electric automobiles, solar panels, wind turbines etc. Renewable energy from its many sources is an incredible way to power, heat, and fuel for our habitat. Each type of renewable energy from hydro to solar to biomass contributes in a different way. Utilizing renewable energy in combination with reducing carbon emissions in the manufacture of consumer goods and services can yield economy-wide reductions in greenhouse gas (GHG) emissions. These improvements can be further enhanced by the development of new materials and process technologies. Carbon removal, including point source and direct air capture (DAC) processes, are among many of the technologies for reducing GHG emissions.

Many technologies designed for $CO_2$ capture from point sources, such as flue gas of industrial facilities, are generally ineffective in capturing $CO_2$ from the atmosphere due to the significantly lower $CO_2$ concentrations and large volumes of air required to process. In recent years, progress has been made in finding technologies better suited to capture $CO_2$ directly from the atmosphere, and a variety of DAC technologies have been described in the technical and patent literature. Some of these DAC systems use a solid sorbent where an active agent is attached to a substrate. These DAC systems typically employ a cyclic adsorption-desorption process where, after the solid sorbent is saturated with $CO_2$, it releases the $CO_2$ using a humidity or thermal swing and is regenerated. While solid sorbent DAC systems can have a high cyclic yield, large scale deployment is a challenge due to maintenance requirements that are inherent to a batch process.

Other DAC systems use a liquid sorbent (sometimes referred to as a solvent) to capture $CO_2$ from the atmosphere. An example of such a gas-liquid contact system would be one that is based on cooling tower designs where a fan is used to draw air across a high surface area packing that is wetted with a solution comprising the liquid sorbent. $CO_2$ in the air reacts with the liquid sorbent. The rich solution is further processed downstream to regenerate a lean solution and to release a concentrated $CO_2$ stream. DAC systems that are designed based on cooling towers are advantageous since they employ some commercially available equipment, and they can operate more effectively in certain environments than others. It is desirable for DAC systems to be simply maintainable and operationally flexible.

SUMMARY

In an example implementation, a packing for capturing carbon dioxide ($CO_2$) from a dilute includes at least one panel that includes a mesh material configured to be wetted by a $CO_2$ capture solution and that defines a gas channel having a first dimension defined along a first direction and a second dimension defined along a second direction different than the first direction, the gas channel configured to receive a flow of $CO_2$-laden gas from the dilute gas source in the second direction and contact the flow of $CO_2$-laden gas with the $CO_2$ capture solution on the mesh material.

In an aspect combinable with the example implementation, the at least one panel includes a plurality of panels, and adjacent panels of the plurality of panels are spaced apart from one another in the first direction and define respective gas channels between each of the adjacent panels, each of the respective gas channels defined by the respective first dimension.

In another aspect combinable with any of the previous aspects, each panel of the adjacent panels defines a planar surface, the planar surfaces of adjacent panels being parallel with one another.

In another aspect combinable with any of the previous aspects, at least one panel of the adjacent panels includes a plurality of planar portions and a plurality of protruding portions, the plurality of planar portions defining parallel planes, the plurality of protruding portions extending outwardly from the parallel planes in the first direction and into the respective gas channels.

In another aspect combinable with any of the previous aspects, each panel of the adjacent panels has a same shape.

In another aspect combinable with any of the previous aspects, the gas channel is co-linear with the second direction of the flow of $CO_2$-laden gas.

In another aspect combinable with any of the previous aspects, the at least one panel is a single panel, and the mesh material includes a continuous sheet of mesh material.

In another aspect combinable with any of the previous aspects, the continuous sheet of mesh material includes a plurality of mesh panel segments spaced apart from one another in the first direction and defining the gas channel.

In another aspect combinable with any of the previous aspects, the at least one panel includes a plurality of panels spaced apart from each other in the first direction, the plurality of panels defining a plurality of gas channels between adjacent panels of the plurality of panels; at least one gas channel of the plurality of gas channels is defined by the first dimension that comprises a first width; and at least another gas channel of the plurality of gas channels is defined by the first dimension that comprises a second width different from the first width.

In another aspect combinable with any of the previous aspects, the gas channel defines a gas channel cross-sectional shape in a plane normal to the second dimension, the gas channel cross-sectional shape being at least one of rectangular, triangular, or rhomboidal.

In another aspect combinable with any of the previous aspects, the first dimension is 6 inches or less.

In another aspect combinable with any of the previous aspects, the $CO_2$ capture solution is at least one of a hydroxide solution, a bicarbonate/carbonate solution, or an amine solution.

In another aspect combinable with any of the previous aspects, the mesh material includes a plurality of fibers defining a plurality of mesh pores, the mesh material configured to be wetted by the $CO_2$ capture solution to cause the $CO_2$ capture solution to bridge across at least a portion of mesh pores of the plurality of mesh pores of the wetted mesh material and define a gas-liquid interface.

In another aspect combinable with any of the previous aspects, the gas-liquid interface includes a first side disposed on a first side of the mesh material; and a second side disposed on a second side of the mesh material opposite the first side of the mesh material.

In another aspect combinable with any of the previous aspects, the first side of the gas-liquid interface and the second side of the gas-liquid interface collectively define an overall reactive gas-liquid interfacial area that is larger than a surface area of corresponding fibers of the mesh material.

In another aspect combinable with any of the previous aspects, a wetting fraction of the mesh material is greater than 100%.

In another aspect combinable with any of the previous aspects, the at least one panel has an upright orientation, and the second dimension is less than three orders of magnitude greater than the first dimension.

In another aspect combinable with any of the previous aspects, the mesh material includes a hydrophilic material.

In another aspect combinable with any of the previous aspects, the hydrophilic material is a hydrophilic coating disposed on at least a portion of the mesh material.

In another aspect combinable with any of the previous aspects, the hydrophilic material includes at least one of a non-woven material or an organic material.

In another aspect combinable with any of the previous aspects, the organic material includes at least one of burlap, hemp, or cellulose.

In another aspect combinable with any of the previous aspects, the mesh material includes a hydrophobic material.

In another aspect combinable with any of the previous aspects, the hydrophobic material is a hydrophobic coating disposed on at least a portion of the mesh material.

In another aspect combinable with any of the previous aspects, the mesh material includes a plurality of fibers having a surface texture.

In another aspect combinable with any of the previous aspects, the mesh material includes a plurality of fibers each having a diameter ranging from 0.0001 mm to 10 mm.

In another aspect combinable with any of the previous aspects, the mesh material includes a plurality of mesh pores, the plurality of mesh pores having one or more shapes including at least one of hexagonal, rectangular, or round.

In another aspect combinable with any of the previous aspects, the mesh material is shaped to form a plurality of imprinted textures comprising at least one of rounded protrusions, ridges, corrugations, or herringbone.

In another example implementation, a gas-liquid contactor for capturing carbon dioxide ($CO_2$) from a dilute gas source includes: a housing at least partially enclosing a plenum including an inlet and an outlet; at least one packing supported in the housing downstream of the inlet, the at least one packing including at least one panel that includes a mesh material and that defines a gas channel having a first dimension defined along a first direction and a second dimension defined along a second direction different than the first direction; a liquid distribution system configured to wet the mesh material with a $CO_2$ capture solution, the liquid distribution system including one or more basins configured to hold the $CO_2$ capture solution received from the mesh material; and a gas moving device configured to flow a $CO_2$-laden gas from the dilute gas source through the gas channel in the second direction to contact the $CO_2$-laden gas with the $CO_2$ capture solution on the wetted mesh material.

An aspect combinable with the example implementation further includes a drift eliminator coupled to the housing and positioned downstream of the at least one packing.

In another aspect combinable with any of the previous aspects, the gas moving device is a fan disposed downstream of the at least one packing at the outlet, and the fan is rotatable about a fan axis to draw the $CO_2$-laden gas into the inlet and through the gas channel in the second direction.

In another aspect combinable with any of the previous aspects, the liquid distribution system is configured to wet the mesh material, the wetted mesh material forming a liquid film of the $CO_2$ capture solution on the mesh material.

In another aspect combinable with any of the previous aspects, the liquid distribution system is configured to flow the $CO_2$ capture solution at a solution flow rate ranging from 1 L/min to 4 L/min.

Another aspect combinable with any of the previous aspects further includes a structural support supported by the housing and configured to support the at least one packing, the structural support including one or more support rods mounted on one or more support beams.

In another aspect combinable with any of the previous aspects, the mesh material is fixedly mounted to the one or more support rods by at least one of threading, tension, or fasteners.

In another aspect combinable with any of the previous aspects, the liquid distribution system includes one or more distribution facilitator devices configured to provide the $CO_2$ capture solution onto at least a portion of the mesh material.

In another aspect combinable with any of the previous aspects, the one or more distribution facilitator devices include at least one of liquid distribution rods or liquid distribution spacers.

In another aspect combinable with any of the previous aspects, one or more of the liquid distribution spacers includes at least one tube having a tapered end.

In another aspect combinable with any of the previous aspects, the liquid distribution rods include a plurality of grooves that are operable to flow the capture solution.

In another aspect combinable with any of the previous aspects, the one or more liquid distribution spacers are pressed against the one or more liquid distribution rods to form at a least a portion of a top basin.

In another aspect combinable with any of the previous aspects, the one or more liquid distribution rods and the one or more liquid distribution spacers are integrally formed with the mesh material.

In another aspect combinable with any of the previous aspects, the one or more liquid distribution rods, the one or more liquid distribution spacers, and the at least one panel include a fiberglass core at least partially covered with a PVC coating.

In another aspect combinable with any of the previous aspects, a first support rod of the one or more support rods is configured to interlock with a second support rod of the one or more support rods.

In another aspect combinable with any of the previous aspects, the one or more support rods have a cross-section that is C-shaped or bow-shaped.

In another aspect combinable with any of the previous aspects, the one or more support rods each have a thickness that tapers from a first end of the respective support rod to a second end of the respective support rod.

In another aspect combinable with any of the previous aspects, the one or more basins include at least one top basin positioned above the at least one panel; at least one bottom basin positioned below the at least one panel; and the liquid distribution system is configured to flow at least a portion of the $CO_2$ capture solution from the at least one bottom basin to the at least one top basin.

In another aspect combinable with any of the previous aspects, the gas-liquid contactor is configured to operate as part of a cooling tower system, a direct air capture air contactor system, or a combination thereof.

Another aspect combinable with any of the previous aspects further includes a structural support supported by the housing and configured to support the at least one packing, the structural support including one or more support rods, a first subset of rods of the one or more support rods being offset from a second subset of rods of the one or more support rods, the second subset of rods being spaced apart from the first subset of rods in a direction perpendicular to the first dimension and to the second dimension, the mesh material including a continuous sheet of mesh material tensioned about the first subset of rods and about the second subset of rods to form a plurality of mesh panel segments, the plurality of mesh panel segments extending between spaced-apart rods of the first subset of rods and the second subset of rods.

In another aspect combinable with any of the previous aspects, adjacent mesh panel segments of the plurality of mesh panel segments are spaced apart from each other in the first direction and define the gas channel, the first dimension decreasing in a direction parallel to a distance between the first subset of rods and second subset of rods.

In another aspect combinable with any of the previous aspects, adjacent mesh panel segments of the plurality of mesh panel segments have a non-parallel orientation with respect to one another.

Another aspect combinable with any of the previous aspects further includes a structural support supported by the housing and configured to support the at least one packing, the structural support including one or more support rods, wherein the mesh material is suspended from the one or more support rods.

Another aspect combinable with any of the previous aspects further includes one or more spacers, each spacer of the one or more spacers being interposed between adjacent support rods of the one or more support rods.

In another aspect combinable with any of the previous aspects, the one or more spacers includes one or more distribution spacers.

Another aspect combinable with any of the previous aspects further includes one or more distribution facilitator devices.

In another aspect combinable with any of the previous aspects, the one or more distribution facilitator devices includes at least one of distribution support rods or distribution spacers.

In another aspect combinable with any of the previous aspects, the one or more spacers includes at least one tube having a tapered end.

In another aspect combinable with any of the previous aspects, the liquid distribution system further includes one or more flow devices configured to flow the $CO_2$ capture solution over the at least one packing, the one or more flow devices including at least one of nozzles, atomized sprayers, or liquid distribution rods.

In another aspect combinable with any of the previous aspects, the at least one packing includes two packings that are spaced apart from one another laterally within the housing; and the gas moving device includes a fan disposed laterally between the two packings and downstream thereof at the outlet, the fan being rotatable about an upright fan axis to draw the $CO_2$-laden gas from the dilute gas source through the two packings and to output a $CO_2$-lean gas through the outlet.

In another aspect combinable with any of the previous aspects, the at least one panel defines a planar surface having a vector normal to the planar surface, the vector having a horizontal orientation.

In another aspect combinable with any of the previous aspects, the at least one panel has an upright orientation and includes a leading edge defined relative to a flow of the $CO_2$-laden gas, the leading edge being inclined in a direction of the flow of the $CO_2$-laden gas and defining an angle relative to a vertical axis.

In another example implementation, a method for capturing $CO_2$ from a $CO_2$-laden gas includes: wetting at least a portion of spaced-apart mesh panels with a $CO_2$ capture solution to cause the $CO_2$ capture solution to flow along the spaced-apart mesh panels; flowing the $CO_2$-laden gas along a gas channel defined between the spaced-apart mesh panels; reacting the $CO_2$-laden gas with the $CO_2$ capture solution on the wetted spaced-apart mesh panels; and absorbing at least a portion of $CO_2$ in the $CO_2$-laden gas with the $CO_2$ capture solution.

In an aspect combinable with the example implementation, flowing the $CO_2$-laden gas along the gas channel includes linearly flowing the $CO_2$-laden gas through the gas channel along a first dimension of the gas channel.

In another aspect combinable with any of the previous aspects, wetting at least a portion of the spaced-apart mesh panels with the $CO_2$ capture solution includes flowing the $CO_2$ capture solution over the spaced-apart mesh panels in a first direction; and flowing the $CO_2$-laden gas along the gas channel includes flowing the $CO_2$-laden gas along the gas channel in a second direction transverse to the first direction.

In another aspect combinable with any of the previous aspects, the second direction is counter-current to the first direction.

In another aspect combinable with any of the previous aspects, wetting at least a portion of the spaced-apart mesh panels with the $CO_2$ capture solution includes flowing the $CO_2$ capture solution at a flow rate ranging from 1 L/min to 4 L/min.

In another aspect combinable with any of the previous aspects, wetting at least a portion of the spaced-apart mesh panels with the $CO_2$ capture solution includes saturating the at least a portion of the spaced-apart mesh panels with the $CO_2$ capture solution; and flowing the $CO_2$ capture solution along the saturated at least a portion of the spaced-apart mesh panels to form one or more meandering currents.

In another aspect combinable with any of the previous aspects, wetting at least a portion of the spaced-apart mesh panels with the $CO_2$ capture solution includes forming a liquid film of the $CO_2$ capture solution along the at least a portion of the spaced-apart mesh panels.

In another aspect combinable with any of the previous aspects, flowing the $CO_2$-laden gas along the gas channel includes rotating one or more fans to draw the $CO_2$-laden gas along the gas channel.

Another aspect combinable with any of the previous aspects further includes collecting at least a portion of the $CO_2$ capture solution in one or more bottom basins; and flowing at least a portion of the $CO_2$ capture solution from the one or more bottom basins to one or more top basins.

Another aspect combinable with any of the previous aspects further includes reacting the $CO_2$-laden gas with the $CO_2$ capture solution to form a $CO_2$-lean gas and a $CO_2$-rich capture solution; and discharging the $CO_2$-lean gas.

Another aspect combinable with any of the previous aspects further includes flowing the $CO_2$-lean gas through one or more drift eliminators.

Another aspect combinable with any of the previous aspects further includes flowing the $CO_2$-lean gas through an open plenum after the flowing the $CO_2$-laden gas along the gas channel defined between the spaced-apart mesh panels.

In another aspect combinable with any of the previous aspects, wetting at least a portion of the spaced-apart mesh panels with the $CO_2$ capture solution includes bridging the $CO_2$ capture solution across mesh pores of the spaced-apart mesh panels to define a gas-liquid interface.

In another aspect combinable with any of the previous aspects, bridging the $CO_2$ capture solution across the mesh pores includes forming the gas-liquid interface on both opposed sides of each spaced-apart mesh.

In another aspect combinable with any of the previous aspects, bridging the $CO_2$ capture solution across the mesh pores includes wetting hydrophilic mesh fibers of the spaced-apart mesh panels with the $CO_2$ capture solution, the hydrophilic mesh fibers defining the mesh pores.

In another aspect combinable with any of the previous aspects, wetting at least a portion of the spaced-apart mesh panels with the $CO_2$ capture solution includes wetting an outer surface of hydrophilic mesh fibers of the spaced-apart mesh panels with the $CO_2$ capture solution.

In another aspect combinable with any of the previous aspects, wetting the outer surface of the hydrophilic mesh fibers includes flowing the $CO_2$ capture solution along the outer surface of the hydrophilic mesh fibers.

In another aspect combinable with any of the previous aspects, wetting the outer surface of the hydrophilic mesh fibers includes wetting the hydrophilic mesh fibers with the $CO_2$ capture solution past a saturation level of the hydrophilic mesh fibers to form a liquid film of the $CO_2$ capture solution extending across mesh pores defined by the hydrophilic mesh fibers.

In another aspect combinable with any of the previous aspects, wetting the at least a portion of spaced-apart mesh panels with the $CO_2$ capture solution includes conditioning the at least a portion of the spaced-apart mesh panels by forming precipitates of solids on mesh fibers of the spaced-apart mesh panels.

In another example implementation, a method for capturing $CO_2$ from dilute sources includes providing a capture solution to one or more sections of packing from one or more top basins using a liquid distribution system, the one or more sections of packing each including one or more mesh sheets; distributing the capture solution over at least a portion of the packing; drawing a $CO_2$-laden gas through the mesh packing by operating a fan; co-linearly flowing the $CO_2$-laden gas through one or more gas channels defined by the one or more mesh sheets by operating the fan; reacting the $CO_2$-laden gas with the capture solution to form a $CO_2$-lean gas and a $CO_2$-rich capture solution; collecting the $CO_2$-rich capture solution in one or more bottom basins; and discharging the $CO_2$-lean gas.

An aspect combinable with the example implementation further includes flowing the $CO_2$-lean gas through one or more drift eliminators.

Another aspect combinable with any of the previous aspects further includes flowing the $CO_2$-lean gas through an open plenum section.

In another aspect combinable with any of the previous aspects, providing the capture solution to one or more sections of packing includes providing the capture solution via one or more liquid distribution facilitator devices.

In another aspect combinable with any of the previous aspects, providing the capture solution using one or more liquid distribution facilitation devices includes providing the capture solution using at least one of liquid distribution rods or liquid distribution spacers.

In another example implementation, a method of configuring a cooling tower for capturing $CO_2$ from a dilute source of $CO_2$ gas includes supporting at least one mesh packing within the cooling tower between an inlet and an outlet of the cooling tower; and orienting the at least one mesh packing within the cooling tower to form unobstructed flow paths between gas channels of the at least one mesh packing and the inlet and the outlet.

An aspect combinable with the example implementation further includes removing existing packing from within the cooling tower before supporting the at least one mesh packing within the cooling tower.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
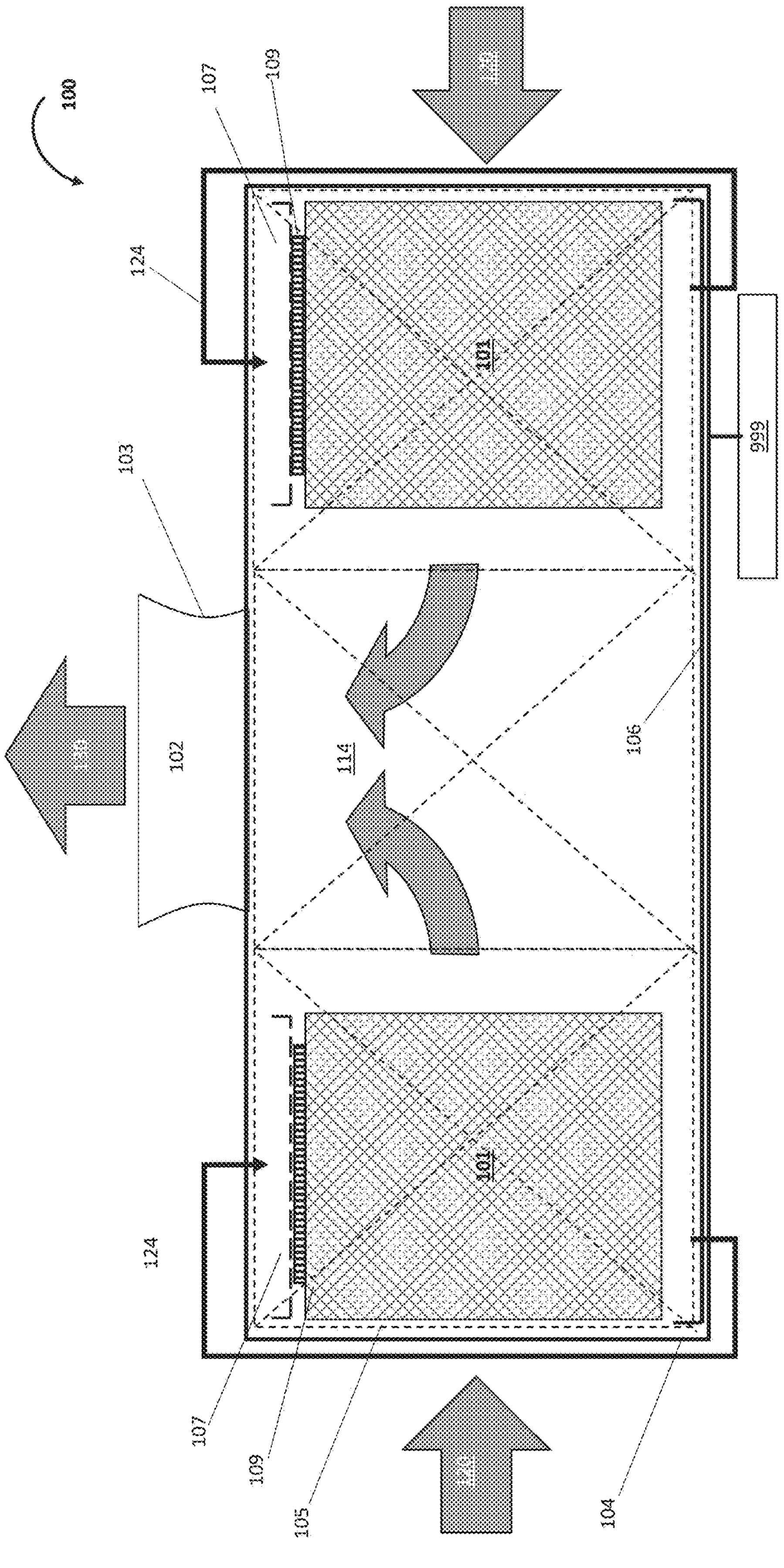
FIG. 1 shows a schematic illustration from an elevation view of an example gas-liquid contactor.

The present disclosure relates to systems and methods for direct air capture (DAC) of $CO_2$ from atmospheric air or other dilute gaseous sources that contain $CO_2$, using a gas-liquid contactor including mesh packing. $CO_2$ concentrations in dilute sources (around 400-420 ppm or 0.04-0.042% v/v) such as atmospheric air are much lower than $CO_2$ concentrations in point sources (around 5-15% v/v) such as flue gas. Mass transfer kinetics are favorable for $CO_2$ capture from point sources. Thus, design considerations for a $CO_2$ capture subsystem and capture solution regeneration subsystem are different for dilute sources when compared to point sources. While the present disclosure relates to the capture of $CO_2$ from atmospheric air or other dilute gaseous sources that contain $CO_2$, it will be appreciated that the systems, methods and disclosure herein may also be used to capture $CO_2$ from more concentrated sources of $CO_2$ which have or entrain a dilute gaseous source, for example from a flue gas that is mixed with atmospheric air.

Commercially available packing, for example packing used in cooling towers or flue gas scrubbers, has been used in DAC applications. However, these commercially available packings were not designed specifically for the dilute $CO_2$ mass transfer requirements of DAC applications and are therefore not optimized for DAC applications. For example, commercially available packing from the cooling tower industry is designed for use with water and for maximizing heat transfer with less consideration for mass transfer, which is important for a DAC system. In contrast to commercially available packing from the cooling tower industry, the mesh packing disclosed herein may be used to facilitate mass transfer of $CO_2$ from a gaseous source (e.g. atmospheric air) that contain $CO_2$ to a capture solvent wetting the mesh packing.

Commercially available cooling tower packing is also specifically designed to achieve sufficient wetting under high liquid loading conditions, while the air is pulled through the block of packing. As such, cooling tower packing has demonstrated lower wetting efficiency for the low liquid loading rates often of interest to DAC applications. At low liquid loading rates, the capture solution can tend towards a rivulet flow regime and form channels as it travels down cooling tower packing. Low wetting efficiency caused by rivulet flow of capture solution can lead to unnecessarily low mass transfer due to the reduced interfacial area per unit packing area (resulting in low $CO_2$ uptake), higher pumping rates needed to increase liquid sorbent flow, and can ultimately end up requiring a large air contactor footprint.

Packing that is produced for conventional “packed towers”, “packed columns” and/or flue gas scrubbers in chemical processing plants is designed for much higher $CO_2$ concentrations of approximately 10-15% v/v and smaller volumetric gas flow rates per scrubber column in comparison to DAC applications such as those disclosed herein. Thus, a significantly smaller volume of gas is needed for processing in these conventional packed towers in order to capture the equivalent amount of $CO_2$ from the air using DAC. Additionally, conventional packed towers are typically used in a counter-flow (rather than crossflow) orientation because it is the flow orientation with the highest mass transfer efficiency; but counter flow scrubbing column designs are not suitable for DAC primarily because air-flow rates are restricted by the flooding point. The capture kinetics in a flue gas scrubber, or high concentration chemical absorption tower are generally more favorable compared to those associated with absorption of dilute $CO_2$ concentrations as in a DAC system such as one disclosed herein.

While both point source capture and DAC technologies capture $CO_2$ from a gas stream, the process designs for both technologies are different owing to their different feedstocks and process conditions. However, there are ways in which the present disclosure can be used to retrofit, modify, or redesign existing cooling towers to facilitate at least a portion of the $CO_2$ capture capabilities seen in existing DAC systems. Furthermore, when incorporated into DAC systems, the present disclosure can further improve at least one of capture efficiency, pressure drops, capital expenditures, operational expenditures, and/or simplify and reduce maintenance and installation.

The gas-liquid contactor systems and methods described herein may include mesh packing coupled to structural support(s), a liquid distribution system and one or more liquid collection systems. In some cases, the mesh packing can include one or more mesh screens positioned adjacent to one another. The mesh packing material, design and configuration may allow for high effective mass transfer of $CO_2$ into solution, lower pressure drop and higher air velocities across the air travel depth (ATD), and lower total liquid flow rates. These features, individually and additively, yield several advantages to the performance, maintenance, and overall economics of capturing $CO_2$ from dilute gaseous sources.

The properties of the mesh packing design and operation described herein, taken individually or when combined, e.g., with the liquid distribution embodiments according to the present disclosure, can lead to overall economic benefits to the gas-liquid contactor DAC system. For example, for a given $CO_2$ capture rate, the mesh packing design and additional features described in the present disclosure can help to reduce the air travel depth (ATD), reduce the overall DAC system footprint, including key construction materials such as structural and concrete requirements, all of which lead to reduced capital costs for the gas-liquid contactor system. In addition, the sorbent pumping system and energy demands using the mesh packing design and additional features described herein are decreased due to the lower flow rates. This is accomplished in part because the mesh packing and mode of operation can facilitate large wetted interfacial contact areas which are continuously replenished through an even solution distribution throughout the mesh packing. The design and materials used in manufacturing the mesh packing can improve wettability over conventional packing.

In addition to the above-mentioned reduction in overall material and footprint requirements of the gas-liquid contactor, another advantage to mesh packing over commercially available packing includes the ability to reduce the volume of the packing and lower packing material requirements, which in turn helps to reduce pressure drop across the ATD and the resulting fan power required to operate the system.

As the gas-liquid contactor is the largest system in large scale DAC applications, any improvement in performance, energy efficiency, or reduction in material and footprint has a significant and attractive impact on the overall DAC facility economics.

Advantages to maintenance can also be realized with the present disclosure. The threaded mesh material is easily replaceable with new mesh material if some part of the mesh material is damaged. The mesh material can be detached from the rods when decoupled from the supporting beam. In some aspects, the use of mesh material with commercially standardized thickness and dimensions (without need for custom alterations), can make it a low-cost material that is easily supplied, convenient to replace and maintain, which results in lowering the associated air contactor maintenance/operational costs and downtime.

Additionally, the methods and systems described herein can be employed in systems that are built or have been modified for $CO_2$ capture, and operated with a variety of liquid solutions containing $CO_2$ capture sorbents. It can also be employed via retrofitting existing cooling tower systems. The mesh packing is compatible to be used in existing DAC or cooling tower systems and among their associated componentry, including drift eliminators, fans or blowers, housing, frames, one or more $CO_2$ capture solution basins and/or distribution systems, gas inlet and outlet areas etc.

The mesh packing can be installed in existing contactor housing without a need for significant redesign. It could also be installed in a contactor housing designed to operate without existing structural elements of cooling towers. The mesh packing can be assembled in and out of the cooling tower. The mesh packing can be installed in the cooling tower using a method that is similar to any installation method for commercial packing for example, from the top or one side of the cooling tower. The mesh packing includes low-cost, light weight woven and/or threaded mesh material, with long lasting structural integrity.

In some implementations, the gas-liquid contactor can be an air contactor, having one or more cells, based on modified cooling tower equipment and including similar componentry such as one or more fans, pumps, basins, drift eliminators, packing, housing, structural components, control systems, and the like. In some aspects, the gas-liquid contactor can be a dual cell cross flow contactor. In some aspects, the gas-liquid contactor can be an existing cooling tower system, having one or more of a cross flow or counterflow arrangement, which has been retrofitted with the disclosed mesh packing.

In some implementations the gas-liquid contactor includes one or more top basins, a structural support frame, one or more plenums, one or more bottom liquid collection basins, a housing, one or more liquid distributions systems (coupled to one or more pumps, valves and nozzles), one or more fan and cowling, packing and drift eliminator componentry.

In some implementations, the mesh packing is coupled to one or more liquid distribution facilitator devices. In some cases, these devices may include existing support components or new components that facilitate or aid in uniform distribution of liquid solution onto the mesh material. In some implementations, liquid distribution facilitator devices include for example one or more existing top support rods that are modified (e.g., made to be hollow, with holes, or other similar internal or external features that enable liquid distribution) to transport liquid along the length of the support rod and onto the mesh material, in addition to serving the structural function of supporting and/or tensioning the mesh material. Another example of a liquid distribution facilitator device is a distribution spacer, which includes one or more top spacers that are modified (e.g., with holes or made from stiff mesh material or material of similar features that enable liquid distribution) to transport liquid along length of the spacer and onto mesh material, in addition to serving its structural function of maintaining space between the support rods.

In some implementations, the gas-liquid contactor includes mesh packing (or multiple mesh packing sections). In some aspects, the mesh packing is comprised of a single continuous sheet of mesh material threaded through structural componentry to create the packing, or the packing could be comprised of one or more discrete panels or sheets of mesh material coupled to structural componentry to create the packing. The mesh packing is configured and positioned to promote mass transfer between the gas and liquid streams moving through the gas-liquid contactor.

In some implementations, the gas-liquid contactor employs liquid distribution systems similar to cooling tower or DAC systems known today—e.g., top basin and nozzle distribution systems, or a pressurized piping and spray nozzle distribution system.

The methods and systems described in the present disclosure may allow for the concept of net zero emissions through deployment of large-scale DAC plants in association with a variety of downstream processes, including for example sequestration and/or enhanced oil recovery (EOR) applications, and the production of synthetic products including hydrocarbons, fuels, plastics, chemicals and the like.

To optimize techno-economics of DAC-specific applications, the low concentration of $CO_2$ in ambient air drives the packing design towards a high air flow rate and low pressure drop through the packing, while providing a high gas-liquid interfacial area at low solution flow rates (as compared to conventional cooling towers which have high solution flow rates and thus higher solution pumping and distribution costs). In some implementations, the decrease in the solution flow rate can change the overall flow pattern from film flow to rivulet flow, which can reduce the gas-liquid interface area available for mass exchange from the $CO_2$ laden air to the $CO_2$ capture solution.

The flow rate at which transitions in flow patterns occur is dependent on many factors, including the free energy of the solid surface, geometry of packing and the density, viscosity, and surface tension of the $CO_2$ capture solution. Such properties in $CO_2$ capture solution differ from those of water, which is the typical liquid in cooling tower applications, due to the presence of concentrated sorbents (e.g., KOH or NaOH, carbonate/bicarbonate chemistries, liquid amines, capture or mass transfer promoting additives, etc.) in the $CO_2$ capture solution.

In some cases, the mesh material is configured to reduce overall weight of the system as well as to reduce the pressure drop across the sheet. In some cases, this enables larger volumetric air flow and higher air velocities which in turn improves overall efficiency, economics and energy savings.

In some implementations, the mesh packing can consist of one or more sheets of mesh material, arranged to create multiple gas channels for large volumes of gas (e.g., atmospheric or other gas containing dilute concentrations of $CO_2$) to move through at high velocity and low pressure drop, in a co-linear direction to the mesh sheet surface. In some cases, the mesh packing can include one or more screens positioned adjacent to one another.

In some implementations, the mesh packing is a structured (e.g. not loose) packing, wherein the one or sheets of mesh material that comprise the structured mesh packing are in and of themselves structured, are provided structure through use of structural components such as support rods, beams, and the like, or a combination thereof.

In some implementations, mesh material consist of multiple fibers woven or joined together to form a mesh with multiple openings or pores. The geometry of this structure can be adjusted to allow for the minimum amount of material required to facilitate the formation of a continuous or uniform liquid film surface with a given $CO_2$ capture solution. In some implementations, the technique for forming interfacial area is capillary bridging; here, the mesh fiber diameter, surface energy of the fiber material, as well as fiber spacing (pore size) may be optimized to allow for minimal mass of mesh material while still providing conditions sufficient for a given $CO_2$ capture solution to bridge across the mesh pores/openings, generating and maintaining a continuous film of liquid across the mesh pores and producing a large interfacial area for gas-liquid contact.

In some implementations, the specific sorbent solution properties, such as surface tension, viscosity, density, etc., can dictate the maximum mesh pore size, above which the solution will no longer be able to bridge across the pore opening and a rivulet flow pattern will dominate resulting in reduced sorbent hold up. Therefore, in some implementations, the selection of mesh material and design (including pore size) must account at least in part for the type of capture solution being considered.

In some implementations, the design and/or operation of the mesh packing, and gas-liquid contactor may incorporate features to better allow the capture solution, given its specific properties, to spread and create an optimum interfacial surface area for capture of $CO_2$. For example, this may be done by taking into consideration the specific liquid solution properties, including but not limited to temperature, pH, viscosity and/or density, and adjusting the mesh packing material properties, the fiber diameter, the pore opening size, and/or the liquid sorbent flow rates, to optimize the system performance.

Furthermore, the overall wettability is partially determined by physical wettability of the mesh material, which is directly related to surface energy, and partially determined by the completeness of coverage as the liquid travels from one end of the mesh material to the other end. The route of travel of liquid through the mesh material is determined in part by geometry, surface structure and surface energy of the mesh material.

In some implementations, the mesh material's fiber thickness can range between 0.01 mm to 10.0 mm and can be optimized to ensure that the surface tension of the sorbent facilitates complete encapsulation of the sorbent around each individual fiber. In some cases, the fiber thickness is minimized in order to minimize the amount of mesh material while maintaining structural integrity and durability.

In some implementations, the mesh material's fiber spacing creates pore (opening) with sizes/widths ranging between 0.1 mm to 30.0 mm. In some cases, the fiber spacing is optimized to work with the sorbents surface tension to pull the sorbent across the gap/pore, facilitating the use of the sorbent for formation of the reaction interface/surface instead of the mesh material. In an embodiment, there is provided a relationship between the pore size and liquid film formation. For example, the pore (opening) size may be maximized while still facilitating complete liquid film formation and bridging across openings. Optimizing the pore size minimizes mesh material volume and mass while maintaining a particular reaction interfacial area.

In some implementations, the mesh material can be made of fibers that can be straight or waved with smooth or rough surfaces. Sheets of mesh material can be produced by weaving weft and warp wires with the same or different diameters and thickness. Continuous wires not previously crimped or shaped can be used. Types of weaving patterns used to form the mesh material can include woven, twill, basket, herringbone, sheets with a square or rectangular, with mesh pores (or openings) having a hexagonal (honeycomb), square, rectangular, or round shape, or combination thereof. The selection of mesh shape can impact the open surface area, material strength and how much material needs to be used to form the mesh.

Mesh packing can be made using a variety of materials, and can rely on either a hydrophobic technique or a hydrophilic technique (described in detail herein) for surface wetting, depending on the intended application and design. In some aspects, the mesh material is selected to be compatible with the $CO_2$ capture solution, for example high pH and/or hydroxide solutions like KOH, NaOH and the like.

In some implementations, the sheets of mesh material may comprise portions that are made from or coated with one or more materials. In some implementations, the sheets of mesh material may comprise more than one group of fibers, each group of fibers being made from a different material, and these groups of fibers may be woven, or connected together to form a blended mesh material for use in one or more sheets within the packing. In some cases, the fibers are made from a blended fiber material.

In some hydrophobic implementations, the sheet(s) of mesh material can be made from different types of materials, for example plastic, metal, polymer composites, or a combination thereof. In some cases, the plastic sheets of mesh material can be extruded, oriented, expanded, woven or tubular. The plastic materials that can be used are, for example, polypropylene, polyethylene, PVC-coated fiberglass, PVC or PTFE.

In some hydrophilic implementations, the mesh material can be made of metal, fiberglass material, polyamide (e.g., nylon) or organic fabrics like burlap, hemp or cellulose or a combination of similar materials. The hydrophilic mesh material composition can be further modified by use of microstructures, coatings or additives to optimize the contact angle for use in DAC specific applications.

In some implementations, the surface characteristics of the fibers making up the mesh material may be tuned or enhanced to optimize the gas-liquid interface, regardless of how hydrophilic or hydrophobic the fiber material is to start. For example, in some cases the deposition of precipitates or solids (such as low solubility salts like $CaCO_3$) from one or more fluid streams in the gas-liquid contacting application, accumulated over time (and often described as conditioning of the packing), may alter the overall surface energy or topology of fibers, thereby changing the fiber's interaction with the sorbent solution (notably the solution bridged across the mesh pores). In some cases, this is based on the resulting effective contact angle or geometric influence.

Additionally, fibers may have surface texture introduced to influence the fiber/sorbent solution interaction characteristics. Fiber surfaces may be smoothed or roughened, depending on material surface energy properties, to tune or optimize the characteristics of the fiber-liquid solution interface.

In some cases the fibers, whether hydrophobic or hydrophilic in nature originally, may be optimized through use of a coating or additive, to arrive at a targeted gas-liquid interface in a given gas-liquid application.

In some implementations, combinations of fibers exhibiting different surface characteristics or texture may be woven together as a means of tuning or optimizing the properties of the sheet of mesh material (sometimes referred to herein as "mesh sheet") for liquid sorbent solution hold up and/or shedding.

In both hydrophobic and hydrophilic mesh material wetting techniques, reducing the mesh material can be accomplished by leveraging the liquid surface tension properties to achieve a high ratio of gas-liquid interface area to packing material mass. Based on the given liquid solution surface tension, sorbent solution films can bridge across the mesh pore openings resulting in an overall reactive gas-liquid interfacial area greater than the surface area of the mesh packing alone. In these cases, the wetting fraction, ε, is greater than 100%, such that when the mesh sheet is wet and the solution bridges across the open spaces/pores, the gas-liquid interfacial area is larger than the total surface area of the mesh fibers. Furthermore, the open nature of the pores coupled with solution bridging provides interfacial area on both sides of the mesh sheet(s). This contrasts with some conventional heat exchange packing or structured packing surfaces, which may have a gas-liquid interface on one surface as opposed to a uniform gas-liquid film interface formed on both sides of the mesh packing surface disclosed herein. In some cases, the mesh sheets can be thought of as internal supports for a near-uniform solution film.

As mentioned earlier, commercially available cooling tower packing has challenges with maintaining a high wettable surface area under DAC applications. One cause of poor wetting is low surface energy of conventional packing. For example, commercially available packing such as cooling tower packing tends to be hydrophobic in nature, which tends to have low surface energy. Surface energy describes the strength of intermolecular bonds at the surface of a material and is the energy required to increase the degree of surface exposure. If a material has high surface energy, its bulk interactions will be stronger, and its surface exposure will be greater. If a material has a low surface energy, its bulk interactions will be weaker, and its surface exposure will be smaller. Poor wetting and hydrophobicity (the tendency to repel or not mix with water) are usually associated with a high contact angle. Contact angle is defined as the angle between the liquid-solid interface and the liquid-vapor interface, measured through the liquid. Poor wetting and high contact angle are both potential causes of the packing material having a low surface energy. If not designed properly, these attributes of hydrophobic material can lead to poor performance in DAC applications.

The mesh packing of the present disclosure includes embodiments utilizing either hydrophobic or hydrophilic properties in ways that support better performance in DAC applications, in contrast to the poor wetting of some commercially available cooling tower packing.

Two general wetting techniques, a bridging technique and a capillary technique, are possible when using aqueous-based liquid capture sorbents. The particular wetting technique can be dictated by the material characteristics of the mesh sheet fibers making up a mesh sheet. For example, the bridging technique, described in more detail in reference to FIGS. 14A-14C, occurs when the packing material is more hydrophobic in nature, and results in solution establishing a liquid film or "bridging" across the mesh pores and between the fibers. The capillary technique, described in more detail in reference to FIGS. 15A-15C, occurs when the packing fibers are more hydrophilic in nature. With this technique, capillary action draws solution along the fiber surface and there is less or possibly no bridging across the mesh pores.

In some implementations with hydrophobic mesh packing, the hydrophobicity of the mesh fibers promotes the capture liquid to preferentially move into the open area of a mesh pore without substantial wetting of the fiber itself. Any excess liquid can pull away in a droplet and runs down the mesh fiber.

The bridging technique is often seen with hydrophobic mesh material, and results in solution bridging between the fibers due to minimization of the surface energy of the liquid capture sorbent at the interface of the liquid with the packing fibers combined with the surface tension of the liquid capture sorbent. In some cases, the dimensions of the bridged solution will be defined by the fiber diameter, spacing (e.g., mesh pore width), fiber material hydrophobicity, and solution surface tension. A maximized air/sorbent interface for hydrophobic mesh packing applications can be targeted by optimization of the above parameters for a given capture solution composition and air contactor operational parameters as larger air/sorbent interfaces provide more available surface area for increased mass transfer of $CO_2$ into the liquid capture sorbent.

Using this bridging technique, the surface of the packing fiber itself will remain largely unwetted and therefore not contribute significantly to the air/sorbent interfacial area by virtue of its hydrophobic nature. Therefore, an optimized hydrophobic mesh packing will maximize the interfacial area by respective tuning of fiber diameters and the spacing between fibers making up the mesh pore. In some cases, too large of fiber width/spacing will result in breaking of sorbent bridges for a given solution surface tension where the liquid bridge will no longer span the mesh pore width.

In some cases, hydrophilic designs can improve wetting of the mesh packing with the capture solution. With hydrophilic mesh packing designs, the capillary technique may be the dominant form of mesh material wetting. In some cases, this technique may occur through capillary action, rather than solution bridging. For example, the capillary technique draws solution along the fiber surface, and there is less or possibly no bridging across the mesh pores. The gas-liquid interfacial area will subsequently be defined by the area of wetted fibers and the thickness of the liquid sorbent layer, which will be defined by the fiber material hydrophilicity and liquid sorbent flow rate down the mesh sheet. Using this capillary technique, the mesh pores may or may not be fully wetted depending on liquid sorbent layer thickness and packing fiber spacing. Therefore, optimization of a hydrophilic mesh packing for wetting capillary technique will be different than mesh packing optimization of the bridging technique.

Improved wetting of mesh packing having hydrophilic properties (e.g., by increasing the wetted surface area of the mesh sheet) can be achieved by at least two approaches. The first approach is to increase the hydrophilicity of the mesh material surface by increasing the surface free energy, which is a material property. The second approach is to increase the mesh material surface roughness and the apparent contact angle. These approaches for improved wetting can be used independently or in combination with one another.

Since the wetted surface area determines the amount of exposure of capture solution to $CO_2$ in the air, and a hydrophilic material surface maximizes the wetted area for a given volume of solution, hydrophilic materials for the mesh packing may be suitable for gas-liquid contactor applications. In some cases, the hydrophilicity may be incorporated into the mesh material when it is produced, or it may be introduced as a coating post-production. Hydrophilic coatings increase surface energy and lower the contact angle of the capture solution on the mesh sheets. In some cases, some surface treatments that expose a material to a change in bonds on its surface can achieve similar hydrophilic results.

In an example implementation, the hydrophilic mesh sheet may include an applied coating to the mesh packing to increase hydrophilicity. In some cases, this coating fully wets with a minimal solution flow. This can result in higher capture rates with significantly reduced solution flows compared to an uncoated mesh sheet.

In some implementations, the hydrophilic mesh sheet is wetted with capture solution, soaking the hydrophilic material until the liquid mass or volume exceeds a threshold saturation level within the mesh sheet and forms droplets that flow along the mesh fibers into the pores (openings) to produce a liquid film within the pores, in addition to the wetted surface of the hydrophilic mesh material itself. This is different from the hydrophobic technique of wetting, which relies on the mesh material repelling the liquid to force the droplets away from the mesh fibers and into the pores.

In some implementations, the mesh packing may include material additives to further optimize the hydrophilicity and lower the contact angle between the liquid-solid interface on at least a portion of the mesh sheet.

In addition to or alternatively to the previous example means for increasing hydrophilicity of mesh material, the mesh fiber surface roughness can be modified to increase hydrophilicity.

Figure 14A:
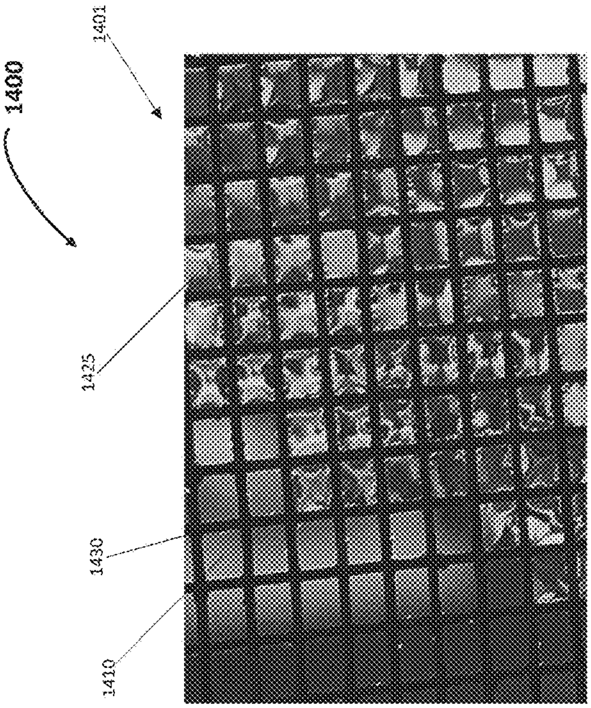
FIG. 14A shows an illustration of an example hydrophobic mesh sheet.

As can be seen in FIG. 14A, in some implementations, the mesh packing contains at least a portion of the mesh sheet 901 having hydrophilic properties. In some cases, this can increase the effectiveness of the mesh sheet 901 in capturing $CO_2$ (sometimes referred to as the $CO_2$ capture flux), for example by at least 10%. This increased effectiveness may be achieved through an increase in the wetting fraction of the mesh packing. If the mesh material is inherently already somewhat hydrophilic (tending to be wetted by water), then the addition of small micro-structures can increase the wetted surface area.

The mesh packing is designed to be positioned in the airflow path of a gas-liquid contactor, such as an air contactor in DAC applications, or a cooling tower housing (if retrofitted or adapted for $CO_2$ capture applications). The mesh packing consists of one or more mesh panels, threaded and/or aligned to form relatively straight gas channels wherein the mesh sheet's largest surface (planar) area is co-linear with the gas stream flow direction. The top edge of the mesh panel(s) are coupled to a liquid distribution system, where the liquid capture solution is applied (e.g., continuously or intermittently, using pulse flow, flush flows, or a combination thereof) to the top edge or portion of the mesh sheet and allowed to travel down the height of the mesh sheet, forming a uniform liquid film within the majority of the mesh pores and/or along the fibers delimiting the mesh pores. This liquid film provides a gas-liquid interfacial area through which $CO_2$ from the air stream is absorbed or captured as the air stream moves through the gas channels between mesh sheets. The mesh sheet packing disclosed herein has mesh sheets that are arranged in relation to the air flow. For example, in an embodiment, the mesh sheets are positioned in a co-linear orientation with the direction of airflow, such that the airflow travels along a direction which is parallel to a planar surface of the mesh sheets. In an embodiment, the airflow travels along a direction which is parallel to the air travel depth (ATD) defined by the mesh sheets. The movement of airflow in this direction allows for the airflow to contact the capture solution (liquid film) interfacial area while traveling along a largely unimpeded pathway or channel for air travel, minimizing pressure drop. Said in another way, the less restricted air path created by the orientation of the mesh sheets lowers the differential pressure along the ATD. The mesh sheets, when positioned parallel with the direction of gas flow, maximize the gas-sorbent contacting efficiency for capturing $CO_2$ from dilute sources, such as air.

High gas velocity, solution properties and varying operating temperatures may affect the ability of the mesh sheet to maintain the uniform liquid film across the mesh pores (openings), a phenomenon referred to as liquid film stability. In some cases, significant liquid film instability can reduce the overall performance of the mesh packing, leading to reduced $CO_2$ capture. This issue may arise if the mesh pore size becomes too large to support the liquid film under the given operational conditions, such as the solution properties (surface tension, viscosity, etc.) and gas velocities. The potential increase in wetted area of mesh sheets with larger pore diameters, which increases wetted interfacial surface area and thus improves $CO_2$ mass transfer into the liquid, must be balanced against the risk of destabilizing the liquid film, which can lead to reduced wetted interfacial area for the given operational conditions. To better achieve this balance, the configuration of either hydrophilic or hydrophobic mesh material for capture of $CO_2$ from dilute sources is optimized to maintain maximized mass transfer in respect to the size of the mesh pores and the DAC operational conditions. In some cases, mesh sheets with a range of pore sizes, if selected to handle the operational conditions, can have significantly greater wetted interfacial area and lower pressure drop than a similar volume of packing material commonly used in DAC applications, for example the packing or fill commonly employed in the cooling tower industry.

The mesh packing, when combined with the liquid distribution according to the present disclosure, can reduce the sorbent flow rate requirements, while still providing uniform liquid distribution throughout sheet height and length. In some cases, the liquid distribution system can include one or more nozzles that are operable to apply a spray or mist of capture solution on the mesh sheet. Liquid can be applied at the top of the mesh sheet or at any point along the mesh sheet (for example, to wet dry spots). Given that the mesh sheet surface defines the gas channel and is porous, it does not form a significant impediment for airflow (especially in comparison to packing arrangements where the airflow travels through the packing block rather than co-linearly along a planar surface), the mesh packing and method of operation disclosed herein significantly reduces pressure drop for a given air velocity and ATD, which in turn also reduces the power required to operate the system. Thus, in some implementations, the primary direction of airflow through the gas channel is along a surface of the mesh sheet, it being understood that some residual and a comparatively minor volume of air will travel through the mesh sheet in view of the porous nature of the mesh sheet.

In some implementations, the mesh packing is operated with a liquid distribution system configured for continuous and/or intermittent flow of capture solution over the mesh packing, wherein the intermittent flow may be provided in a series or cycle of varying flow rates, such as flush (higher) flows, no flows, and pulse (lower) flows, each for a discrete period of time. In some cases, this intermittent mode of liquid distribution over the packing is used to reduce or mitigate the formation of rivulet flow. As discussed above, at low liquid loading rates, the capture solution can tend towards a rivulet flow regime as it travels down packing. Poor or incomplete wetting of the mesh sheets caused by rivulet flow of capture solution may lead to lower mass transfer due to the reduced interfacial area per unit packing area. In some cases, the use of intermittent, flush and/or pulse flows may mitigate this issue.

The mesh packing can also provide significantly larger reactive surface area for a given volume, which may result in high degree of $CO_2$ capture from the air flow. The mesh sheet surface is exposed to a direct sorbent feed (for example, on a top edge of the mesh sheet or another area of the mesh sheet), which can result in uniform liquid sorbent distribution across the entire width of the mesh sheet. In this way, the mesh material can be completely wetted, avoiding any significant dry or unwetted sections.

DAC packing designs may aim to maximize and maintain the reactive gas-liquid interfacial area and increase the solution capture performance to maximize the absolute capture flux from the reactant gas (eq. 1), for example, by capturing ambient $CO_2$ without incurring a prohibitive energy or economic penalty. Though the solution kinetics dominate, as is consistent with two-film theory of mass transfer, the availability of $CO_2$ in solution for reaction is governed by the equilibrium solubility of $CO_2$ in the sorbent medium under the respective conditions as per Henry's constant (eq. 2). Therefore, in an optimal process condition, there would be no depletion of $CO_2$ concentration from the gas phase across the depth of the mesh packing (e.g., an infinite air velocity condition), and sorbent would have uniform capture rate throughout the gas-liquid contactor. However, in practice this is not the case, and the capture flux is driven by both the mass transfer kinetics as well as the depletion through the gas-liquid contactor system.

$$\text{Capture Flux}(\text{g/s}\cdot\text{m}^2) = \rho_{CO2} v_{air}\left[1 - \exp\left(\frac{-\varepsilon K_L SSAATD}{v_{air}}\right)\right] \quad \text{eq 1}$$

$$\text{Mass Transfer Coefficient}(\text{mm/s}) = K_L = H^{cc}\sqrt{D_{CO2}\cdot k_{OH}^{\infty}\cdot\{\text{OH}\}} \quad \text{eq 2}$$

Where:

$v_{air}$ Contactor air velocity [m/s]

ATD Air Travel Depth [m]

SSA Specific Surface Area [$m^2 \cdot m^{-3}$]

$\varepsilon$ Wetting fraction $\rho_{CO2}$ g/$m^3$ $K_L$ Mass Transfer Coefficient [mm/s]

$H^{cc}$ Henry solubility constant $D_{CO2}$ CO2 diffusivity [$mm^2$/s]

$k_{OH-}^{\infty}$ infinite dilution rate constant [$m^3 mol^{-1}$ $s^{-1}$]

{OH} Hydroxide concentration [kmol/$m^3$]

A model incorporating the above equations 1 and 2 can be used with the mesh packing designs of this disclosure to lead to optimized capture flux. For example, the method of operating a gas-liquid contactor to flow the dilute $CO_2$ gas stream co-linearly across the plane of a mesh packing surface, the mesh packing wetted with a capture solution having known solution properties, as described in a variety of embodiments within this disclosure, can be shown to support a reduction in pressure drop across the ATD of the packing, enabling an increase in gas velocity which in turn reduces the impact of the $CO_2$ capture gradient on overall performance.

The mesh packing with the features according to the present disclosure are designed in an embodiment for commercial DAC applications and as such have the ability to maximize $CO_2$ gas-liquid interfacial area per unit packing area for efficient capturing of $CO_2$ rom air while minimizing the mass of the mesh sheets and energy consumption. The mesh packing is designed to contain small openings for solution to bridge across and form a thin liquid bridge to generate interfacial area for reaction with $CO_2$ to occur. This may improve capture performance and also decrease the volume of material required for a given surface area of mesh packing.

FIG. 1 shows a schematic illustration of an example gas-liquid contactor 100. The gas-liquid contactor 100 is includes a frame 105, a housing 104, one or more top distribution basins 107, a plenum 114, a gas moving device (sometimes referred to herein as a fan or blower 102), a fan cowling 103, a bottom liquid collection basin 106, at least one section of mesh packing 101, and a control system 999. Referring to FIG. 1, the gas-liquid contactor 100 is a dual-cell, cross-flow air contactor because there are two sections of mesh packing 101 separated by the plenum 114, and air travels across the mesh packing 101 in a direction that is substantially perpendicular to the flow of liquid from the top distribution basins 107 to the bottom liquid collection basin 106. As described in greater detail below, other configurations of the gas-liquid contactor 100 are possible. The mesh packing 101 can be shaped to conform to the shape of the gas-liquid contactor and can be sized to fit within the frame 105 and the housing 104. In some cases, the gas-liquid contactor can include a cylindrical or conical housing. The term "basin" is used throughout the present disclosure, but any fluid-containing receptacle can be used. Some non-limiting examples include tanks, culverts, and troughs.

Referring to FIG. 1, the frame 105 (e.g., a combination of interconnected structural members) provides structural support and stability to the gas-liquid contactor 100, and the housing 104 provides partial enclosure of the illustrated components. Referring to FIG. 1, the housing 104 defines a portion of the plenum 114, which is a hollow interior of gas-liquid contactor 100.

Referring to FIG. 1, the top distribution basin(s) 107 are formed into or positioned within the frame 105. Each top basin 107 may at least partially enclose or store a $CO_2$ capture solution 124 (e.g., a liquid sorbent). The $CO_2$ apture solution 124 can flow downwards from the top basins 107 by, for example, gravity flow, uniform or laminar flow, to the at least one section of mesh packing 101, flow along the planar surface of the mesh packing 101, and eventually flow into the one or more bottom collection basins 106. The gas-liquid contactor 100 can include a liquid distribution system 109. Liquid distribution system 109 can include a set of nozzles, the distribution basin 107 (also referred to as the top basin), a pressurized header, or a combination thereof, configured to distribute $CO_2$ capture solution 124 onto packing 101. For example, the top basin 107 can hold the $CO_2$ capture solution 124 and nozzles that are positioned at the floor of the top basin 107 can flow the $CO_2$ apture solution 124 onto the at least one section of mesh packing 101. The $CO_2$ capture solution 124 can flow through the at least one section of mesh packing 101 via gravity and then be collected in the collection basin 106 (also referred to as the bottom basin). Other example embodiments of liquid distribution systems 109 are described below.

As the $CO_2$ capture solution 124 circulates through and over the at least one section of mesh packing 101 in a dominant liquid flow direction, $CO_2$ laden air 120 is flowing (e.g., by action of the fan or blower 102) through the at least one section of mesh packing 101 in a dominant gas flow direction that is substantially orthogonal to the dominant liquid flow direction to thereby contact the $CO_2$ capture solution 124. By contacting these two fluids in a crossflow, as depicted in FIG. 1, a portion of the $CO_2$ within the $CO_2$ laden air stream 120 is transferred to the $CO_2$ capture solution 124, and the fan 102 positioned in fan cowling 103 moves the $CO_2$-lean air stream 130 out of the gas-liquid contactor 100 to an ambient environment. A $CO_2$ rich solution flows into the at least one collection basin 106, and one or more pumps recirculate at least a portion of the $CO_2$ rich solution 124 back into at least one top distribution basin 107. The term "air" in the expression "$CO_2$ laden air" does not limit the mesh packing 101 to being used only for processing atmospheric air. Other gases may flow through the mesh packing 101 as well. In some implementations, as depicted in FIG. 1, the fan 102 is an induced draft fan which pulls air through the at least one section of mesh packing 101. In some cases, the fan 102 is a forced draft fan which pumps or pushes air through the at least one section of mesh packing 101. In some implementations, gas-liquid contactor 100 can include an induced draft blower or forced draft blower. In some cases, the $CO_2$ apture solution 124 is provided to the at least one section of mesh packing 101 at a liquid loading rate ranging from 1 L/min to 4 L/min.

The bottom basins 106 of the gas-liquid contactor 100 act as collection tanks for the $CO_2$ rich capture solution 124. In some implementations, at least a portion of the solution can be sent, using either a slipstream from the recirculation pump system or a separate pump and piping system, downstream to other units or facilities for further processing. In an embodiment, some or all of the $CO_2$ rich capture solution flows from the gas-liquid contactor 100 to downstream units for additional processing. For example, the $CO_2$ capture solution 124 can be regenerated and some or all of the absorbed $CO_2$ can be recovered from the $CO_2$ rich solution. The regenerated $CO_2$ capture solution 124 can be sent back to the gas-liquid contactor 100.

In some implementations, rather than the dual cell crossflow configuration depicted in FIG. 1, the gas-liquid contactor system 100 may consist of one or more gas-liquid contacting cells, each having one or more fans, similar to larger industrial cooling tower systems. Some non-limiting examples of other possible configurations for the gas-liquid contactor system 100 are described with reference to FIGS. 1A and 1B.

Figure 2:
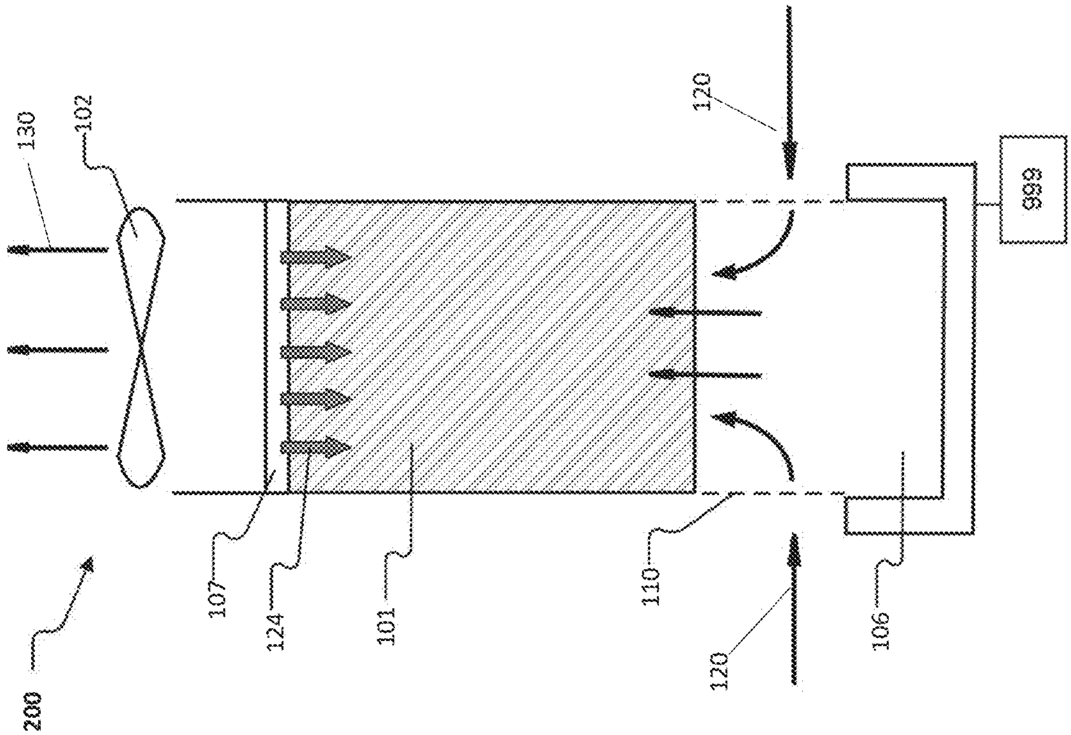
FIG. 2 shows a schematic illustration of an example counterflow gas-liquid contactor.

Referring to FIG. 2, the gas-liquid contactor system 200 is an upright body. The gas-liquid contactor system 200 has an air inlet 110 along a bottom portion through which the $CO_2$ laden air 120 is admitted into the gas-liquid contactor system 200. The fan 102 rotates about a fan axis to draw the $CO_2$ laden air 120 through the air inlet 110 in an upward direction to contact the section of mesh packing 101. In the configuration of FIG. 2, the gas-liquid contactor system 200 has only one section of mesh packing 101 and may therefore be referred to as a "single cell" gas-liquid contactor system 200. The $CO_2$ capture solution 124 circulates downwards by, for example, gravity flow, uniform or laminar flow, etc., within the mesh packing 101 and eventually flows into one or more bottom collection basins 106. As the $CO_2$ capture solution 124 circulates through and over the mesh packing 101, the $CO_2$ laden air 120 is flowing (e.g., by action of the fan 102) upwardly through the mesh packing 101 to thereby contact the $CO_2$ capture solution 124. Thus, the flow of $CO_2$ capture solution 124 through the mesh packing 101 in FIG. 2 is counter-current or counter to the flow of the $CO_2$ laden air 120 through the mesh packing 101. A portion of the $CO_2$ within the $CO_2$ laden air stream 120 is transferred to (e.g., absorbed by) the $CO_2$ capture solution 124, and the fan 102 moves the $CO_2$ lean air stream 130 out of the gas-liquid contactor 200 to an ambient environment. The $CO_2$ rich solution flows into the at least one collection basin 106.

Figure 3:
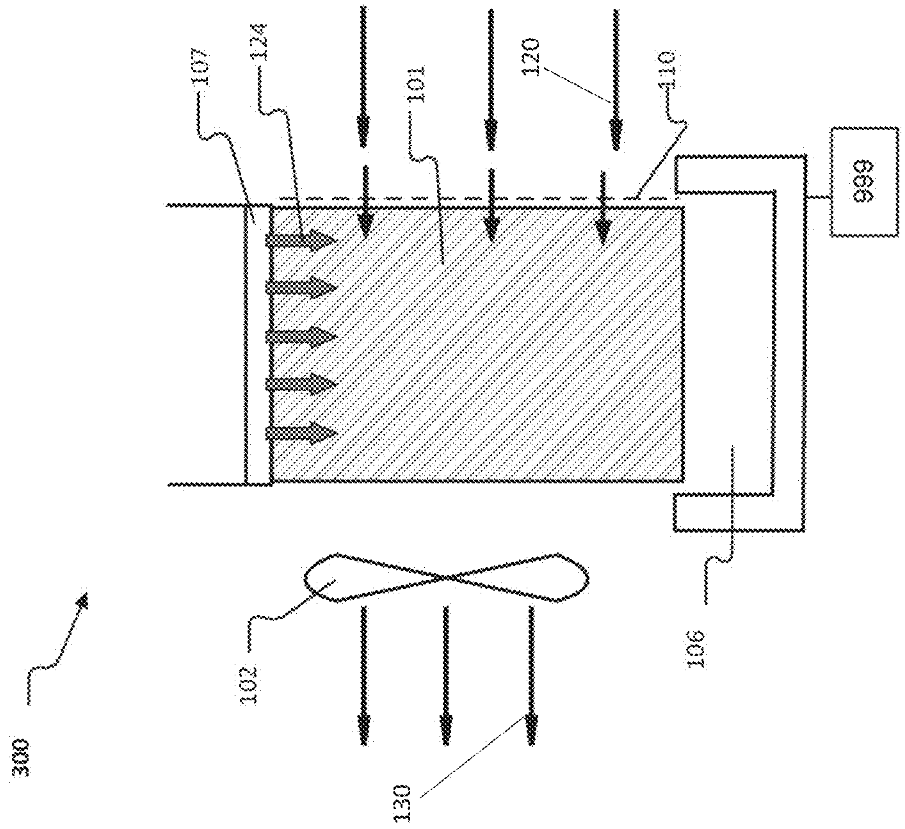
FIG. 3 shows a schematic illustration of an example crossflow gas-liquid contactor.

Referring to FIG. 3, the gas-liquid contactor system 300 is an upright body. The gas-liquid contactor system 300 has an air inlet 110 along an upright side portion through which the $CO_2$ laden air 120 is admitted into the gas-liquid contactor system 300. The fan 102 rotates about a fan axis to draw the $CO_2$ laden air 120 through the air inlet 110 in a substantially horizontal direction to contact the section of mesh packing 101. In the configuration of FIG. 3, the gas-liquid contactor system 300 has only one section of mesh packing 101 and may therefore be referred to as a "single cell" gas-liquid contactor system 300. The $CO_2$ capture solution 124 circulates downwards by, for example, gravity flow, uniform or laminar flow, etc., within the mesh packing 101 and eventually flows into one or more bottom collection basins 106. As the $CO_2$ capture solution 124 circulates through the mesh packing 101, the $CO_2$ laden air 120 is flowing (e.g., by action of the fan 102) substantially horizontally through the mesh packing 101 to thereby contact the $CO_2$ capture solution 124. Thus, the flow of $CO_2$ capture solution 124 through the mesh packing 101 in FIG. 2 is substantially perpendicular to the flow of the $CO_2$ laden air 120 through the mesh packing 101. Such a configuration of the flows may be referred to as a "cross flow" configuration. A portion of the $CO_2$ within the $CO_2$ laden air stream 120 is transferred to the $CO_2$ capture solution 124, and the fan 102 moves the $CO_2$-lean air stream 130 out of the gas-liquid contactor 300 to an ambient environment. The $CO_2$ rich solution flows into the at least one collection basin 106. While in embodiments one or more sections of mesh packing 101 are shown having substantially upright orientations (i.e., defining a plane that has an upright orientation), one or more sections of mesh packing 101 may having substantially horizontal orientations (i.e., defining a plane that has a horizontal orientation). Similarly, one or more sections of mesh packing 101 may have orientations that form non-zero angles with a vertical plane and/or a horizontal plane.

Referring to FIG. 1, the example gas-liquid contactor system 100, as well as other example implementations according to the present disclosure, include process streams (also called "streams") within a gas-liquid contactor system used to capture $CO_2$. The process streams, as well as downstream process streams, with which the gas-liquid contactor systems are fluidly coupled, can be flowed using one or more flow control systems (e.g., control system 999) implemented throughout the system. A control system 999 can include one or more flow pumps, fans, blowers, or solids conveyors to move the process streams, one or more flow pipes or conduits through which the process streams are flowed and one or more valves to regulate the flow of streams through the pipes. Each of the configurations described herein can include at least one variable frequency drive (VFD) coupled to a respective pump that is capable of controlling at least one inlet liquid flow rate or at least one outlet liquid flow rate. In some implementations, liquid flow rates are controlled by at least one flow control valve.

In some embodiments, a flow control system 999 can be operated manually. For example, an operator can set a flow rate for each pump or transfer device and set valve open or close positions to regulate the flow of the process streams through the pipes in the flow control system 999. Once the operator has set the flow rates and the valve open or close positions for all flow control systems 999 distributed across the system, the flow control system can flow the streams under constant flow conditions, for example, constant volumetric rate or other flow conditions. To change the flow conditions, the operator can manually operate the flow control system 999, for example, by changing the pump flow rate or the valve open or close position.

In some embodiments, the flow control system 999 can be operated automatically. For example, the flow control system 999 can be communicably coupled to a computer or a computer-readable medium storing instruction (such as flow control instructions and other instructions) executable by one or more processors to perform operations (such as flow control operations). An operator can set the flow rates and the valve open or close positions for all flow control systems 999 distributed across the facility using the control system 999. In such embodiments, the operator can manually change the flow conditions by providing inputs through the control system 999. Also, in such embodiments, the control system 999 can automatically (that is, without manual intervention) control one or more of the flow control systems, for example, using feedback systems connected to the control system 999. For example, a sensor (such as a pressure sensor, level sensor, flow rate sensor, temperature sensor or other sensor) can be connected to a pipe through which a process stream flows. The sensor can monitor and provide a flow condition (such as a pressure, temperature, or other flow condition) of the process stream to the control system 999. In response to the flow condition exceeding a threshold (such as a threshold pressure value, a threshold temperature value, or other threshold value), the control system 999 can automatically perform one or more operations. For example, if the pressure or temperature in the pipe exceeds the threshold pressure value or the threshold temperature value, respectively, the control system 999 can provide a signal to the pump to decrease a flow rate, a signal to open a valve to relieve the pressure, a signal to shut down process stream flow, or other signals. For example, if a flow rate sensor that monitors the gas velocity at the inlet or in the mesh packing reads that the gas velocity is above a threshold gas velocity value, the flow rate sensor can send a signal to a controller in the control system 999 that instructs a fan to reduce the fan speed.

In another example, control system 999 can be communicably coupled to a variable frequency drive (VFD) pump and a liquid distribution system that responds to a controller in the control system 999. If a flow rate sensor reads that the liquid loading rate (flow rate of capture solution to the mesh packing) is above a threshold flow rate value, the flow rate sensor may send a signal to a controller in the control system 999 to reduce the rotational speed of the motor in VFD pump and thereby reducing liquid loading to the mesh packing. In another example, control system 999 can be communicably coupled to a control valve and nozzles distributing liquid to the mesh packing. If a flow rate sensor reads that the liquid loading rate is above a threshold flow rate set point value, a signal is sent to the control valve to partially close and reduce the flow rate.

Figure 4:
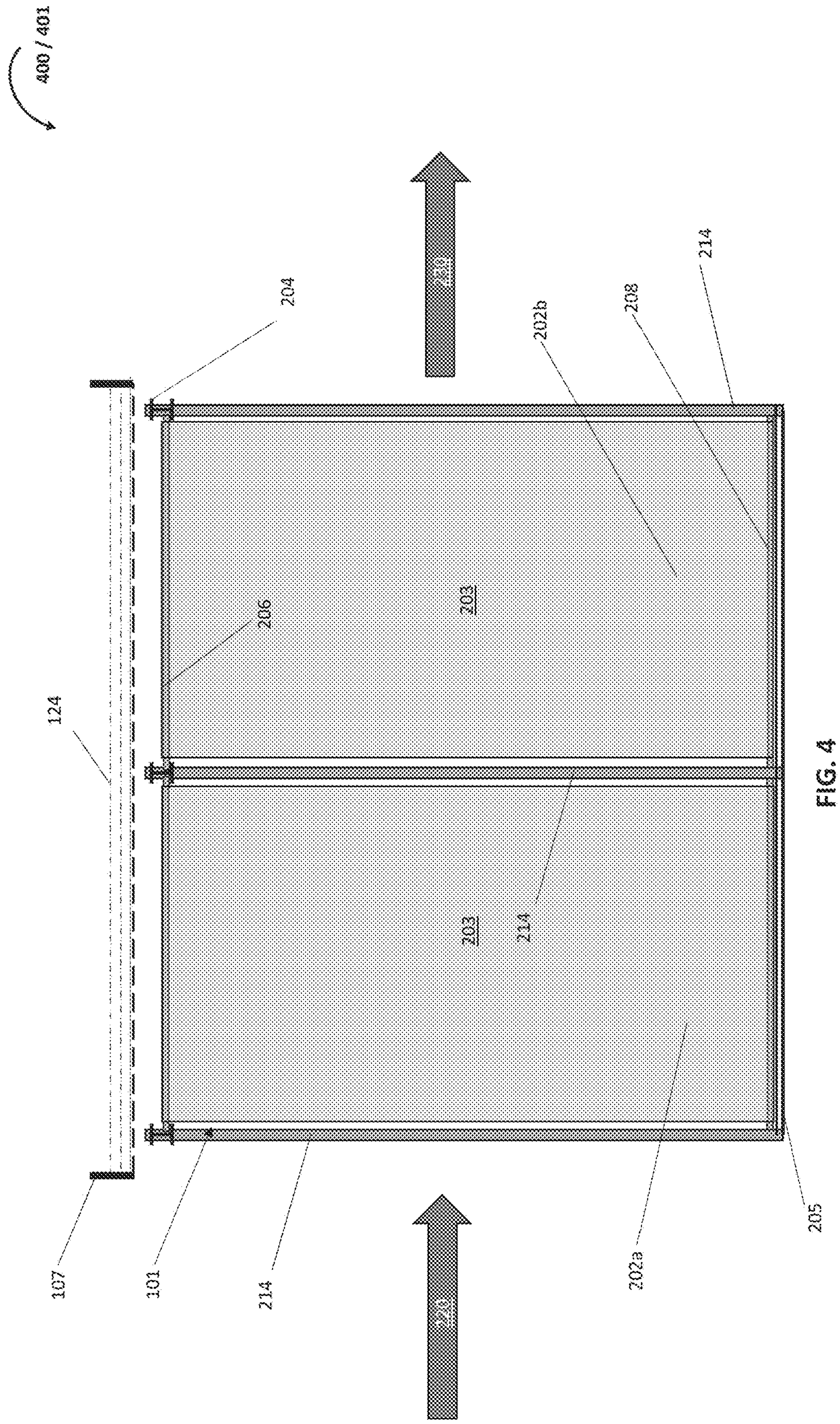
FIG. 4 shows a schematic illustration from an elevation view of an example mesh packing and support system.

Referring to FIG. 4, the gas-liquid contactor 400inc1udes a structural support system 401 for the at least one section of mesh packing 101. The structural support system 401 includes one or more support rods, support beam 204, top spacer(s), bottom spacer(s), at least one air inlet area for the $CO_2$ laden air stream 220 and at least one outlet area for the $CO_2$-lean air stream 230. The one or more support rods includes a first subset of rod(s) (also referred to a top rod 206) and a second subset of rod(s) (also referred to as a bottom rod 208). The use of the term "top" in top rod and the term "bottom" in bottom rod does not limit the rod to a particular position relative to another element of the gas-liquid contactor 400. There may be another element positioned above top rod 206 and/or below bottom rod 208. The mesh packing 101 includes multiple mesh panels 202*a*, 202*b* (two are shown in FIG. 4, but more are possible). Each mesh panel 202*a*, 202*b* is a segment of the mesh packing 101 that includes, or is composed of, a mesh material 203. The mesh material 203 may take any suitable form. For example, in an implementation, the mesh material 203 is a porous sheet (e.g. a screen), sometimes referred to herein as a "mesh sheet". In another possible example, the mesh material 203 is a rigid body with pores extending therethrough. The mesh material 203 is a porous body having a length and a width that is many orders of magnitude greater than its thickness or depth. The mesh material 203 of each mesh panel 202*a*, 202*b* is held by one or more of the top rods 206 and of the bottom rods 208 such that there is sufficient tension acting on the mesh material 203. For example, the mesh material 203 may have enough tension to form a planar surface. The tension of the mesh material 203 may be adjusted to adjust the flow properties of the $CO_2$ capture solution 124 or sorbent stream. Referring to FIG. 4, the top rods 206 are mounted on one or more support beam(s) 204 and are positioned to enable the $CO_2$ capture solution 124 or sorbent stream to flow from a distribution basin (such as distribution basin 107) onto a top portion of the mesh panels 202*a*, 202*b*. The support beam(s) 204 may have an orientation that is transverse or perpendicular to the orientation of the top rods 206. In the configuration of FIG. 4, the $CO_2$ capture solution 124 is introduced at the top of the mesh panels 202*a*, 202*b*. In an alternate configuration, the $CO_2$ capture solution 124 is introduced at a different location of the mesh panels 202*a*, 202*b*. In some cases, $CO_2$ capture solution 124 flows to the mesh panels 202*a*, 202*b* at a solution loading rate ranging from 1 L/min to 4 L/min.

Referring to FIG. 4, the mesh panels 202*a*, 202*b* and top rods 206 are not self-supporting. Additional structural support is therefore provided, such as the support beam(s) 204 and one or more support column(s) 214. These components can be coupled to one or more of the mesh panels 202*a*, 202*b* and the housing 104 (See FIG. 1). The support beam 204 may be supported at intermediate locations within the gas-liquid contactor frame 105, either through a rigid connection as shown in FIG. 4, or by use of cables, ropes, or wires. In some aspects, the support beams 204 can be coupled with top spacer(s), to maintain constant distance between the top rods 206 and the mesh material 203. In some aspects, the position of mesh material 203 with respect to the bottom rod(s) 208 is adjustable such that the mesh material 203 may be coupled to, in contact with, or spaced from the bottom rod(s) 208, for example to maintain a constant distance between the bottom rod(s) 208 and the top rods 206. In some aspects, spacing between the mesh material 203 of adjacent mesh panels 202*a*, 202*b* creates gas channels.

Referring to FIG. 4, the $CO_2$ laden gas stream 220 enters and flows across the mesh panels 202*a*, 202*b* in a co-linear direction. By "co-linear", it is understood that the $CO_2$ laden gas stream 220 flows along a direction that is parallel to a planar surface of the mesh material 203. For example, and referring to FIG. 4, the $CO_2$ laden gas stream 220 flows along a substantially horizontal direction, and the planar surface of the mesh material 203 is parallel to the plane of the drawing page showing FIG. 4. A liquid sorbent stream (such as the $CO_2$ capture solution 124) flows from the top of the mesh material 203, creating a liquid film across at least a portion of the pores of the mesh material 203. The $CO_2$ laden gas stream 220 and the $CO_2$ capture solution 124 come into contact in cross flow fashion, such that at least a portion of the $CO_2$ in the $CO_2$ laden gas stream 220 is absorbed into the $CO_2$ capture solution 124 before the airflow leaves the mesh panels 202*a*, 202*b* and is released from the gas-liquid contactor as the $CO_2$-lean air stream 230 through at least one outlet area.

Figure 5:
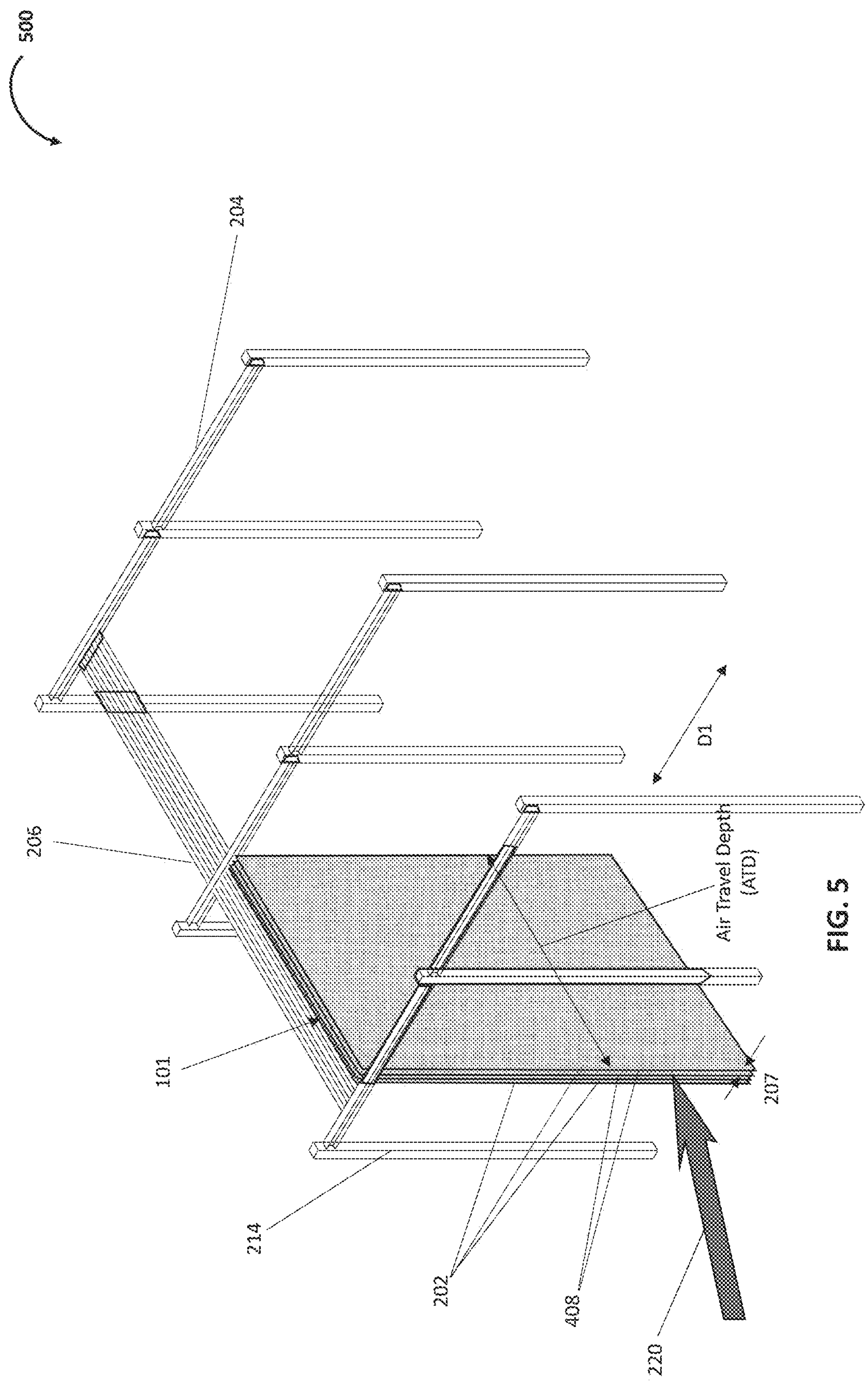
FIG. 5 is an orthogonal view of an example mesh packing and support system.

Referring to FIG. 5, the example of the structural support system 500 includes multiple top rods 206 supported on, and extending between, support beams 204. Each support beam 204 is supported by, and extends between, support columns 214. The illustrated section of mesh packing 101 includes multiple mesh panels 202. Each mesh panel 202 is supported by one of the top rods 206, and extends between adjacent support beams 204. The mesh panels 202 have an upright orientation. The mesh panels 202 can extend in a direction that is perpendicular to the ground. The $CO_2$ laden gas stream 220 flows along a direction that is parallel to a planar surface of the mesh material 203 of each mesh panel 202. For example, and referring to FIG. 5, the $CO_2$ laden gas stream 220 flows along a direction that is perpendicular to a normal vector of the plane of the mesh panel 202. Referring to FIG. 5, the $CO_2$ laden gas stream 220 flows along a second dimension defined along a direction that is parallel to the air travel depth ATD defined by each of the mesh panels 202, where the ATD is the distance of the mesh material 203 that is crossed by the airflow for the purposes of capturing $CO_2$ from the $CO_2$ laden gas stream 220. Referring to FIG. 5, the mesh panels 202 of the mesh packing 101 are spaced apart from each other. In the configuration of the mesh packing 101 of FIG. 5, the mesh panels 202 are spaced apart from each other in a horizontal direction, or in a direction that is transverse or perpendicular to the ATD. The spaced-apart mesh panels 202 define gas channels. For example, two adjacent mesh panels 202 are spaced apart along a first dimension. In the configuration of FIG. 5, the first dimension is a gas channel spacing 207 that corresponds to a width of a gas channel 408 between the two adjacent mesh panels 202. The gas channels 408 are described in greater detail below.

Figure 6:
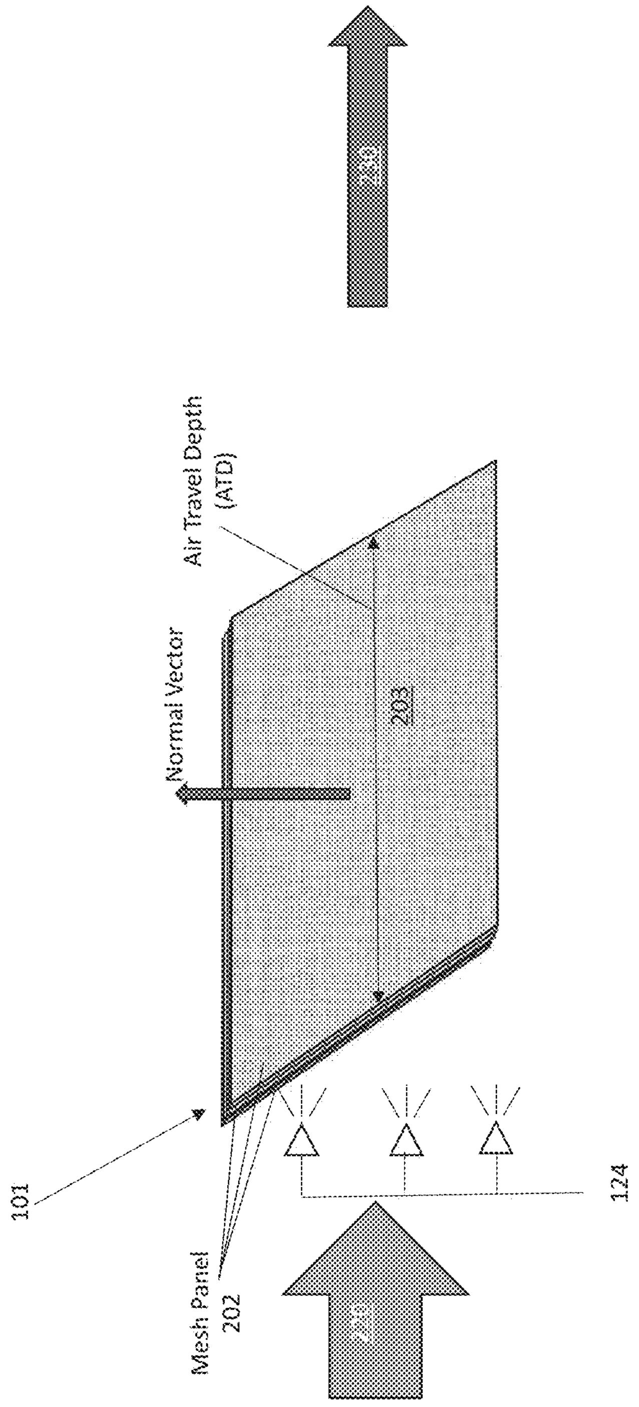
FIG. 6 is a perspective view of an example mesh packing including mesh panels positioned substantially horizontally.

Other configurations of the mesh packing 101 are possible. For example, and referring to FIG. 6, the mesh packing 101 has a substantially horizontal orientation, in that the planar surfaces formed by each mesh panel 202 are defined by a normal vector that has an upright orientation. The mesh panels 202 are stacked one above the other to form the mesh packing 101. The $CO_2$ laden gas stream 220 flows along a direction that is parallel to a planar surface of the mesh material 203 of each mesh panel 202. The $CO_2$ laden gas stream 220 flows along a direction that is parallel to the ATD defined by each of the mesh panels 202. A liquid sorbent stream, such as the $CO_2$ capture solution 124, flows from above the mesh material 203, creating a liquid film across at least some pores of the mesh material 203 of one or more mesh panels 202. In a "co-current flow" configuration, an example of which is shown in FIG. 6, the $CO_2$ capture solution 124 is conveyed into the mesh packing 101 along a direction that is parallel to the direction along which the $CO_2$ laden gas stream 220 flows. In such a configuration, the $CO_2$ capture solution 124 may be provided as a liquid-air mixture of fine particles (e.g., a mist provided by spraying, sparging, or cascading from one or more nozzles). In such a configuration, the $CO_2$ capture solution 124 may be provided as a spray via nozzles such that droplets of the $CO_2$ capture solution 124 are entrained in the $CO_2$ laden gas stream 220. Make up $CO_2$ capture solution 124 may be provided to the mesh panels 202 further along the ATD if needed or desired. Irrespective of its flow direction, the $CO_2$ capture solution 124 wets the mesh material 203 of one or more of the mesh panels 202. The $CO_2$ laden gas stream 220 comes into contact with the $CO_2$ capture solution 124 on the mesh material 203, such that at least a portion of the $CO_2$ in the $CO_2$ laden gas stream 220 is absorbed into the $CO_2$ capture solution 124 before the airflow leaves the mesh panels 202 and is discharged from the outlet of the gas-liquid contactor as the $CO_2$-lean air stream 230.

In some implementations, the mesh packing 101 (consisting of one or more mesh panels 202*a*, 202*b*) can be installed as separate multiple cells in a gas-liquid contactor 100 to further enlarge the gas-liquid surface in the existing frame size and housing of the gas-liquid contactor 100.

In some implementations, the mesh panels 202*a*, 202*b* are replaceable with a new or repaired mesh panels 202*a*, 202*b* if some part of the original mesh material 203 is damaged. In some cases, the mesh panels 202*a*, 202*b* may be detached from the rods 206, 208 when the rods 206, 208 are decoupled from the supporting beam 204.

The co-linear orientation of the mesh panel(s) 202*a*, 202*b* with the direction of airflow allows for a largely unimpeded pathway (or channel) for air travel, minimizing pressure drop. Said in another way, the less restricted air path, which is created by the orientation of the mesh panels 202*a*, 202*b* in parallel with the airflow, lowers the differential pressure along the ATD.

In some implementations, the mesh panels 202*a*, 202*b* are themselves structural components that can be utilized as internal support for near vertical solution film. In some cases, the type of weave pattern for the mesh material 203, which defines the pore shapes, can be configured to balance solution hold up and film flow along the mesh material 203. Additionally, a wider mesh weave has lower material density can minimize the mass of the mesh material 203 for a predetermined mesh area. In some implementations, there is a threshold mesh weave width for which the solution will no longer bridge across the fibers to create a continuous film.

For securing the sheets of mesh material 203 such that they have an evenly stretched (rigid) and tensioned surface, fasteners may be used. Some examples of the types of fasteners that may be used include glue, clamps, clips, netting fasteners, brackets or the same. In some cases, the tension of the mesh material 203 can be set with fasteners at a number of anchor points. In some cases, the weight of the rods, spacers, or a combination thereof provides sufficient tension for the mesh material 203. Sufficient tension can be achieved when movement of the mesh panels 202*a*, 202*b* is limited such that adjacent mesh panels 202*a*, 202*b* do not contact one another and impede airflow. In some cases, the support rods can be coupled to a tensioning frame that enables adjustment of the tension. For example, the tensioning frame can include a set of unistruts with expansion bolts that can be adjusted to move the rods to achieve the desired tension in the mesh material 203 which is threaded or secured to the rods.

In some cases, the mesh packing 101 is modular or compact and can be easily installed in existing gas-liquid contactors (or potentially cooling towers) without needing modifications. The mesh packing 101 may be installed above at least one bottom collection basin The mesh material 203 is selected to be compatible with the $CO_2$ capture solution 124. For example, the mesh material 203 can be compatible with capture solutions that have a high pH, hydroxide solutions (e.g., KOH, NaOH), bicarbonate/carbonate solutions, amine solutions, or combinations thereof.

In some implementations, a portion of or all of the mesh packing 101 and/or the structural support components are made of materials that do not significantly corrode, degrade or deteriorate in the presence of the process fluids, thus avoiding premature replacement of the gas-liquid contactor. For example, beams 204 and columns 214 can be made of wood, metal or plastic materials, while rods 206, 208 can be made of plastic or metal materials (e.g., PVC, acrylonitrile butadiene styrene (ABS), or other thermoplastics) and the mesh material 203 may include metal, PVC, polymer, plastic, or organic materials. In applications using strong alkaline chemistry, such as hydroxides, the wetted materials (e.g., the mesh material 203, the rods 206, 208, the beams 204, and the columns 214) can be selected to resist degradation caused by exposure to these solutions. In some cases, these materials may include stainless steel, plastics, PVC, HDPE, PTFE and the like.

In some implementations, the top and bottom support rods 206, 208 may be thin poles, straps, ropes, cables or the like to create a minimal gas channel while still accommodating direct sorbent flow, allowing for evenly distributed liquid film over the mesh material 203, and increased reactive interface or surface between the gas stream and sorbent.

Figure 7:
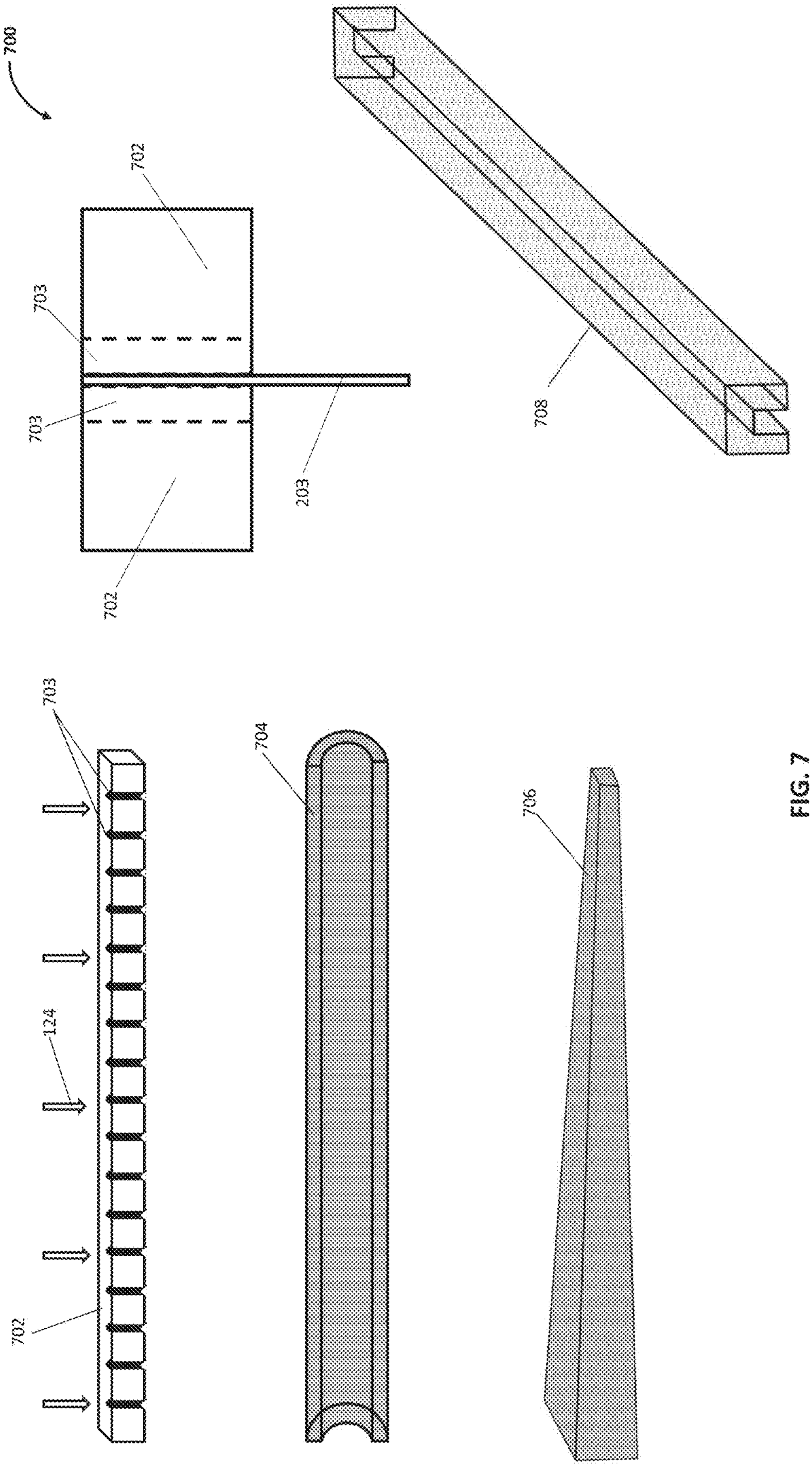
FIG. 7 shows example rod designs for a structural support system.
Figure 8A:
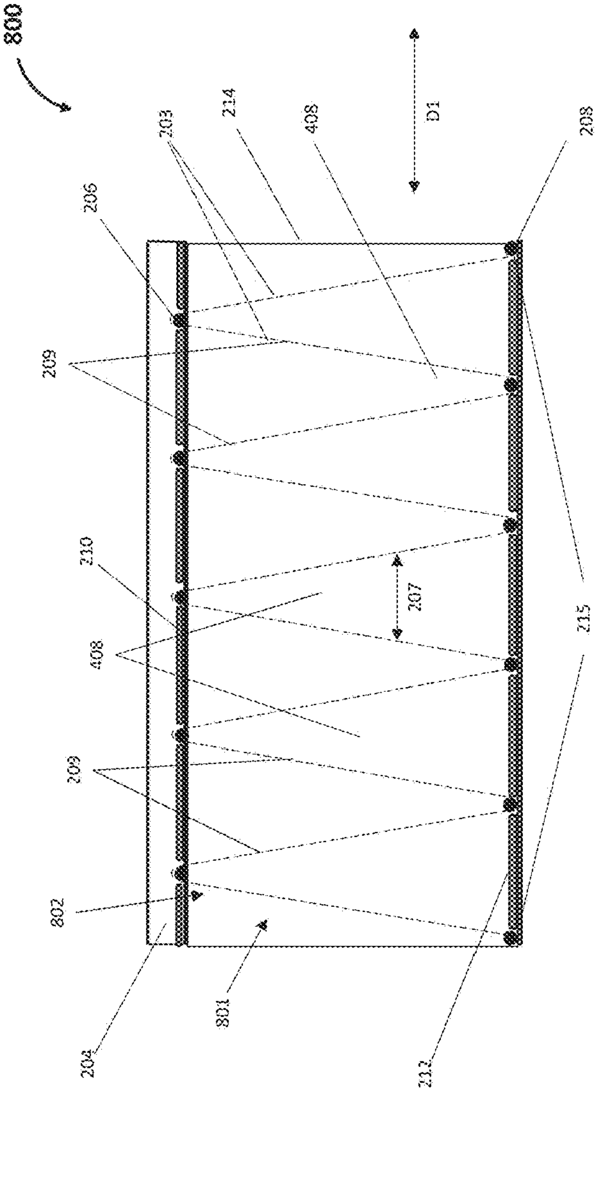
FIG. 8A shows a schematic illustration from a side elevation view of an example of mesh packing and support system
Figure 9:
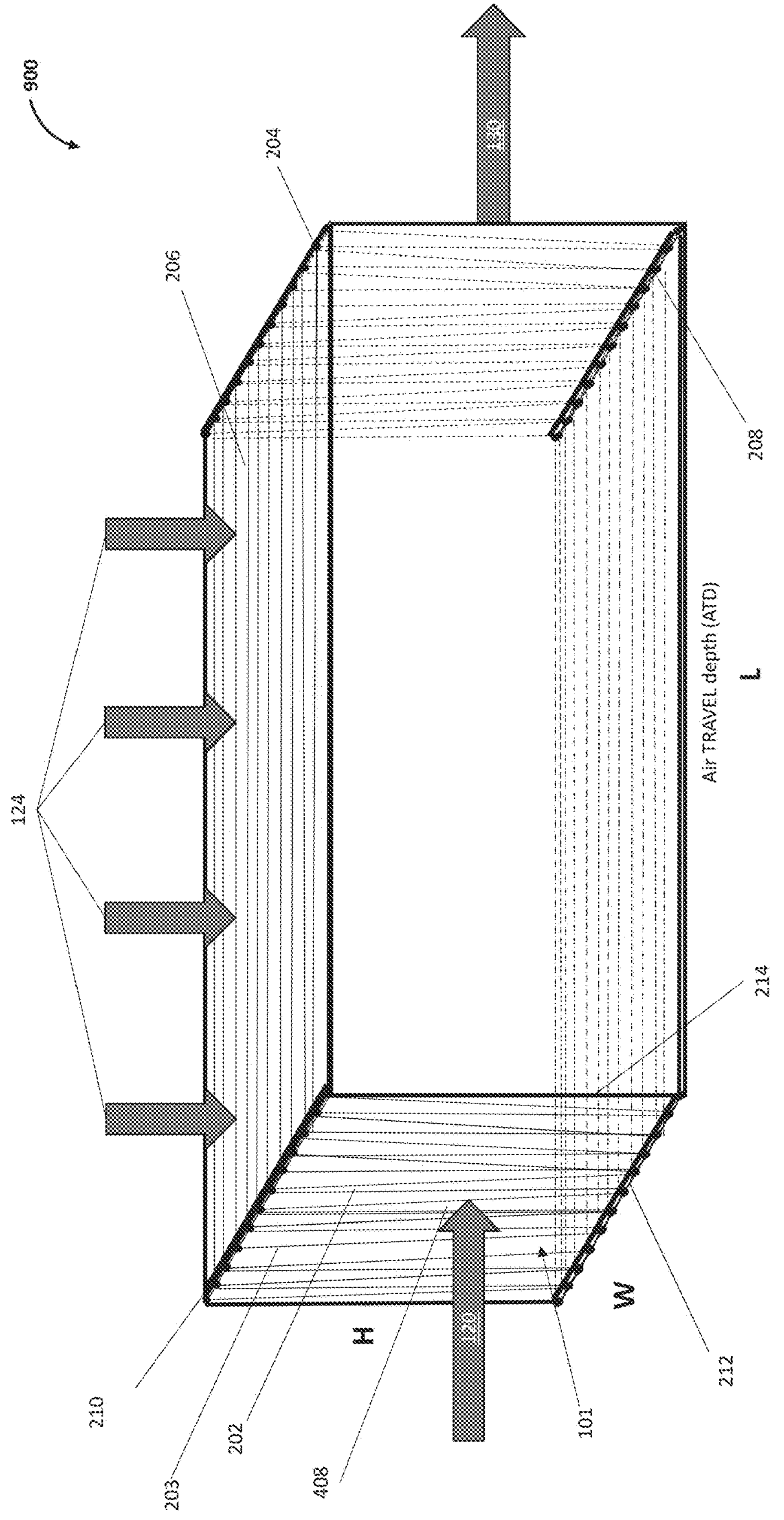
FIG. 9 shows a schematic illustration from a front elevation view of an example mesh packing and support system.

FIG. 7 shows example rod designs that can be implemented in structural support systems 800, 900 of FIGS. 8A and 9, respectively. In some implementations, the top rods can include a plurality of grooves 703 etched into them to form grooved rods 702, and the grooves 703 can direct the capture solution 124 onto the mesh material 203. The mesh material 203 can be held in between the grooved rods 702 such that the surfaces with the grooves 703 are facing one another. The grooves 703 allow capture solution 124 to flow down onto the mesh material 203. In some implementations, the top rods can be shaped or configured to interlock with one another. For example, the cross sections of the top rods 704 are C-shaped or bow-shaped, and the top rods 206 can interlock with one another. In some implementations, the cross sections of top rods are U-shaped, such as top rod 708, and can interlock with one another. In some implementations, the top rods can taper in thickness from one end to the opposite end, such as tapered rod 706. This can allow the mesh packing 101 to be more easily installed in certain gas-liquid contactors (e.g., gas-liquid contactor frames that are rounded or cylindrical). Any of the rod designs 700 can be implemented as rods or spacers in structural support systems 800, 900 shown in FIGS. 8A and 9, respectively.

FIG. 8A shows an example mesh packing 801 and structural support system 800. This system is similar to previous embodiments in that the structural support system 800 includes one or more top rods 206, one or more bottom rods 208, one or more support columns 214, and one or more support beams 204. The structural support system 800 of FIG. 8A includes one or more upper spacers 210 and one or more lower spacers 212. In some cases, the top support rods 206 and bottom support rods 208 are kept at a constant distance by using one or more upper spacer(s) 210 and lower spacer(s) 212, respectively. The spacers 210, 212 can provide lateral and torsional rigidity to the rods 206, 208. In some cases, the tension of the mesh material 203 can be set with anchor points 215. In some cases, the weight of the bottom rods 208, lower spacers 212, or a combination thereof provides sufficient tension for the mesh material 203. In some cases, the top support rods 206 and bottom support rods 208 can be coupled to a tensioning frame that enables adjustment of the tension. For example, the tensioning frame can include a set of unistruts with expansion bolts that can be adjusted to move the top support rods 206, the bottom support rods 208, or both to achieve the desired tension in the mesh material 203 which is threaded or secured to the rods. The spacers 210, 212 help to adjust a position of the mesh material 203, for example in order to maintain a constant distance between the rods 206, 208 and the mesh material 203. In some aspects, the position of mesh material 203 with respect to the rods 206, 208 is adjustable such that the mesh material 203 may be coupled to, in contact with, or spaced from the rods 206, 208, for example to maintain uniformity between adjacent mesh panels 202. In the configuration of the mesh packing 801 of FIG. 8A, the mesh packing 801 includes a single mesh panel 802. A single, continuous sheet of mesh material 203 is threaded through the top support rods 206 and bottom support rods 208 to form individual mesh panel segments 209 of the single mesh panel 802. Each mesh panel segment 209 is a portion of the continuous sheet of mesh material 203 defined between the top and bottom support rods 206, 208. The continuous sheet of mesh material 203 may be threaded around the top support rods 206 and bottom support rods 208 to form the total volume of the mesh packing 801.

The structural support system 800 also helps the formation of a variety of gas channels 408 between the mesh panel segments 209. Each gas channel 408 is a volume defined between adjacent and spaced-apart mesh panel segments 209, or is a volume defined between a mesh panel segment 209 and an internal wall of the housing 104 of the gas-liquid contactor 100. Referring to FIG. 8A, each pair of adjacent mesh panel segments 209 are spaced apart from each other in a first direction D1 to define a gas channel spacing 207 of each gas channel 408. The first direction D1 is transverse to the air travel depth ATD (see FIG. 5). The first direction D1 is defined in a plane that is normal to the air travel depth ATD. In the embodiment of FIG. 8A in which the mesh panel segments 209 have an upright orientation (e.g. a vector normal to the mesh panel segments 209 has a horizontal orientation), the gas channel spacing 207 is a width of the gas channel 408. In an alternate embodiment, such as where the mesh panel segments 209 have a horizontal orientation (e.g. a vector normal to the mesh panel segments 209 has an upright orientation), the gas channel spacing 207 (the first dimension) is a height of the gas channel 408. The gas channel spacing 207 may also be used to define other dimensions of the gas channel 408. Each mesh panel 202 delimits at least two gas channels 408, on opposite sides of the mesh panel segment 209.

Referring to FIG. 5, the air travel depth (ATD) is defined along a direction that is transverse to the gas channel spacing 207. Referring to FIG. 5, the air travel depth is defined in a plane that is normal to the gas channel spacing 207. Referring to FIG. 5, the air travel depth is defined in a plane that is perpendicular to a plane in which the gas channel spacing 207 is defined. In one possible configuration of the mesh packing 101 of FIG. 5 the mesh panels 202 have an upright orientation and the air travel depth (ATD) is less than three orders of magnitude greater than the gas channel width 207. For example, mesh panels having a width of 6 ft. and a height of 8 ft. may have gas channel widths of approximately 0.25 inches. Other dimensions of mesh panels and gas channel widths are possible. In one possible configuration, the air travel depth ATD is between one and two orders of magnitude greater than the gas channel width 207. In some implementations, the gas channel width may be 0.25 inches or greater. The use of the term "air" in "air travel depth ATD" does not limit the gas channels 408 to being used only for channeling air. Other gases may flow through the gas channels 408 as well.

In the configuration of the mesh packing 101 of FIG. 6 in which the mesh panels 202 have an upright orientation, each gas channel 408 has a length/depth defined in a direction that is parallel to the air travel depth, a width (i.e. gas channel spacing 207) defined in a direction that is perpendicular to the air travel depth, and a height defined in a direction parallel to the vertical.

The structural support system 800 of FIG. 8A may allow for the mesh panels 202 to have different shapes and angles by adjusting the offset of the top and bottom rods 206, 208, adjusting the spacing between adjacent rods 206, 208, adjusting the rod diameter/width, and/or adjusting the threading pattern, any one of which may in turn affect the shape, size and/or orientation of the gas channels 408. For example, the top rods 206 can be laterally offset from the bottom rods 208 such that laterally-adjacent mesh panels 802 are not parallel to each other. Alternatively, one or more of the mesh panels 802 may be offset at a non-zero angle from the vertical, which in turn changes the shape, or orientation from vertical, respectively, of the gas channels 408.

A cross-sectional shape of each gas channel 408 is defined in a plane that is perpendicular to the ATD. In an embodiment, an example of which is shown in FIG. 8A, the cross-sectional shape of each gas channel 408 is constant. In an embodiment, an example of which is shown in FIG. 8A, the cross-sectional areas of the cross-sectional shapes is the same for each gas channel 408. In an alternate configuration, the cross-sectional shape of the gas channels 408 for a given section of mesh packing 801 varies. Different cross-sectional shapes for the gas channels 408 are possible and within the scope of the present disclosure. For example, and referring to FIG. 8A, the configuration of the rods 206, 208 allows each gas channel 408 to have a cross-sectional shape which tapers toward either the top rod 206 or toward the bottom rod 208. The cross-sectional shape of the gas channels 408 may allow for a reduced liquid flow rate of the $CO_2$ capture solution 124, and the creation of a thin liquid film over at least one side of one or more of the mesh panels 802. In some cases, the configuration of the mesh panels 802 may allow for uniform distribution of the sorbent on both surfaces of the mesh material 203. Any suitable width for the gas channels 408 may be used. Some non-limiting examples of widths for the gas channels 408 includes between 0.01 inches and 6 inches. In some implementations, the maximum distance or width of the gas channels 408 is less than 6 inches. In an embodiment, an example of which is shown in FIG. 8A, the gas channel spacing 207 (e.g., gas channel width in FIG. 8A) decreases in a direction parallel to the distance between the rods 206, 208.

Figure 8B:
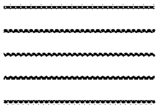
FIGS. 8B-8J depict different arrangements of gas channels for the mesh packing and support system of FIG. 8A.
Figure 8C:
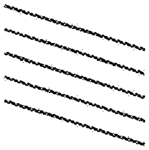
Figure 8D:
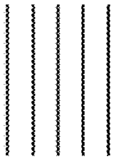
Figure 8E:
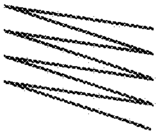
Figure 8F:
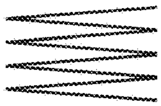
Figure 8G:
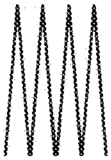
Figure 8H:
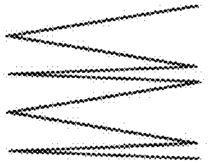
Figure 8I:
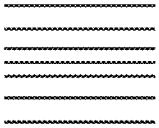
Figure 8J:
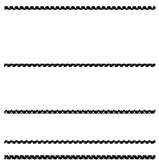

A variety of potential configurations of gas channels 408 are possible, which may be defined by the cross-sectional shape defined by the mesh panels 802. The cross-sectional shape of the gas channels 408 may be determined by the positioning and spacing of the top support rods 206 and bottom support rods 208, and the upper and lower spacers, 210 and 212, respectively. Non-limiting examples of cross-sectional shapes for the gas channels 408 include triangular, rectangular, or angled. Some examples are illustrated in FIGS. 8A-8J. For example, possible implementations can include gas channels 408 that have triangular cross-sectional shapes (as depicted in FIGS. 8A, 8E, 8F, and 8H.), parallel rectangular cross-sectional shapes (as depicted in FIGS. 8B, 8I, and 8J), offset triangular cross-sectional shapes (as depicted in FIG. 8E), parallel and angled rectangular cross-sectional shapes (as depicted in FIG. 8C). Horizontal configurations of cross-sectional shapes for the gas channels 408 are also possible with the inclusion of lateral support rods. Examples of horizontal cross-sectional shapes for the gas channels 408 are shown in FIG. 8G (horizontal triangular) and FIG. 8D (horizontal rectangular). In some implementations, gas channels 408 can have cross-sectional shapes that are non-parallel and angled and can form asymmetrical cross-sectional shapes. It is understood that this list is not exhaustive and there could also be combinations and permutations of these configurations that could be employed.

Referring to FIG. 9, the illustrated structural support system 900 is similar to previous embodiments in that it includes one or more top rods 206, one or more bottom rods 208, one or more support columns 214, one or more support beams 204, one or more upper spacers 210, one or more lower spacers 212 and one or more sheets of mesh material 203. The structural support system 900 is configured to enable threading of a single sheet of mesh material 203 around the top support rods 206 and bottom support rods 208 to form the total volume of the mesh packing 101. The structural support system 900 is also designed to enable formation of a variety of gas channel 408 shapes and angles, by adjusting the offset of the top and bottom rods, spacing between adjacent rods, rod diameter/width, and/or the threading pattern. Each gas channel 408 has a length defined in a direction that is parallel to the ATD, a width defined in a direction that is perpendicular to the ATD, and a height defined in a direction parallel to the vertical. A cross-sectional shape of each gas channel 408 is defined in a plane that is perpendicular to the ATD.

In some cases, the example mesh packing and support structural components may be positioned in a gas-liquid contactor below a liquid distribution system, one or more top basins, or a combination thereof.

In some implementations, the mesh panels 202 are formed from one single piece of mesh material 203 that can be threaded, sometimes in an alternating pattern, between offset top rods 206 and bottom rods 208 to tension the mesh panels 202 and to further provide an extended interfacial area. In some cases, securing the mesh material 203 such that it has an evenly stretched (rigid) and tensioned surface can be accomplished through use of fasteners. For examples, type of fasteners that can be used to secure the mesh material 203 are glue, clamps, clips, netting fasteners, brackets, or combination thereof.

In some cases, the single threaded mesh material 203 is easily replaceable with a new mesh sheet if some part of the mesh material 203 is damaged. The mesh material 203 can be taken off from the rods when decoupled from the supporting beam 204. In another possible configuration, each mesh panel 202 has its own mesh material 203, and each mesh panel 202 is individually mounted to the structural support system 401, 500, 800, 900.

In some implementations, the mesh packing 101 is designed to be compatible with manufacture at factories or manufacturer sites and to reduce the number of on-site fabrication that is required. The mesh packing 101 can be ready to install in a contactor housing 104 without a need for significant modifications. The mesh packing 101 reduced the amount of on-site The mesh packing 101 could also be installed in a contactor housing 104 designed to operate without existing structural elements of cooling towers. In some cases, the mesh packing 101 includes low-cost, light weight threaded mesh material 203, with long lasting structural integrity.

Figure 10:
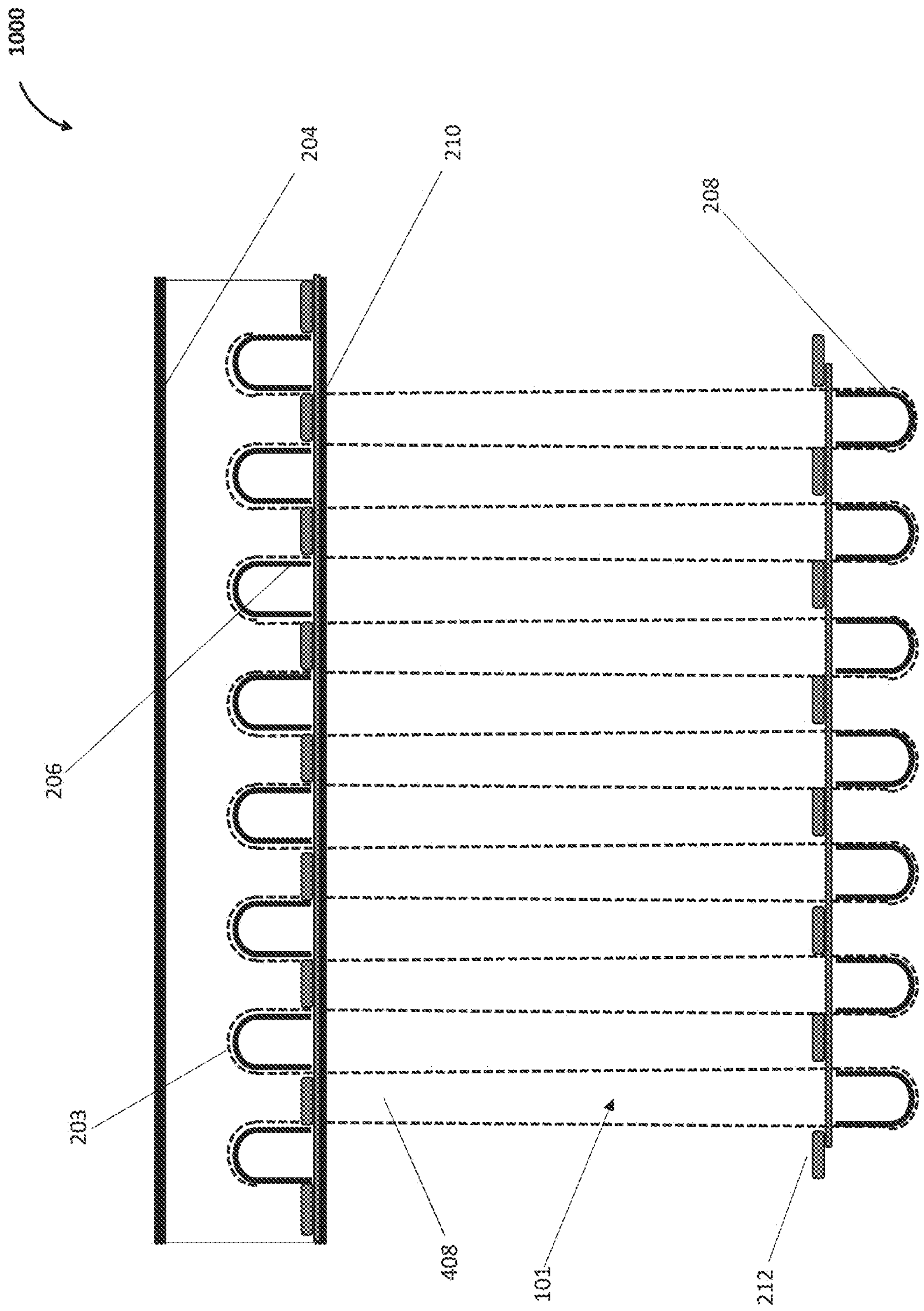
FIG. 10 shows a schematic illustration from an end view of an example mesh packing and support system.

FIG. 10 depicts a front elevation view of an example mesh packing 101 and structural support system 1000, viewed from an end of the mesh packing 101 where the $CO_2$ laden air stream 120, 220 enters the mesh packing 101. A single sheet of mesh material 203 is threaded across top support rods 206 and bottom support rods 208. In this implementation, one or more top support rods 206 are coupled to the support beam 204, and both the top rods 206 and bottom rods 208 are configured to enable ease of guiding and threading mesh material 203 through the support structure. The gas channels 408 have a substantially constant cross-sectional area and a substantially constant cross-sectional shape.

In some implementations, a top distribution basin may include one or more openings to introduce the liquid capture solution to the top of the mesh packing 101. The solution can be distributed to a partially enclosed space consisting of the top edges of one or more sheets of mesh material 203, support beams 204, top rods 206, and upper spacers 210. In some cases, the structural support system 1000 may be configured to evenly distribute the liquid capture solution over the mesh packing 101 and to maintain an optimal space between the gas channel(s) 408. The uniform distribution of the liquid capture solution over the mesh material 203 creates a thin film of solution that moves in a gravity flow.

In some cases, the sheet of mesh material 203 is threaded and alternated between offset top support rods 206 and lower support rods 208, as depicted in FIG. 10. The co-linear and parallel orientation of the mesh panels is in direction of airflow, and the structure of the mesh packing 101 is maintained by providing tension in the vertical direction to the sheet of mesh material 203.

In some implementations, the sheet of mesh material 203 requires direct tensioning in order to provide the required surface area for gas-liquid contact. In some cases, one edge of the mesh material 203 can be secured on a first top rod 206 and a second edge of the mesh material 203 can be secured on the further last top rod 206, or one edge of the mesh material 203 can be secured on a first bottom rod 208 and a second edge of the mesh material 203 can be secured on the further last bottom rod 208, or other similar combinations.

Ease of mesh sheet 203 installation and removal may be beneficial for large scale DAC deployment. The mesh packing 101 and the structural support system 1000 allows for delivery to site of large rolls of continuous sheets of mesh material 203. These rolls of mesh material can be threaded over and under the top rods 206 and bottom rods 208, respectively, anchored, and tensioned in place, allowing for simple installation (and replacement, when necessary if fouled or damaged). In some implementations, the roll of mesh material 203 can be cut to size (e.g., approximately to the height and width of the gas-liquid contactor inlet) to form a set of mesh panels, and each individual mesh panel can be secured to a top rod 206 and a bottom rod 208 by bolts, fasteners, glue, or another adhesive to form a segment. Maintenance of mesh packing 101 can be advantageous over conventional gas-liquid contactor designs. If a particular mesh panel, rod, or spacer is damaged (e.g., ripped, bent, detached), the segment that includes the damaged element can be isolated from other segments of the mesh packing and removed for repair without requiring significant handling of the other components of the gas-liquid contactor. For example, if a particular mesh panel is damaged, the damaged mesh panel can be accessed through the gas inlet or the plenum of the gas-liquid contactor and removed without necessitating opening of the housing. If the mesh panels are glued to the rods or spacers, the damaged mesh panel can be removed, repaired, and then reattached (e.g., by gluing or re-tensioning/rethreading the mesh material) to the rod or spacer. In contrast, for conventional packing, if a portion of the packing is damaged, the entire block or section of the conventional packing must be discarded. In comparison, for conventional gas-liquid contactor designs, maintenance or removing the mesh packing 101 generally requires shutdown of the entire unit.

In an embodiment, the mesh packing 101 is a unit which is pre-fabricated or pre-assembled offsite or away from the gas-liquid contactor 100, and which is mounted within the gas-liquid contactor 100 as a single unit, for installation, repair or replacement purposes. In one possible example of such a pre-fabricated mesh packing 101, the mesh packing 101 includes one or multiple sheets of mesh material 203 mounted to support structures to create the mesh panels 202 and the gas channels 408. The support structures may then be coupled to structures within the gas-liquid contactor 100 to mount the pre-fabricated mesh packing 101 within the gas-liquid contactor 100.

In some implementations, it can be advantageous to integrate the support system with the top basin (for example, to save on material costs by eliminating the need for a separate top basin). An integrated support system can reduce the number of steps to install a gas-liquid contactor on-site since a separate self-supporting top basin is excluded and therefore will not need to be installed. The top rods 206 and upper spacers 210 can form at least a portion of the floor of the top basin. For example, the top rods 206 and upper spacers 210 with intervening sheets of mesh material 203 can be pressed against one another to form the floor of the top basin. In some cases, the top rods 206, the upper spacers 210, the bottom rods 208, the lower spacers 212, or a combination thereof can be integrally formed with the sheets of mesh material 203. For example, the mesh material 203 can be coupled to the rods and spacers that form at least a portion of the top basin, and the entire structure can be dipped or coated in resin. After the resin has cured, openings can be formed (e.g., punched or drilled) for sorbent to flow from the top rods and upper spacers to the mesh material 203. This approach can lead to an integrally formed structure that integrates the mesh packing 101, support system 1000, and top basin together.

In some implementations, the mesh packing 101 and support system 1000 can include fiberglass-reinforced materials to increase rigidity while decreasing overall weight. For example, the top rods 206, the upper spacers 210, the bottom rods 208, the lower spacers 212, or a combination thereof can include a fiberglass core that is at least partially covered with a PVC coating. In some cases, coating the fiberglass with PVC can occur during manufacturing of the mesh material. For example, a fiberglass sheet that has pores can be dipped or coated in PVC, and then compressed air can be used to blow out the portion of the PVC covering the pores, thereby forming a PVC coated fiberglass mesh material 203. For example, the rods and spacers, which can include fiberglass material, can be attached to the mesh material and then the rods and spacers can be covered with PVC by vacuum forming or thermoforming. The PVC coating can join each of the rods, spacers, and the mesh material together to form an integrally formed structure.

In some cases, the fiberglass reinforced materials can be at least partially covered in a resin coating to produce an integrally formed mesh packing and support system. In some implementations, the PVC-coated or resin-coated fiberglass mesh material can be molded to include imprinted textures, such as those described in FIG. 18A and FIG. 18B.

In some implementations, the top rods 206 can directly interface with or be built into a liquid solution distribution system, which may include a series of troughs or other channels allowing the liquid solution to be evenly distributed along the length of the top surface of the mesh material 203 and flow down its surface. In some cases, this solution flow is continuous in nature. In some cases, the solution flow is pulsed at intervals to wet the mesh material, allowing for hold up and continued capture until a subsequent pulse replenishes the mesh material with fresh sorbent, flushing $CO_2$-rich sorbent to a lower collection basin, similar to one or more of the bottom collection basins 106 shown in FIG. 1.

In some implementations, the top rods 206 can include tubes or pipes that have evenly spaced openings that are sized to allow capture solution to flow to the mesh material 203. For example, the top rods 206 can include a pipe with openings that are 1/16 inch in diameter and spaced 1/8 inch apart along the length of the pipe. The tube or pipe can be configured to receive capture solution at one end and be "blank" or capped with a breather tube at the opposite end. The breather tube vents air out from the pipe while the pipe fills with capture solution. It can be advantageous to machine-form the openings to achieve a higher precision compared to manually-cut openings, as slight differences in the sizes, angles, and spacings of the openings can affect the overall flow pattern on the mesh material 203.

Figure 11:
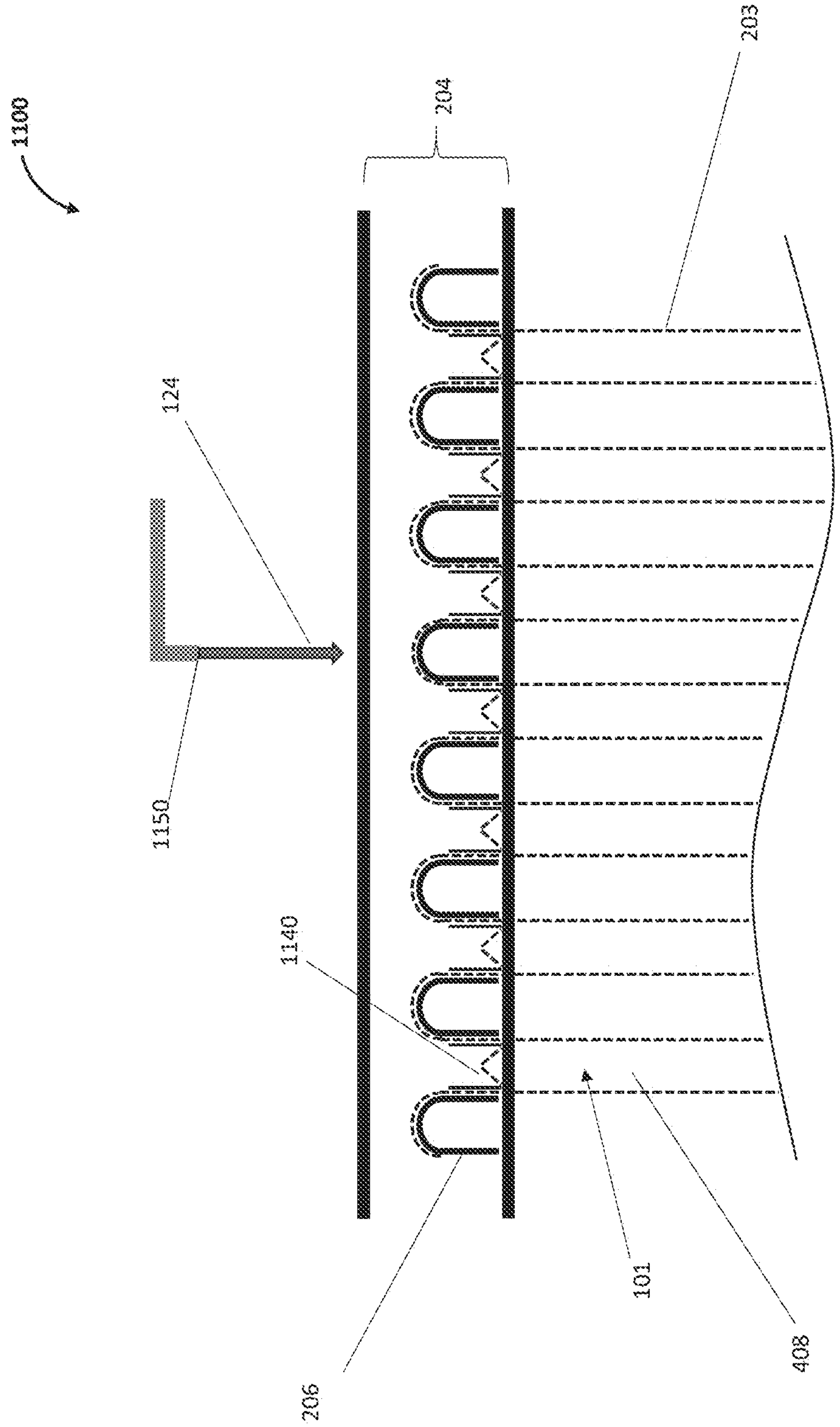
FIG. 11 shows a schematic illustration from a front elevation view of an example mesh packing support and liquid distribution system.
Figure 12:
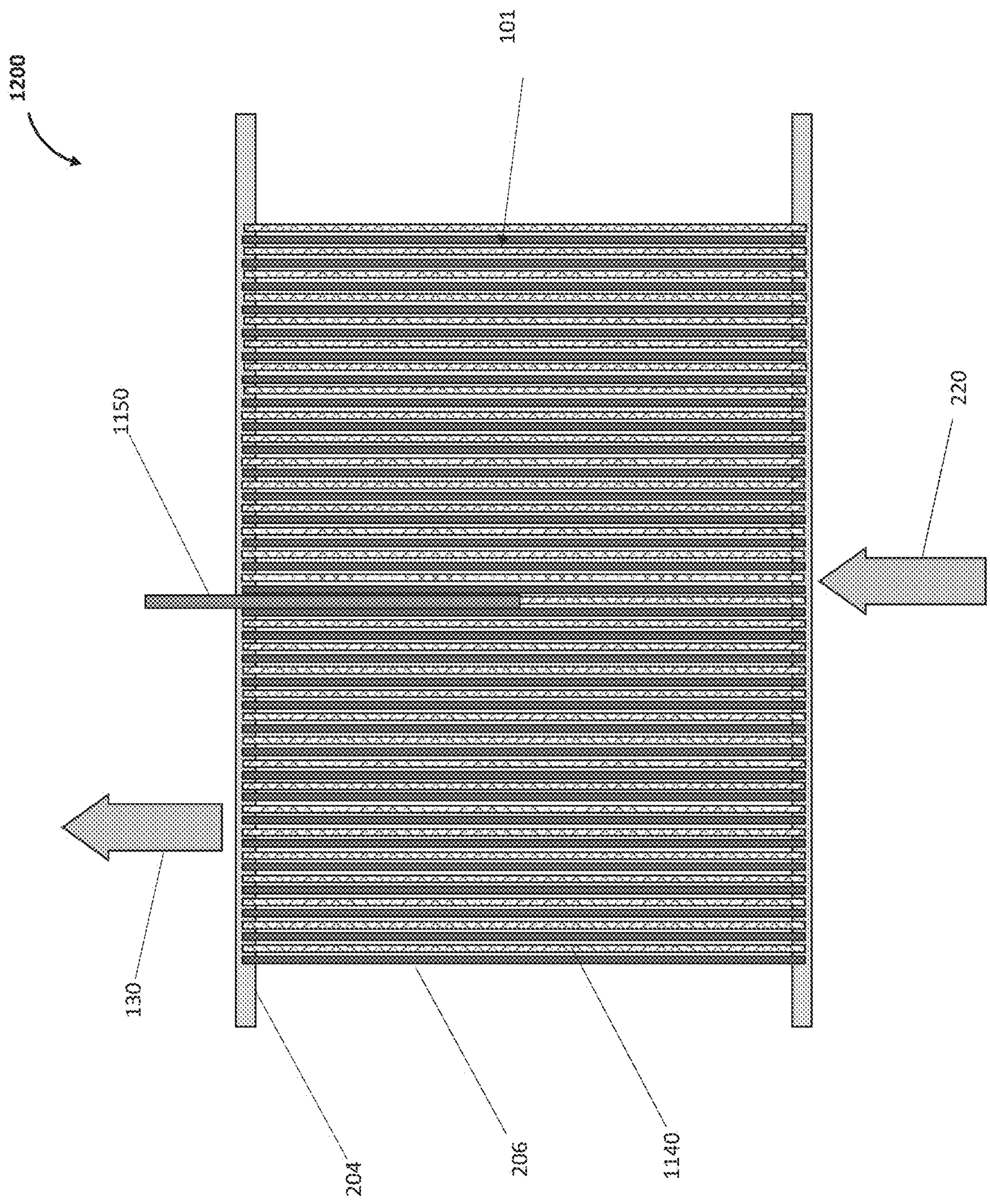
FIG. 12 shows a schematic illustration from a plan view of an example mesh packing support and liquid distribution system.

FIG. 11 and FIG. 12 show another example of the mesh packing 101 and a liquid distribution system 1100, 1200. Here, one or more sheets of mesh material 203 are threaded across top support rods 206 and bottom support rods. The liquid distribution system 1100, 1200 may include one or more liquid delivery pipes or conduits 1150 to introduce the liquid solution to the top of the mesh packing 101. The sorbent can be distributed to a partially enclosed space consisting of one or more of support beams 204, top support rods 206, and one or more liquid distribution facilitator devices (shown as distribution spacers 1140).

As can be seen in FIG. 11 and FIG. 12, one or more of the top spacers may be combined with, for example, a perforated or mesh structure material, creating a distribution spacer 1140. This distribution spacer 1140 is configured to further promote uniform distribution of the sorbent over the mesh material 203, in addition to providing secure spacing of the top support rods 206.

In some cases, one or more of the distribution spacers 1140, the top rod 206 and/or the support beam 204 is optimized receive the liquid sorbent 124 directly from the delivery conduit (e.g., pipe) 1150 and transfer it onto the mesh material 203, without using nozzles or atomized sprayers or other commonly known components for liquid distribution over packing.

Figure 13:
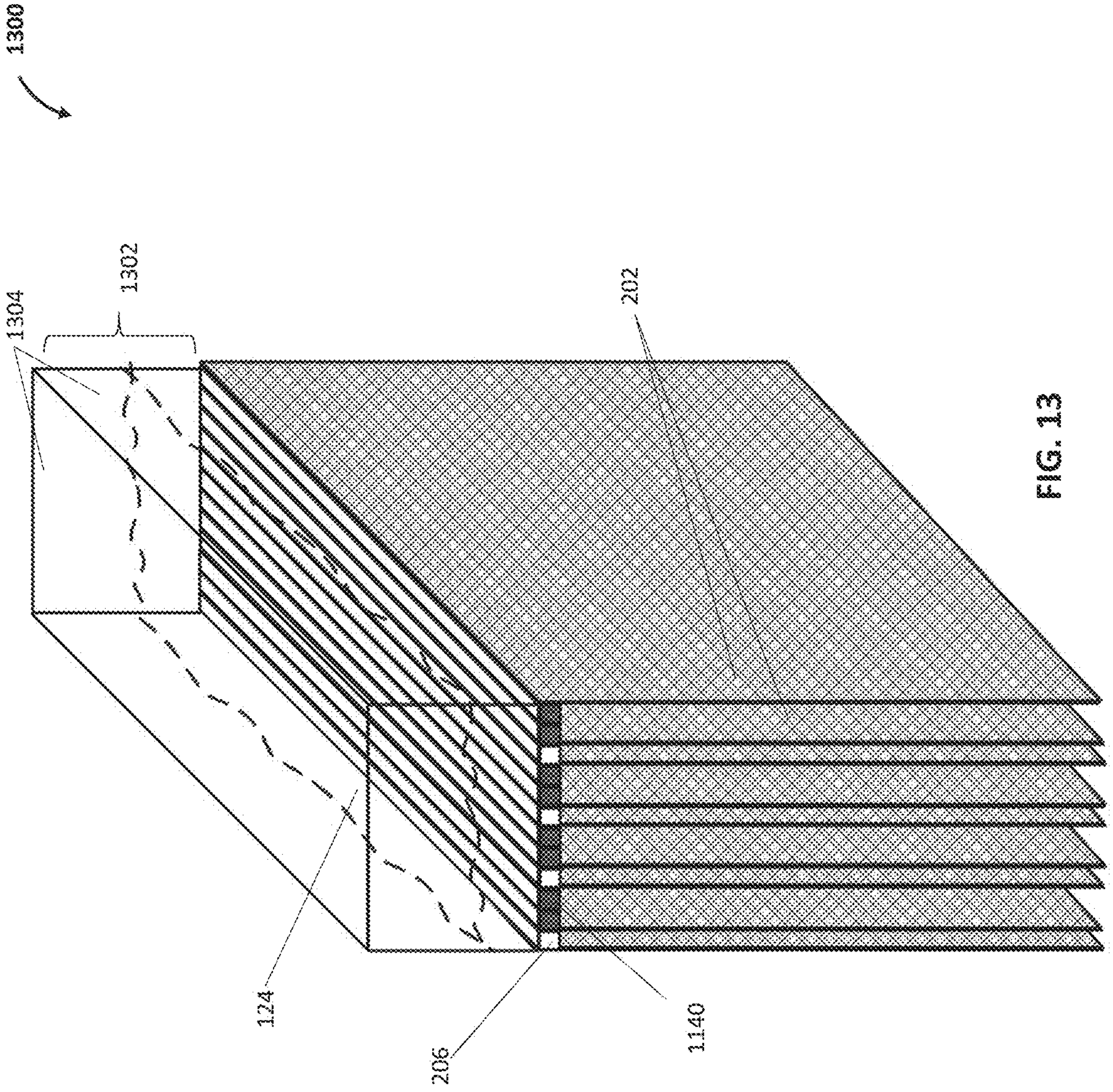
FIG. 13 shows an example integrated structural support system.

FIG. 13 shows an example integrated structural support system 1300. It can be advantageous to integrate the support system with the top basin to save on material costs by eliminating the need for a separate top basin. The top rods 206 and distribution spacers 1140 can form at least a portion of a floor of a top basin 1302. For example, the floor of the top basin 1302 can include top rods 206 and distribution spacers 1140 with intervening mesh panels 202 that are pressed against one another to form a portion or entirety of the floor of the top basin 1302. The top rods 206 and distribution spacers 1140 can alternate with one another. In some implementations, the pattern of alternating top rods 206 and distribution spacers 1140 can vary. For example, two top rods 206 can alternate with one distributions spacer 1140. In some implementations, gaps between top rods 206 and distribution spacers 1140 can be sized to achieve a certain liquid head (e.g., between 6 inches and 12 inches) in the top basin 1302 or to achieve a certain solution flow rate of the capture solution 124 onto the mesh panels 202. This ensures that there is sufficient capture solution 124 available to wet the mesh panels 202.

Spacing or gaps between the rods 206 can be selected to accommodate an air velocity ranging from 0 m/s to 2.5 m/s while maintaining a relatively low pressure drop (e.g., less than 0.2 inches water column (in. WC)). In some cases, for systems employing air velocities above 2.5 m/s, it can be advantageous for the mesh panels 202 to include a rigid or stiff material to mitigate damage or vibrations. In some cases, the top rods 206 can be spaced apart from one another by at least 1 inch.

The sides of top basin 1302 can be formed from a set of walls 1304 coupled to the support beam and top rods 206 and distribution spacers 1140. The set of walls 1304 can be sealed against one or more of the top rods 206 and/or distribution spacers 1140, which can form at least a portion of the floor of the top basin 1302, to reduce the amount of liquid bypass at the edges of the top basin 1302. Thus, edges where the sides of the top basin 1302 adjoin with the floor of the top basin 1302 are at least partially sealed to reduce liquid bypass of the capture solution 124.

In some cases, at least a portion of the floor of the top basin 1302 can exclude distribution spacers so that the floor is formed from only top rods 206 that are pressed against one another. One or more mesh panels 202 can be positioned to intervene between the top rods 206. The thickness of the mesh panel 202 between the top rods 206 can define a gap or opening between the top rods 206 that is sufficiently large to allow capture solution 124 to flow to the mesh panel 202. Gaps or openings between each of the top rods 206, defined by the thickness of the mesh panels 202, can be sized to achieve a particular solution flow rate (e.g., 1 L/min to 4 L/min).

In some cases, the bottom portion of the support system can have a symmetrical configuration to the top portion. For example, at least a portion of the bottom basin can be formed from bottom rods pressed against one another with intervening mesh material. In some implementations, the bottom portion of the support system can include bottom distribution spacers in between the bottom rods. Gaps or openings between the bottom rods, bottom distribution spacers, or a combination thereof can be sized to enable sufficient air flow with relatively low pressure drop. A collection basin or bottom basin can be positioned below the support system to collect capture solution from the mesh packing.

Referring to FIG. 11 and FIG. 12, in some cases, the liquid sorbent 124 passes through the distribution spacer(s) 1140 and spreads over the top portion of the mesh material 203. The uniform distribution of the liquid sorbent over the mesh material 203 creates a thin film of solution, which moves in a gravity flow.

In some cases, a combination of gravity and properties of the mesh material 203 itself will work to pull the solution to a lower basin (e.g., bottom basin 106 of FIG. 1). The sorbent 124 reacts with the inlet $CO_2$ laden air 220, capturing at least a portion of the $CO_2$ (which absorbs into the capture solution) and the resulting $CO_2$-lean air stream 130 leaves the mesh packing 101.

In some cases, one or more of the top rods 206 or the distribution spacer 1140, or a combination thereof may be configured to both evenly distribute the sorbent 124 over the mesh packing 101 and to maintain an optimal space between the gas channel(s) 408.

In some cases, the distribution spacers 1140 can be formed from a plurality of plastic tubes that have been compressed on one end to form a tapered shape. The distribution spacers 1140 can narrow in cross-section from one end to the opposite end, making them more easily installable in certain frameworks (e.g., frames that are rounded or cylindrical).

In some cases, the liquid distribution system 1100, 1200 is configured to allow solution flow to be either continuous in nature or pulsed at intervals to wet the mesh material 203. In some cases, the pulsed flow allows for sufficient hold up and continued capture until a subsequent pulse replenishes the mesh material 203 with fresh sorbent, flushing $CO_2$-rich sorbent to a lower collection basin (such as bottom basin 106 shown in FIG. 1). In some cases, this configuration allows for continuous, but significantly lower, liquid flow rates, which also works to reduce associated liquid distribution capital and operational costs.

As discussed above, two general wetting techniques, a bridging technique and a capillary technique, are possible when using aqueous-based liquid capture sorbents, which are dictated by the material characteristics of the fibers of the mesh material 203 making up a mesh packing 101. The bridging technique, described in more detail in reference to FIG. 14, occurs when the mesh material 203 is more hydrophobic in nature, and results in solution bridging between the fibers. The capillary technique, described in more detail in reference to FIG. 15, occurs when the fibers of the mesh material 203 are more hydrophilic in nature. Using the capillary action technique, rather than solution bridging, draws solution along the fiber surface.

Figure 14B:
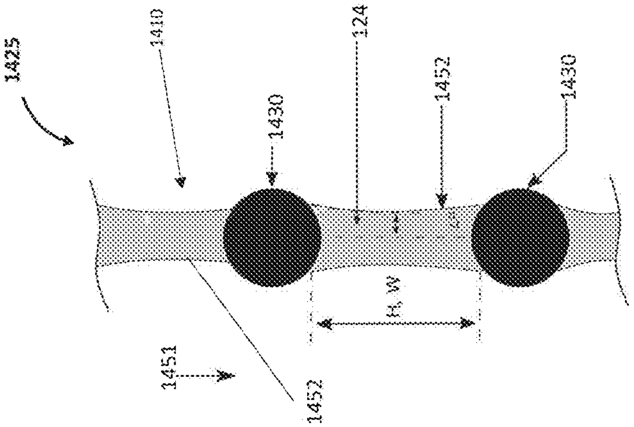
FIGS. 14B and 14C depict liquid distribution techniques for the example hydrophobic mesh sheet of FIG. 14A.
Figure 14C:
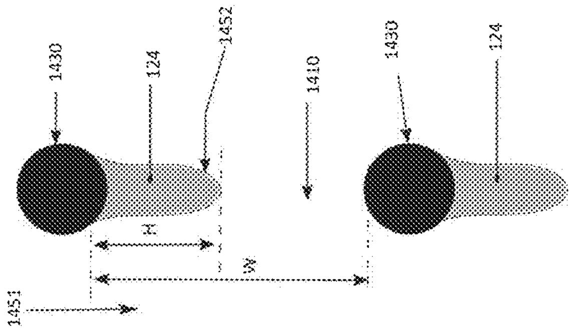

FIGS. 14A-14C shows illustrations of an example hydrophobic mesh material FIG. 1400. FIG. 14A shows an example illustration of a wetted hydrophobic mesh material 1400 with mesh pores 1410 having a rectangular shape and which are delimited by interconnected mesh fibers 1430. The mesh pores 1410 are an open volume. In an embodiment, and referring to FIG. 14A, the mesh pores 1410 are openings formed in the mesh material 1400. When wetted, a liquid film 1425 forms on the mesh material 1400. The liquid film 1425 extends over and covers some or all of the mesh pores 1410, thereby "bridging" the mesh fibers 1430. FIG. 14B shows an example cross section of a liquid film 1425 bridged or stretched across a mesh pore 1410 defined between vertically-spaced and circular top and bottom mesh fibers 1430 in a single square pore 1410 (rotated 90 degrees from the view in FIG. 14A). FIG. 14C shows an example of a pore width W that is wide enough to overcome the given capture solution 124 properties such that no bridging film can be established between vertically-adjacent mesh fibers 1430.

As mentioned above, the bridging technique occurs when hydrophobic fibers 1430 result in liquid solution bridging between the fibers 1430 to form multiple bridged mesh pores which collectively form a liquid film 1425 (illustrated in FIG. 14B). The formation of the liquid film 1425 may be due to minimization of the surface energy of the liquid capture sorbent 124 at the interface of the liquid 124 with the packing fibers 1430 combined with the surface tension of the liquid capture sorbent 124. The dimensions of the bridged solution can be defined by the diameter of the fibers 1430, spacing (width W of mesh pores 1410), fiber material hydrophobicity, and solution surface tension. The liquid film 1425 bridging the mesh pores 1410 defines a gas-liquid interface 1452 along which $CO_2$ laden air 220 is absorbed by the liquid capture solution 124. It may be desired to maximize the height H of the gas-liquid interface 1452. A maximized gas-liquid interface 1452 may be achieved by optimization of the above parameters for a given capture solution composition and gas-liquid contactor operational parameters, and is desirable as larger gas-liquid interfaces 1452 provide more available surface area for increased mass transfer of $CO_2$ into the liquid capture sorbent 124. Referring to FIG. 14B, in configurations of the wetted mesh panel 1401 where bridging of the solution occurs between the mesh fibers 1430, the height H of the gas-liquid interface 1452 is equal to or greater than the dimension (e.g. the width W in FIG. 14B) between adjacent mesh fibers 1430.

Using the bridging technique, and referring to FIG. 14B, the surface of the hydrophobic mesh fiber 1430 itself will remain largely unwetted and therefore does not contribute significantly to the gas-liquid interface 1452 by virtue of its hydrophobic nature. Therefore, an optimized hydrophobic mesh panel 1401 may maximize the gas-liquid interface 1452 by tuning of fiber diameters (dictated in part by structural integrity of the tensioned mesh panel 1401) and the spacing between the mesh fibers 1430 defining the mesh pores 1410. However, too large of fiber spacing will result in breaking of sorbent bridges (for a given solution surface tension) where the liquid bridge height H will no longer span the pore width W, as shown in FIG. 14C. Referring to FIG. 14C, in configurations of the wetted mesh panel 1401 where bridging does not occur between the mesh fibers 1430, the height H of the gas-liquid interface 1452 is less than the dimension (e.g. the width W in FIG. 14C) between adjacent mesh fibers 1430.

In some implementations, the hydrophobic material enhances liquid droplet breakup and uniform liquid dispersion is optimized to perform efficient $CO_2$ capture from dilute gas concentrations. In some implementations, the hydrophobic properties of the mesh panel 1401 can create a relatively uniform liquid film 1425 across the mesh pores 1401, producing a gas-liquid interface 1452 on both sides of the mesh pores 1410, as can be seen in FIG. 14B. Having the gas-liquid interface 1452 on both sides of the mesh pores 1410 increases (e.g. doubles) the interfacial surface area of the liquid sorbent 124 that is available to absorb $CO_2$ from the $CO_2$ laden air 120, which may improve the efficiency of the mesh panel 1401 at capturing $CO_2$.

In some implementations, PVC-coated fiberglass, plastic, or metal materials are used to produce the woven, twill, basket or herringbone patterns for the mesh material and the mesh material can have hydrophobic techniques of wetting.

Figure 15C:
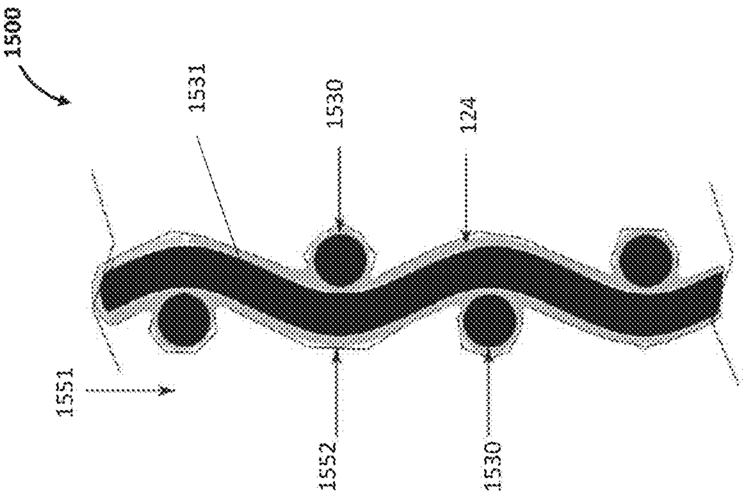
FIG. 15C depicts an example liquid distribution technique for the example hydrophilic mesh sheet of FIGS. 15A and 15B.
Figure 15B:
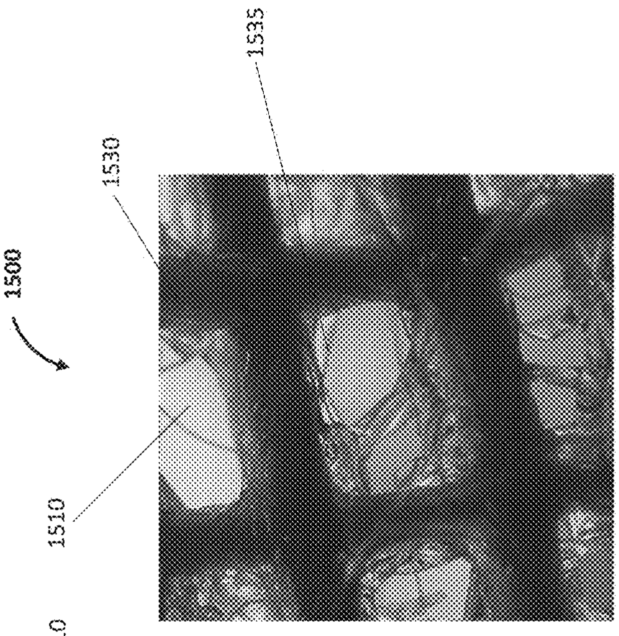
FIGS. 15A and 15B show illustrations of an example hydrophilic mesh sheet.
Figure 15A:
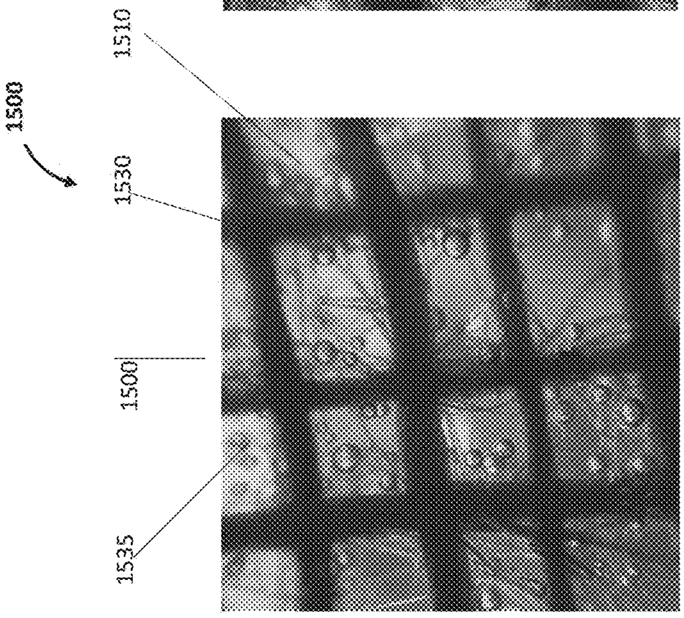

FIGS. 15A-15C depict an example hydrophilic mesh material 1500. FIG. 15A shows an example illustration of a wetted hydrophilic mesh material 1500 with mesh pores 1510 enclosed or delimited by rectangular mesh fibers 1530, when a capture solution is flowing down to form a liquid film 1535. FIG. 15B depicts the same hydrophilic mesh material 1500 without any liquid solution flowing down the surface of the mesh material 1500. Capture solution sits on the surface of the mesh fibers 1530 to form a partial or complete liquid film 1535. FIG. 15C shows an example cross section of the liquid capture solution forming a liquid film 1535 flowing along the mesh fibers 1530 of the mesh material 1500 in FIG. 15A (rotated 90 degrees from the view in FIG. 15A).

Wetting capillary technique occurs when the mesh fibers 1530 are hydrophilic in nature or adapted to be hydrophilic. In some cases, capillary action, rather than solution bridging, draws solution along the surface of the mesh fiber 1530. The gas-liquid interface 1552 will subsequently be defined by the area of wetted fibers 1530 and the thickness of the liquid sorbent layer 1535, which will be defined by the fiber material hydrophilicity and liquid sorbent flow rate 1551 down the mesh material 1500. Using this capillary technique, mesh pores 1510 may or may not be fully wetted depending on liquid sorbent layer thickness and packing fiber spacing. Therefore, optimization of a more hydrophilic mesh material 1500 (using the capillary technique) will be different than that of a more hydrophobic mesh material 1400 (using a bridging technique). It will nevertheless be appreciated that solution bridging of the mesh pores 1510 may occur even when the capillary technique is the dominant form of wetting for the mesh material 1500, such as in instances of the mesh material 1500 being fully saturated by the liquid sorbent, or in instances of high liquid sorbent flow rates 1551 flooding the mesh material 1500. For example, and referring to FIG. 15A, the wetted hydrophilic mesh material 1500 includes a liquid film 1535 spanning the mesh pores 1510 (i.e. solution bridging), and also includes surfaces of the mesh fibers 1530 wetted through capillary action.

Referring to FIG. 15C, the gas-liquid interface 1552 is formed on the wetted outer surface of an interconnecting mesh fiber 1531 and along a length thereof, and is also formed on the wetted periphery of the other illustrated mesh fibers 1530 which have an orientation that is transverse to the orientation of the interconnecting mesh fiber 1531. Referring to FIG. 15C, the $CO_2$ capture solution 124 flows along the outer surface of the hydrophilic mesh fibers 1530. Having the gas-liquid interface 1552 on many exposed surfaces of the wetted mesh material 1500 provides an increased surface area of the liquid sorbent 124 that is available to absorb $CO_2$ from the inlet $CO_2$ laden air, which may improve the effectiveness of the mesh material 1500 at capturing $CO_2$. In the configuration of the wetted mesh material 1500 of FIG. 15C, a single surface of the mesh fibers 1530, i.e. an exposed outer surface, is available to receive the liquid sorbent 124 to form the gas-liquid interface 1552.

In some implementations, non-woven mesh materials 1500, consisting of materials such as nylon, metal, organic fabrics like burlap, hemp or cellulose or combination of similar materials can have hydrophilic mechanisms of wetting. Non-woven materials can include, but are not limited to, any material that is not entwined in a regular pattern. This may include random-interlaced organic or synthetic fabrics such as felt (burlap is specifically woven) or sheets of a single material with perforations or holes or intrinsic wicking characteristics. Non-woven materials can also consist of an ordered network of fibers, which, rather than interfacing via a weave pattern, are bonded to one another via some other fashion either mechanically or chemically (for example, through gluing or solvent bonding or other means).

In some cases, hydrophilic designs can improve wetting of the mesh packing 101 with the capture solution. Improved wetting of the mesh material 1500 having hydrophilic properties (e.g., increasing the wetted surface area of the mesh material 1500) can be achieved by at least two approaches. The first approach is to increase the hydrophilicity of the mesh material 1500 surface via increasing the surface free energy, which is a material property of the mesh material 1500. The second approach is to increase the mesh material 1500 surface roughness and the apparent contact angle. These approaches can be used independently or in combination with one another.

Since the wetted surface area determines the amount of exposure of capture solution to $CO_2$ in the air, and a hydrophilic material surface maximizes the wetted area for a given volume of solution, hydrophilic materials may be included in the mesh packing 101 for gas-liquid contactor applications. In some cases, the hydrophilicity may be incorporated into the mesh material 1500 when it is produced, or it may be introduced as a coating post-production. Hydrophilic coatings increase surface energy and lower the contact angle. In some cases, some surface treatments that expose a material to a change in bonds on its surface can achieve similar hydrophilic results.

In an example implementation, the hydrophilic mesh material 1500 may include an applied coating to the mesh fibers 1530 to increase hydrophilicity. In some cases, the hydrophilic coating on the mesh material 1500 fully wets with a minimal solution flow. This can result in higher capture rates with significantly reduced solution flows.

In some implementations, and referring to FIG. 15A, the hydrophilic mesh material 1500 is wetted with capture solution, soaking the hydrophilic material until the liquid mass/volume exceeds a threshold saturation level of the mesh material 1500 and forms droplets that flow along the mesh fibers 1530 into the mesh pores 1510 to produce a liquid film 1535 within the mesh pores 1510, in addition to the wetted surface of the hydrophilic mesh material 1500 itself. This is different from the hydrophobic wetting technique of FIGS. 14A-14C, which relies on the mesh material repelling the liquid to force the droplets away from the mesh fibers 1430 and into the mesh pores 1410.

In some implementations, the mesh material 1500 may include material additives to further optimize the hydrophilicity and lower the contact angle between the liquid-solid interface on at least a portion of the mesh material 1500.

In addition to or alternatively to the previous examples of hydrophilic mesh material, the mesh fiber surface roughness can also be modified to increase hydrophilicity.

In some implementations, the mesh material 1500 contains at least a portion having hydrophilic properties. In some cases, this can increase the $CO_2$ capture flux (e.g., by at least 10%) through an increase in the wetting fraction of the mesh material 1500.

In some implementations, the mesh material 1500 contains at least a portion having hydrophilic properties and at least one other portion having hydrophobic properties. Thus, in an embodiment, the mesh material 1500 may have both hydrophilic and hydrophobic properties. In some implementations, mesh material 1500 that is hydrophilic can be employed as a drift eliminator in a gas-liquid contactor to mitigate discharging droplets of capture solution into the environment. The hydrophilicity of mesh material 1500 in drift eliminators can attract droplets of capture solution to the mesh fibers, thereby deterring them from flowing downstream.

In both hydrophobic and hydrophilic mesh material wetting techniques, reducing the amount mesh material required can be accomplished by leveraging the liquid surface tension properties to achieve a high gas-liquid interface area to material mass ratio. Based on the given liquid solution surface tension, sorbent solution films can bridge across the mesh pores resulting in an overall reactive gas-liquid interfacial area greater than the surface area of the mesh packing alone. In these cases, the wetting fraction ε, which is defined as the ratio of liquid surface area per surface area of the mesh material (excluding the area of the mesh pores), is greater than 100%. Therefore, when the mesh material is wet and the solution bridges across the open mesh pores 1410, the gas-liquid interfacial area is larger than the total surface area of the mesh fibers 1430. Furthermore, the open nature of the mesh pores 1410 coupled with solution bridging provides interfacial area on both sides of the wetted mesh panels 1401. This is in contrast to some standard heat exchange packing or structured packing surfaces, in that a uniform air-liquid film interface is formed on both sides of the surface of the mesh packing 101 disclosed herein. In some cases, the mesh material can be thought of as internal supports for a near-uniform solution film.

Both hydrophobic and hydrophilic wetting techniques can be employed with mesh material to produce mesh packing 101 having a lower pressure drop, optimum $CO_2$ capture efficiency, and lower capital and operational costs. Additionally, when configured as described in this disclosure, sheets of the mesh material created with either of these wetting techniques can lower the pressure drop, reduce air travel depth, and reduce overall gas liquid energy consumption. While these two techniques employ slightly different features to achieve the results, both techniques can be configured to produce sheets of mesh material with the desired performance.

In a typical mesh packing design, the mesh fiber diameter may range from 0.001 inches to 0.5 inches, with the mesh fiber spacing ranging from 0.001 inches to 0.5 inches. In some implementations the mesh material 1400, 1500 is selected to be material compatible with the $CO_2$ capture solution, for example high pH solutions, hydroxide solutions like KOH, NaOH, or carbonate/bicarbonate solution, and the like. The optimal range of sorbent concentrations will depend on operating conditions and environmental conditions. In some cases where the capture solution contains sorbents such as NaOH, KOH, the solutions may have an optimal range of hydroxide concentrations. For example, optimal hydroxide concentrations may range from 0.5 M to the saturation point of the hydroxide under the given operating conditions (e.g., temperature), at which point no additional $CO_2$ can be absorbed. Similarly, for other sorbents, the optimal sorbent concentrations may range from 0.5 M to the saturation point of the sorbent.

Figure 16A:
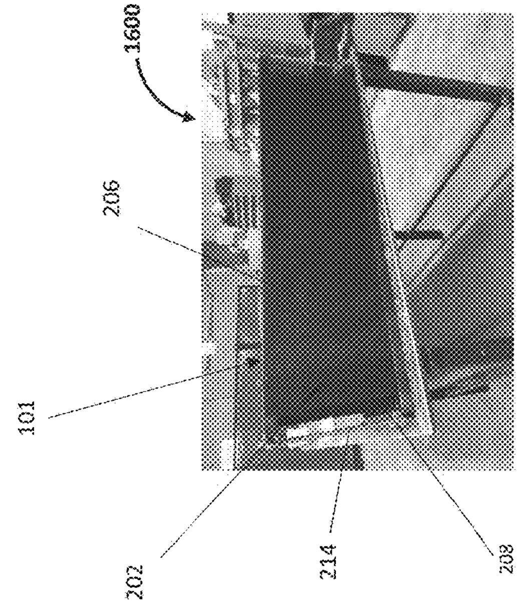
FIG. 16A-C show illustrations from front, side, and plan views of an example mesh packing and support system testing prototype.
Figure 16B:
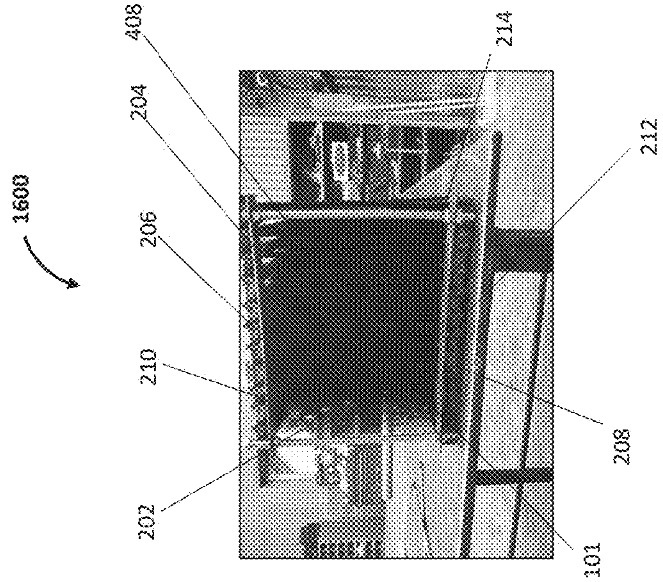
Figure 16C:
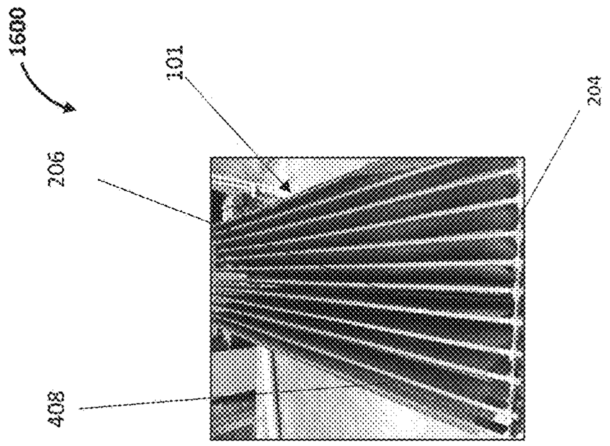

FIG. 16A-16C depict front, side, and plan views of an example mesh packing 101 and support system testing device 1600. The testing device 1600 is similar to the above-described support systems (such as support system 800 of FIG. 8A) in that it includes one or more top rods 206, one or more bottom rods 208, one or more support columns 214, one or more support beams 204, one or more upper spacers 1140, one or more lower spacers 212 and one or more mesh panels 202. FIG. 16A shows threaded mesh panel (fabric) 202, alternating between offset top and bottom rods 206 and 208.

In some cases, the example of shape of the gas channels 408 formed by the mesh panels 202 on the testing device 1600 are rectangular as shown in FIG. 16B. In some cases, the shape of the channels 408 can be triangular, circular, or rectangular. The gas channel 408 shapes may be selected based on a predetermined surface tension, sorbent flow pattern, size of the mesh material surface, the reactive gas-liquid interfacial area, and the liquid sorbent performance of mesh packing top of the channels. In some cases, the space between mesh panels 202 (the gas channel width 207) is less than 6 inches and allows for uniform distribution of the sorbent on both sides of the mesh material surface. In some cases, the gas channels 408 can be positioned at an angle determined by the spacing between the top rod 206 and bottom rod 208, in combination with the threading pattern of the mesh panels 202.

The testing device 1600 shown in FIG. 16A-16C can be used, in combination with the equations described below, to evaluate performance of the mesh packing 101. Experimental testing conditions and results of tests performed using the testing device 1600 are described in more detail below and preliminary testing results are illustrated in FIG. 17.

Figure 17:
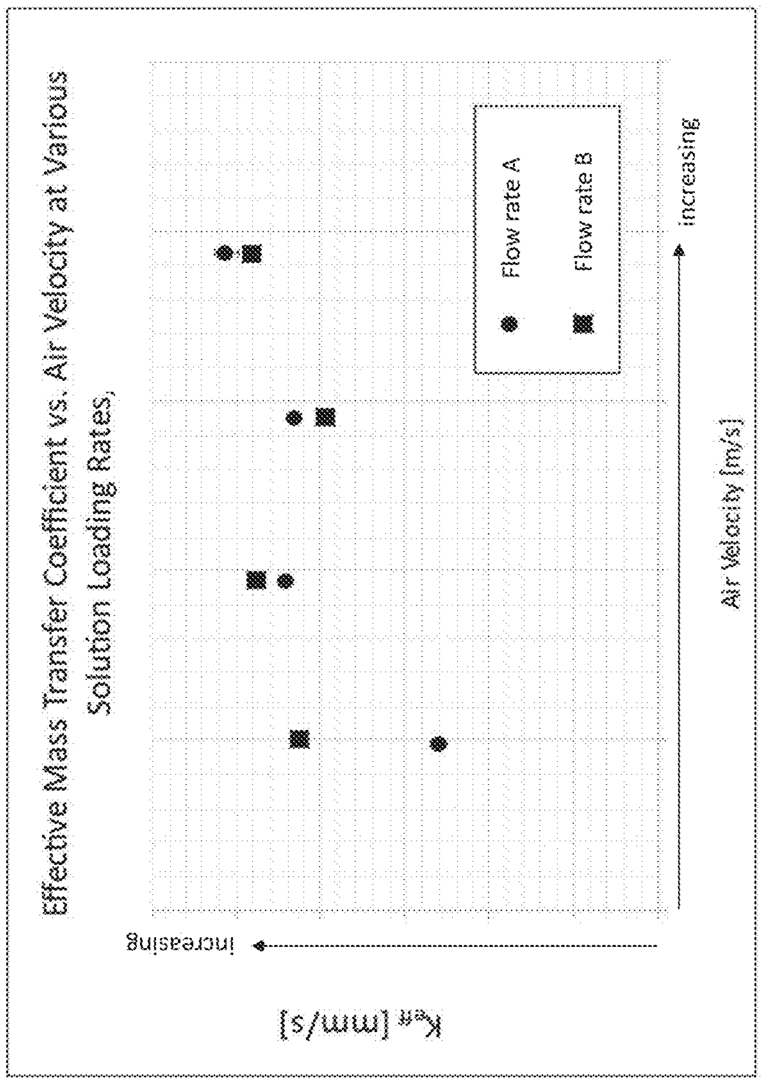
FIG. 17 shows a graph of mass transfer versus air velocity per sorbent loading rates.

FIG. 17 shows a graph 1700 illustrating the effective mass transfer coefficient, $K_{eff}$ versus air velocity for a variety of sorbent loading rates using KOH aqueous capture solution across the air travel depth (ATD) of the mesh packing 101 attached to testing device 1600 shown in FIGS. 16A-16C.

A mesh packing sample was tested in a lab scale gas-liquid contactor. The packing had an SSA of 200 $m^2$. Tests were performed with air velocities in the range of 1.0 to 2.5 m/s under ambient air conditions (temperature ranging from about 5° C. to 15° C., and a $CO_2$ inlet concentration of about 400 ppm) using aqueous solutions of KOH as capture sorbent. Identical concentrations of KOH capture sorbent were used for all tests. During testing, inlet and outlet $CO_2$ concentrations were measured and $K_{eff}$ was subsequently calculated for a given inlet area and ATD using the method outlined below. The other following constants are readily available in laboratory textbooks, the ideal gas constant having a value of 8.314 and the molar mass of $CO_2$ being 44.01 kg/kmol.

Calculating molar air and $CO_2$ flow rates:

$$\dot{n}_{air} = \frac{(3600)P_{atm}v_{air}A_{inlet}}{RT_{air}}\left[\frac{\text{kmol air}}{\text{hr}}\right]$$

$$\dot{n}_{CO2} = \dot{n}_{air}([CO_2]_{in} - [CO_2]_{out}) * 10^{-3}\left[\frac{\text{mol } CO_2}{\text{hr}}\right]$$

Calculating $CO_2$ mass flux:

$$J_{CO_2} = \frac{\dot{n}_{CO2} M_{CO_2}}{A_{Inlet}} [kg_{CO_2}/\text{hr}/\text{m}^2]$$

Calculating effective mass transfer coefficients:

$$k_{eff} = \log\left(\frac{[CO_2]_{in}}{[CO_2]_{out}}\right)\frac{v_{air}}{ATD * SSA}(1000)\left[\frac{\text{mm}}{\text{s}}\right]$$

In standard testing, samples of each of the readings were taken at each set point to develop a large sample pool to utilize statistics to manage any measurement precision issues. From this dataset, the mean and 95% confidence interval (CI) was determined and used to statistically test for differences in packing performance.

This preliminary evaluation of the mesh packing demonstrated empirically measured effective mass transfer coefficients in the range of about 1.0 to 2.0 mm/s for an initial prototype, which is considered sufficient for economic design of $CO_2$ capture gas-liquid contactors. Furthermore, the testing illustrates that the mesh packing design shows improved (higher) mass transfer coefficients in reference to published data on conventional packing (e.g., cooling tower packing) by providing effective mass transfer coefficients closer to the 2 mm/s target known to be economically advantageous for large scale DAC applications.

Figure 18A:
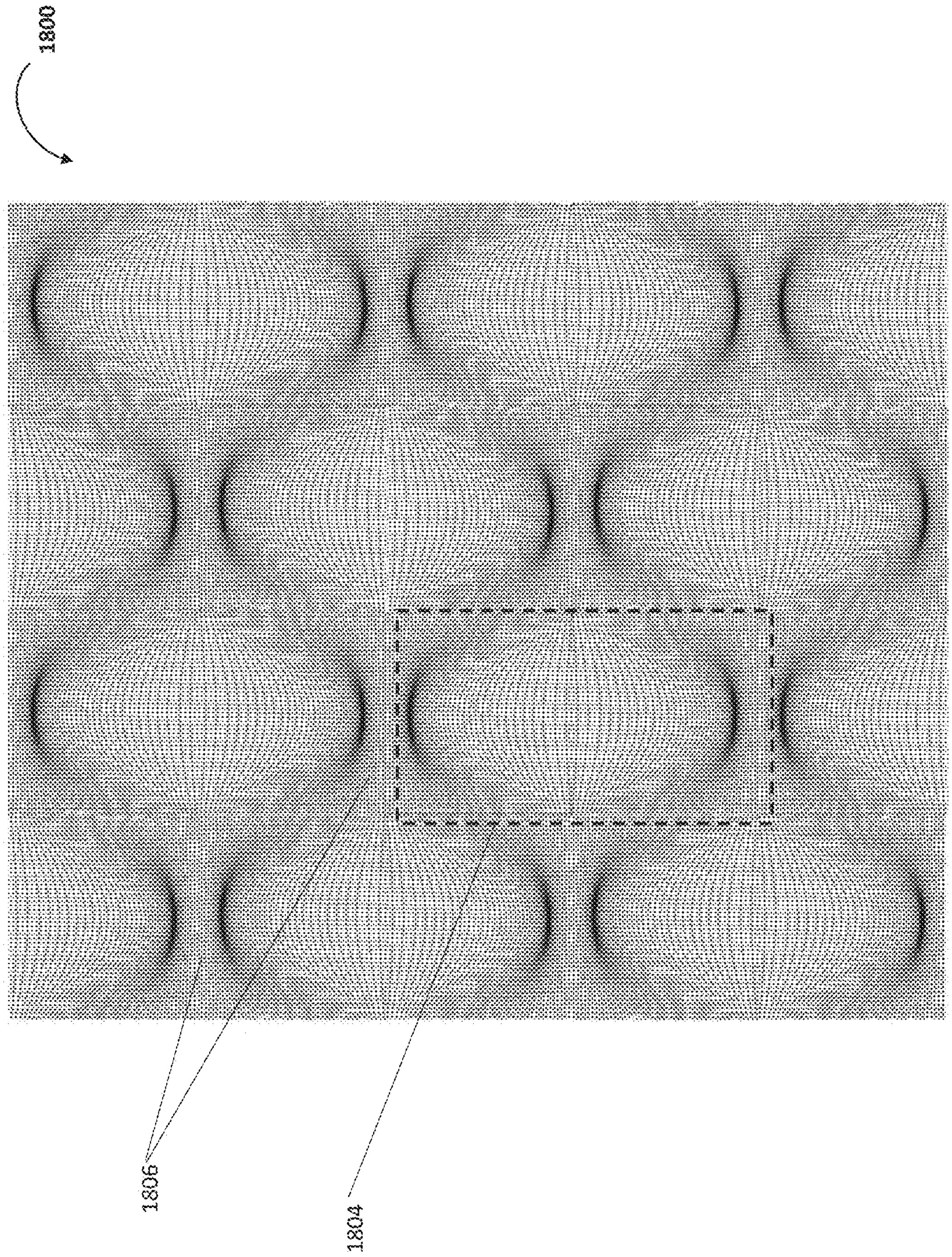
FIG. 18A and FIG. 18B show examples of molded mesh that includes a mesh sheet with imprinted textures.
Figure 18B:
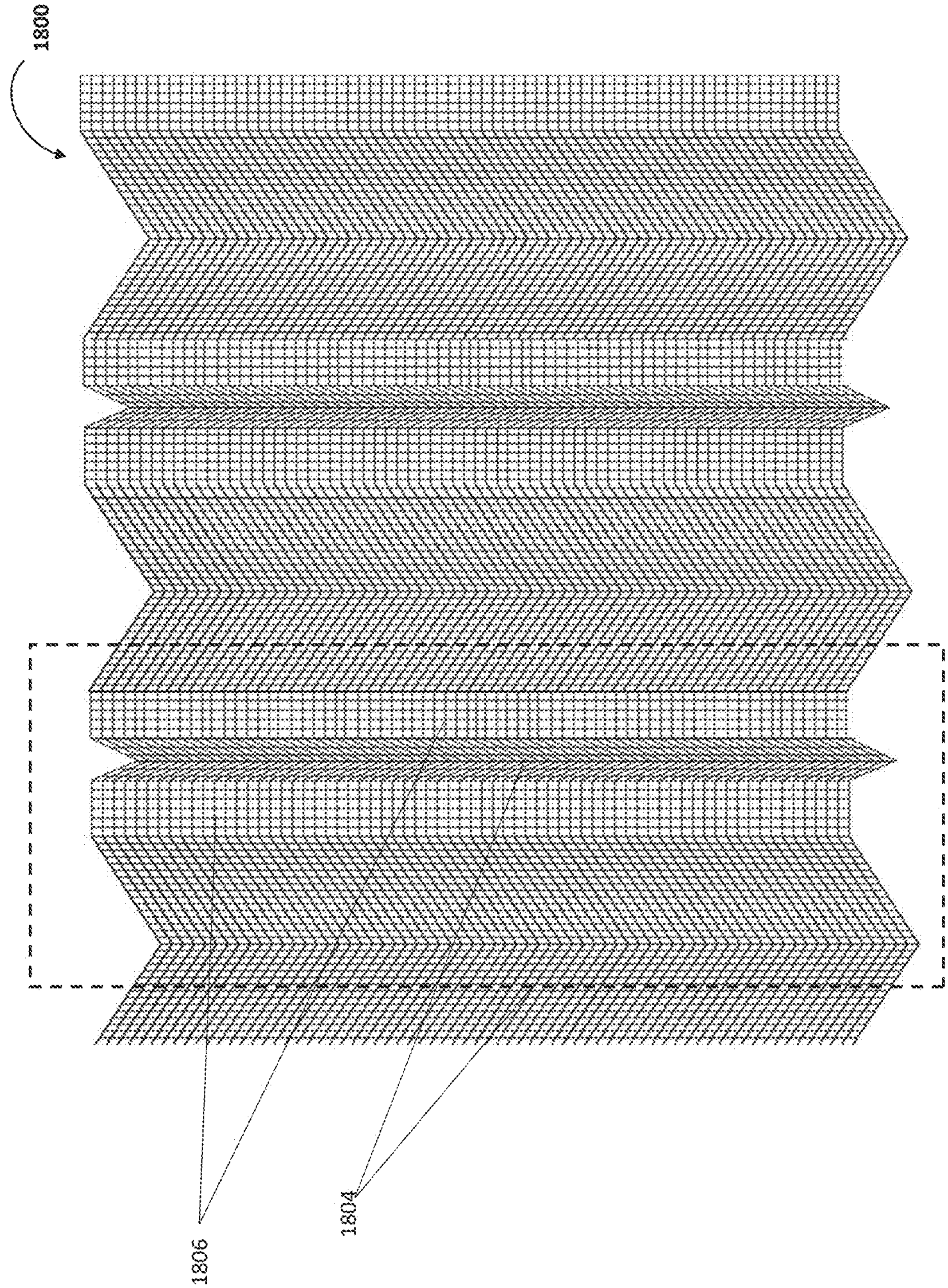

FIG. 18A and FIG. 18B depict examples of molded mesh materials 1800. The molded mesh materials 1800 may be in sheet or panel form and include a plurality of protruding portions 1804 that collectively form a texture or topography of the molded mesh material 1800, and which extend outwardly from planar portions 1806 of the molded mesh materials 1800. The planar portions 1806 define parallel planes, and the protruding portions 1804 extend outwardly from the parallel planes into the airflow between adjacent mesh panels. In some implementations, the molded mesh material 1800 may allow for increasing interfacial surface area by enhancing the bridging or capillary effects of the mesh material with improved wetting effects resulting from variations in the surface topography of the mesh material. Similar to increasing the mesh material surface roughness (for example, by increasing roughness of the mesh fibers) to lower contact angle of the liquid, a flat sheet of mesh material can be shaped, pressed, molded, warped, or formed to affect the flow pattern of capture solution. Given that the molded mesh material 1800 defines the gas channel, it does not form a significant impediment for airflow, as spacing of the gas channels can be selected to accommodate airflow and pores that have no liquid film or only a partial liquid film can allow for air to flow through. In consideration of the gas channel spacing, the protrusions 1804 may shaped to minimize restrictions to airflow in the gas channels and minimize pressure drop across the mesh packing. In some cases, the molded mesh material 1800 may be suitable for being employed as mist eliminators that are downstream of the packing of the gas-liquid contactor. The protruding portions 1804 can impinge the movement of capture solutions droplets so that they are not discharged into the environment.

FIG. 18A depicts an example of the molded mesh material 1800 where protruding portions 1804 include rounded protrusions or bumps that extend outward from the planar portions 1806 (sections of mesh material 1800 that are planar surfaces) of the mesh material 1800. While the rounded protrusions 1804 are illustrated as generally uniformly sized and evenly spaced, in some cases, it can be beneficial to vary the sizes, spacing, shape, and numbers of the protruding portions 1804 to influence solution flow. For example, in cases where a flat sheet of mesh material has a dry spot or dead spot that is difficult to wet with capture solution, areas of the mesh material that are adjacent to the dry spot or dead spot can be shaped to include the rounded protruding portions 1804 to promote solution flow onto the dry spot or dead spot.

FIG. 18B depicts another example of the molded mesh material 1800 where the protruding portions 1804 include ridges, folds, or corrugations. The protruding portions 1804 of FIG. 18B are planar bodies which defines planes that are oblique or non-parallel to the planes defined by the planar portions 1806 of the mesh material 1800. These ridges, folds, or corrugations can be sized or positioned to influence solution flow.

While FIG. 18A and FIG. 18B show rounded protrusions and ridges as example textures, a variety of other shapes are also possible, including herringbone, corrugations, flutes, or channels. In some cases, the molded mesh material 1800 may include sheets of mesh material that are shaped to emulate the patterns of conventional rigid packing sheets or panels in structured packing sections. In some cases, the molded mesh material 1800 can be shaped to form textures or structures that enable sections of mesh packing that can interlock with one another (e.g., through plug-receiving structures). Molded mesh material 1800 can be formed from flexible mesh material that is easily installed in the foregoing support system or a support system that allows the molded mesh material 1800 to hang freely from top support rods. In some implementations, molded mesh material 1800 can be formed from rigid mesh material having thicker or stiffer thread that enables the molded mesh material 1800 to be free standing. Adjacent sheets or panels of the molded mesh material 1800 may have the same shape and be spaced apart from each other to define gas channels 408 that have a consistent gas channel width/height along the ATD. In another possible implementation, adjacent sheets/panels of the molded mesh material 1800 may have different shapes and be spaced apart from each other to define gas channels 408 that converge or which are pinched along the ATD, or which diverge away from each other along the ATD.

Figure 19:
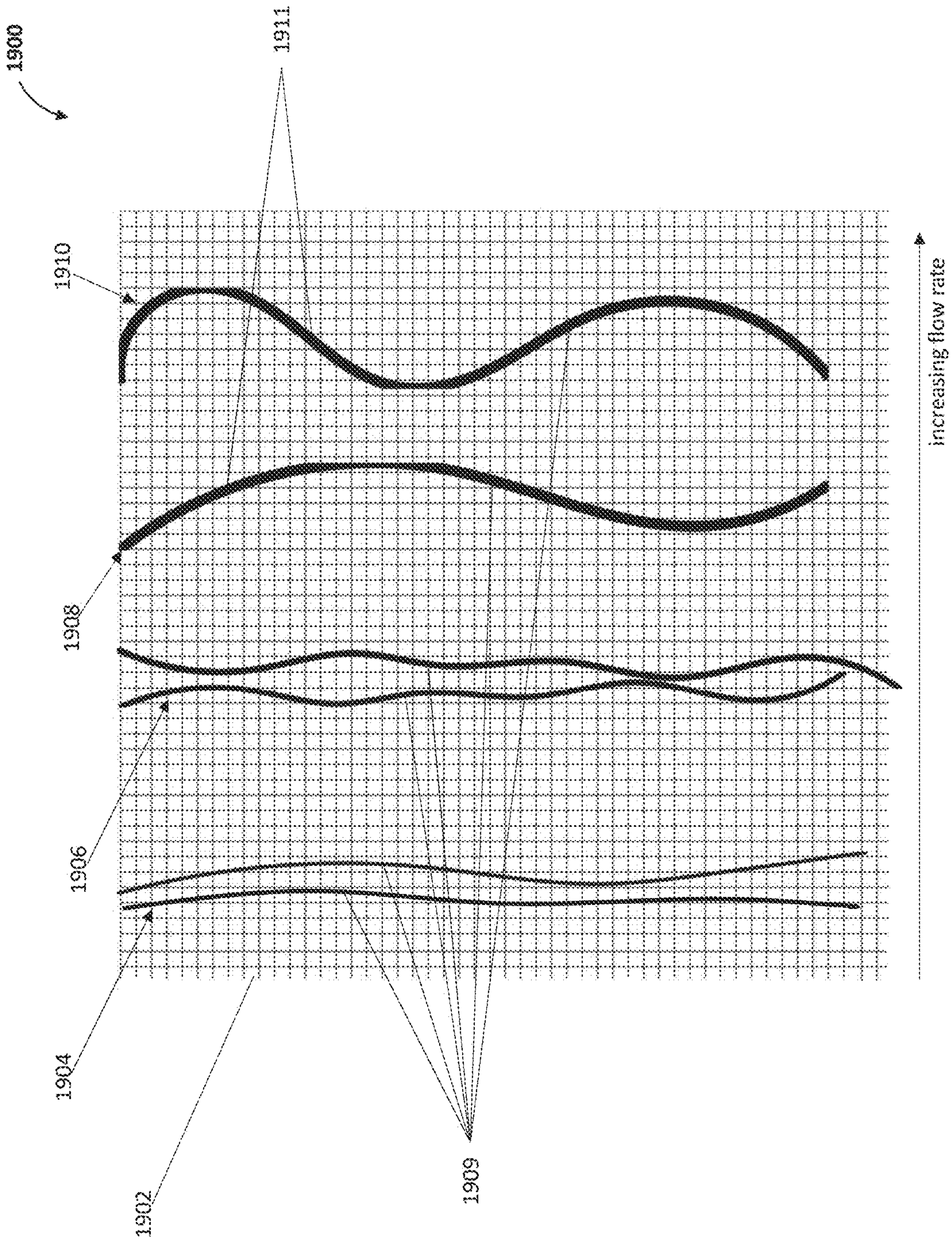
FIG. 19 shows example flow patterns of capture solution at varying solution flow rates on a mesh sheet.

FIG. 19 depicts example flow patterns 1900 of $CO_2$ capture solution 1909 at varying solution flow rates on the mesh material 1902. When distributing $CO_2$ capture solution 1909 to a dry mesh material 1902, at certain solution flow rates, the $CO_2$ capture solution 1909 can form meandering currents 1911, which indicate that the mesh material 1902 is fully wetted or saturated. As the meandering currents 1911 of $CO_2$ capture solution 1909 flow down the mesh material 1902, the meandering currents 1911 will also flow laterally in a direction that is transverse to their downward flow direction on the mesh material 1902. The meandering currents 1911 can travel laterally back and forth across the mesh material 1902 in a winding or serpentine path (for example, from one side towards the opposite side of the mesh material 1902 and back) as the $CO_2$ capture solution 1909 flows down the mesh material 1902. The meandering currents 1911 typically appear when there is an underlying a layer of $CO_2$ capture solution 1909 on the mesh material 1902. Thus, a wide winding path of meandering currents 1911 indicates that a significant portion of the mesh material 1902 has been wetted, and the meandering currents 1911 maintain flow of $CO_2$ capture solution 1909 on the wetted portion. For example, on the mesh material 1902, at a low flow rate (e.g., approximately 1 L/min), the flow pattern 1904 may include a plurality of streams that are relatively straight and spaced evenly (e.g., 0.2 inch to 2 inches) apart from one another. At twice the low flow rate (e.g., approximately 2 L/min), the flow pattern 1906 may include one or more streams having a flow path that winds slightly along the mesh material 1902. At three times the low flow rate (e.g., approximately 3 L/min), the one or more streams can merge, resulting in a flow pattern 1908 that includes at least one stream that meanders more widely than the streams of the flow pattern 1906 at twice the low flow rate, thereby forming a meandering current 1911 that wets a larger area of the mesh material 1902. At four times the low flow rate (e.g., approximately 4 L/min), a significant portion of the mesh material 1902 is flooded by at least one meandering current 1911 of the flow pattern 1910 that meanders more widely than the streams of the flow pattern 1906 at twice the low flow rate. At four times the low flow rate, the $CO_2$ capture solution 1909 of the flow pattern 1910 takes a wider path than the path at two times or three times the low flow rate, thereby wetting a larger surface of the mesh material 1902. The meandering currents 1911 typically indicate that the portion of the mesh material that is covered by flow path is fully saturated with $CO_2$ capture solution 1909. In some cases, the meandering currents 1911 of the flow patterns 1908, 1910 can travel laterally across the width of the mesh material 1902, thereby increasing wetting compared to flow patterns 1904, 1906 at lower flow rates. In some implementations, in a flow cycle where $CO_2$ capture solution 1909 flows to the mesh material 1902 at a low pulse flow rate (or zero flow) for a first time duration and at a high flush flow rate for a second time duration, the high flow rate can be at three or four times the low/pulse flow rate. In some implementations, in a flow cycle, the $CO_2$ capture solution 1909 does not flow to the mesh material 1902 for a first time duration and flows to the mesh material 1902 at a solution flow rate ranging between 1 L/min and 2 L/min for a second time duration. The thickness and direction of the meandering currents 1911 depends on the $CO_2$ capture solution 1909 flow rate, but in some cases, can also be affected by a combination of other factors including the tension on the mesh material 1902, surface tension of the $CO_2$ capture solution 1909, and hydrophobicity or hydrophilicity of the mesh material 1902.

Figure 20:
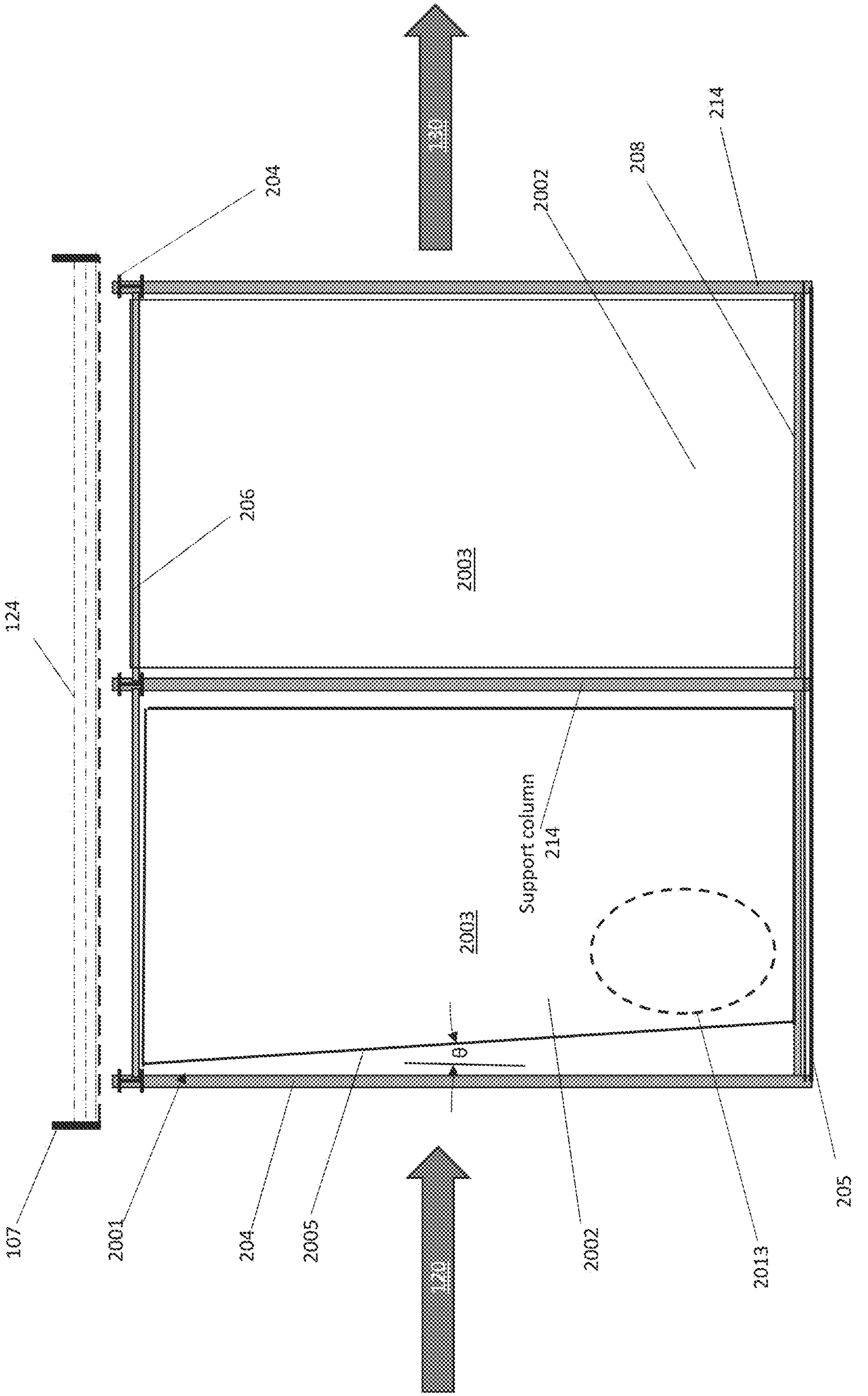
FIG. 20 is a schematic illustration from an elevation view of an example mesh packing and support system.

Referring to FIG. 20, mesh panels 2002 of a mesh packing 2001 may be oriented relative to the $CO_2$ laden air 120 to improve wetting of mesh material 2003. In the configuration of the mesh packing 2001 of FIG. 20, each of the mesh panels 2002 has an upright orientation and a leading edge 2005 that faces into the $CO_2$ laden air 120. The leading edges 2005 are the portions of the mesh panels 2002 which are positioned most upstream relative to the flow of the $CO_2$ laden air 120. The leading edges 2005 of one or more of the mesh panels 2002 are inclined at an angle θ relative to the vertical, in a downstream direction. The angle θ has a magnitude greater than zero. For upright mesh panels without inclined leading edges, it may occur that the $CO_2$ capture solution introduced at or near the top of the leading edge is displaced laterally by the $CO_2$ laden air along the mesh material in the direction of the $CO_2$ laden air, particularly for large flow velocities of the $CO_2$ laden air, such that lower portions of the mesh material adjacent to the leading edge are not adequately wetted. In contrast, the leading edges 2005 that are inclined relative to the vertical in the downstream direction may allow for a lower portion 2013 of the mesh material 2003 adjacent to the leading edge 2005 to be adequately wetted when the $CO_2$ capture solution 124 is introduced at or near the top of the leading edge 2005, even for large flow velocities of the $CO_2$ laden air 120. The inclined leading edges 2005 of the mesh panels 2002 may thus allow for all portions of the mesh material 2003 to be adequately wetted by the $CO_2$ capture solution 124.

Figure 21:
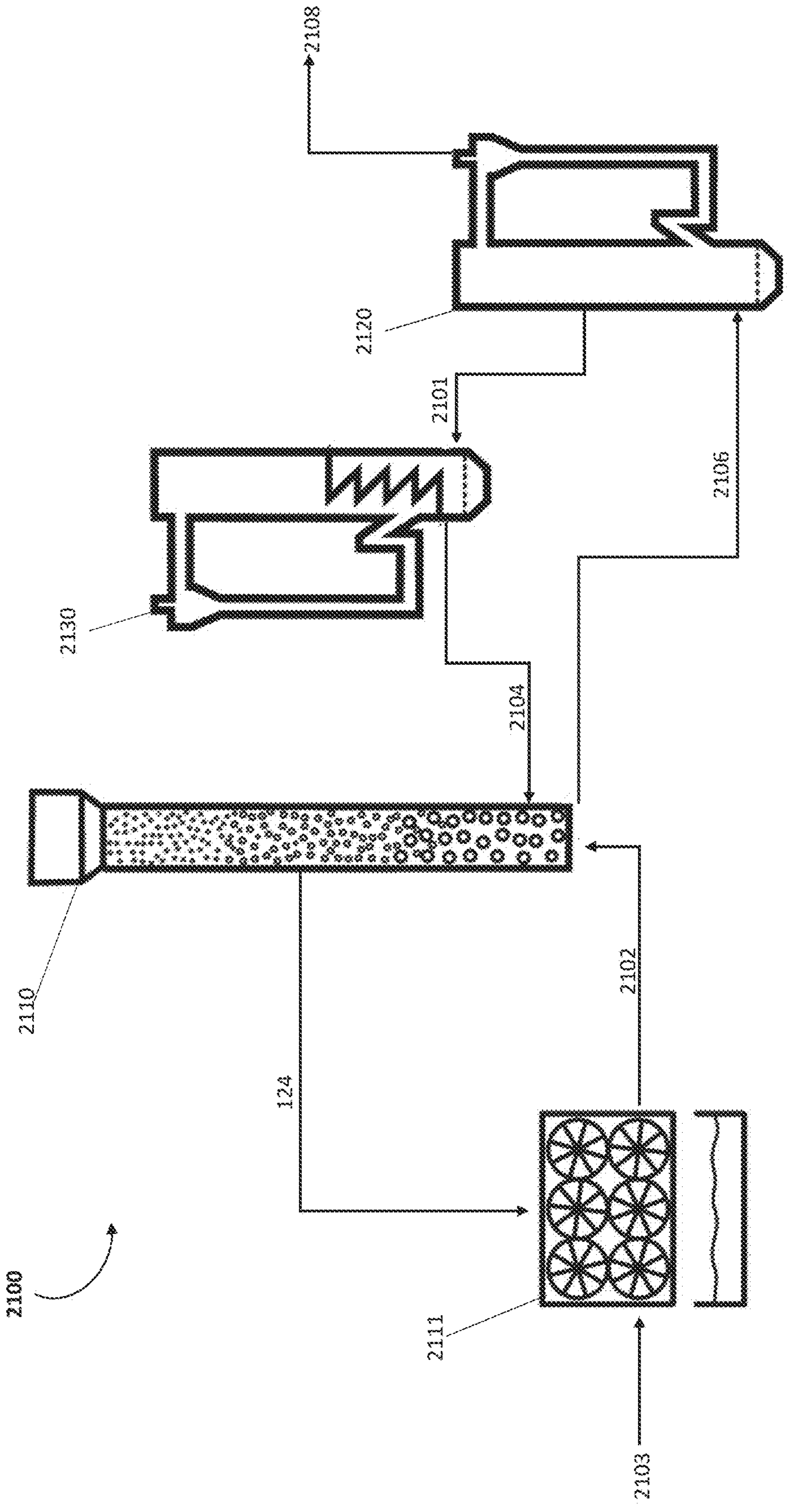
FIG. 21 shows a schematic illustration of an example gas-liquid contactor used with a direct air capture (DAC) facility.

Referring to FIG. 21, the gas-liquid contactor 2111 with mesh packing is part of a direct-air-capture (DAC) facility 2100 for capturing $CO_2$ directly from atmospheric air, according to one possible and non-limiting example of a use for the gas-liquid contactor 2111. The gas-liquid contactor 2111 absorbs some of the $CO_2$ from the atmospheric air 2103 using the $CO_2$ capture solution 124 to form a $CO_2$ rich solution 2102. The $CO_2$ rich solution 2102 flows from the gas-liquid contactor 2111 to a pellet reactor 2110 of the DAC facility 2100. A slurry of calcium hydroxide 2104 is injected into the pellet reactor 2110. As $Ca^{2+}$ reacts with $CO_3^{2-}$ in the pellet reactor 2110, it drives dissolution of calcium hydroxide to return a stream of aqueous alkaline solution as the $CO_2$ capture solution 124, and to precipitate calcium carbonate ($CaCO_3$) onto calcium carbonate particles in the pellet reactor 2110. Further processing of the calcium carbonate solids, including but not limited to filtering, dewatering or drying, may occur prior to sending the calcium carbonate solids to downstream process units. A stream 2106 of calcium carbonate solids is transported from the pellet reactor 2110 to a calciner 2120 of the DAC facility 2100. The calciner 2120 calcines the calcium carbonate of the stream 2106 from the pellet reactor 2110 to produce a stream of gaseous CO2 2108 and a stream of calcium oxide (CaO) 2101, possibly by oxy-combustion of a fuel source in the calciner 2120. The stream of gaseous $CO_2$ 2108 is processed for sequestration or other uses, thereby removing some of the $CO_2$ from the atmospheric air 2103 processed in the gas-liquid contactor 2111. The stream of calcium oxide (CaO) 2101 is slaked with water in a slaker 2130 of the DAC facility 2100 to produce the slurry of calcium hydroxide 2104 that is provided to the pellet reactor 2110.

Figure 22:
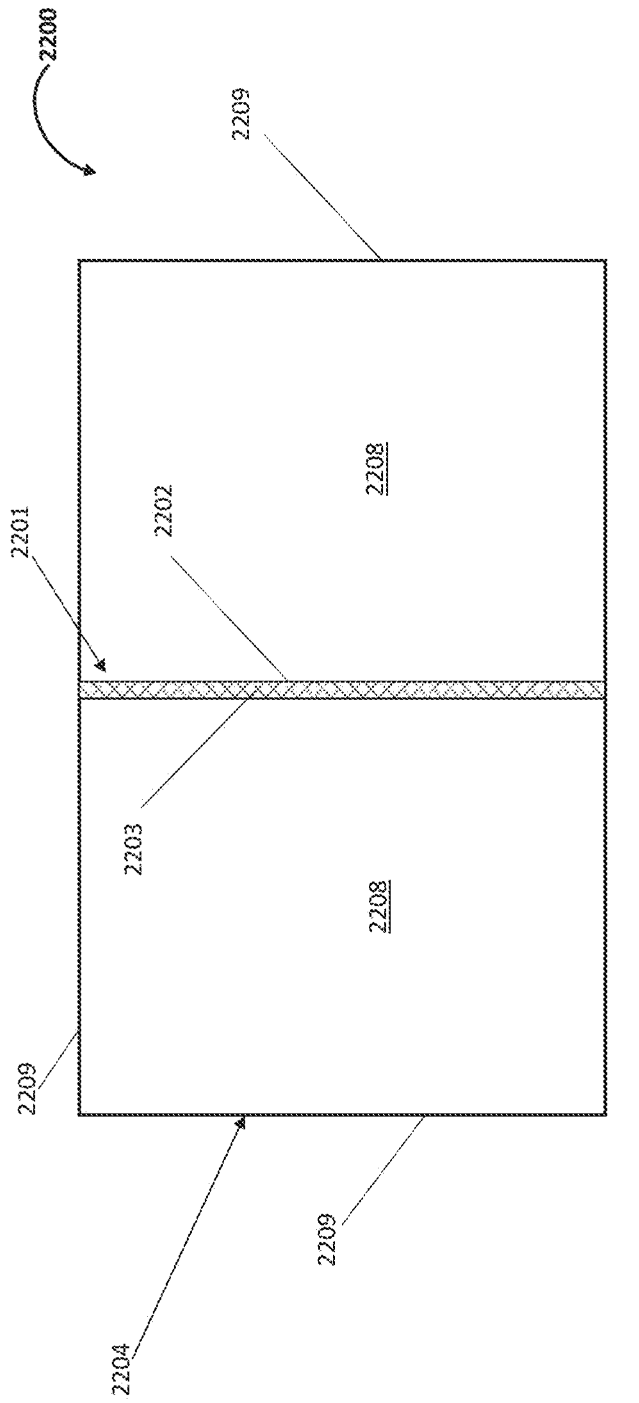
FIG. 22 shows a schematic illustration from an elevation view of an example gas-liquid contactor.

FIG. 22 shows a schematic illustration of an example of the gas-liquid contactor 2200. The gas-liquid contactor 2200 includes a housing 2204 having a plurality of housing walls 2209 delimiting an interior of the housing 2204. The gas-liquid contactor 2200 includes a mesh packing 2201. The mesh packing 2201 includes a single mesh panel 2202 having the mesh material 2203. Two gas channels 2208 are formed in the interior of the housing 2204. Each gas channel 2208 is formed on one side of the mesh panel 2202 between the mesh panel 2202 and one or more housing walls 2209. The single mesh panel 2202 of FIG. 22 has an upright orientation. In another possible implementation of the gas-liquid contactor 2200, the single mesh panel 2202 has a horizontal orientation. In another possible implementation of the gas-liquid contactor 2200, the single mesh panel 2202 has an orientation that is inclined relative to the vertical or to a horizontal plane.

Figure 23:
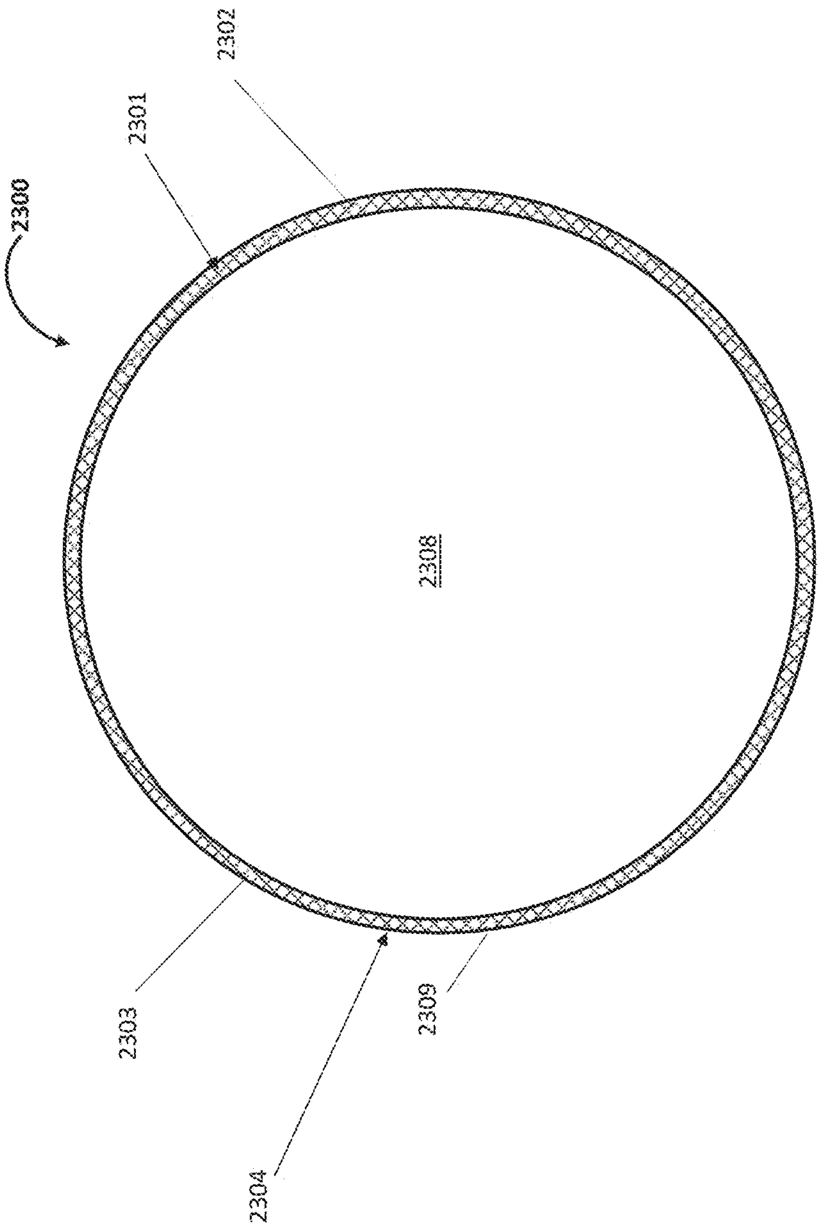
FIG. 23 shows a schematic illustration from a top view of an example gas-liquid contactor.

FIG. 23 shows a schematic illustration of an example of the gas-liquid contactor 2300, viewed from an end of the gas-liquid contactor 2300. The gas-liquid contactor 2300 includes a cylindrical housing 2304 having a housing wall 2309 delimiting an interior of the housing 2304. The gas-liquid contactor 2200 includes a mesh packing 2201. The mesh packing 2301 includes a mesh panel 2302 having the mesh material 2303. The mesh panel 2302 is positioned within the housing and against the housing wall 2309. A single gas channel 2308 is formed in the interior of the housing 2304. The gas channel 2308 is formed on one side of the mesh panel 2302, and is delimited entirely by the mesh panel 2302. The mesh panel 2302 may be a cylindrical body defined about a center axis. The orientation of the center axis may be upright, horizontal, or at an angle between upright and horizontal. The mesh panel 2302 of FIG. 23 is a singular or continuous body. In another possible implementation, the mesh panel 2302 is an assembly of circumferentially-extending or arcuate mesh panel segments which are mounted to the housing wall 2309 and/or to each other. Referring to FIG. 23, the first dimension is a diameter measured between diametrically-opposed points of the mesh panel 2302.

It will be clear to one having skill in the art that further variations to the specific details disclosed herein can be made, resulting in other embodiments that are within the scope of the disclosure. All parameters, dimensions, materials, and configurations described herein are examples only and may be changed depending on the specific embodiment.

What is claimed is:

1. A gas-liquid contactor for capturing carbon dioxide ($CO_2$) from a dilute gas source, the gas-liquid contactor comprising:

a housing at least partially enclosing a plenum comprising an inlet and an outlet;

at least one packing supported in the housing downstream of the inlet, the at least one packing comprising:

at least one panel that comprises a plurality of mesh panel segments, each mesh panel segment of the plurality of mesh panel segments comprises a mesh material extending from a first end to a second end of each of the plurality of mesh panel segments, the first end or the second end of each mesh panel segment being continuous with the first end or the second end of an adjacent mesh panel segment of the plurality of mesh panel segments to form a continuous sheet of mesh material; and at least one gas channel defined between adjacent mesh panel segments of the plurality of mesh panel segments, the at least one gas channel having a first dimension defined along a first direction between the adjacent mesh panel segments and a second dimension defined along a second direction different than the first direction;

a structural support supported by the housing and configured to support the at least one packing, the structural support comprising one or more support rods supporting the continuous sheet of mesh material and defining the first end or the second end of each mesh panel segment;

a liquid distribution system configured to wet the mesh material with a $CO_2$ capture solution, the liquid distribution system comprising one or more basins configured to hold the $CO_2$ capture solution received from the mesh material; and a gas moving device configured to flow a $CO_2$-laden gas from the dilute gas source through the at least one gas channel in the second direction to contact the $CO_2$-laden gas with the $CO_2$ capture solution on the wetted mesh material.

2. The gas-liquid contactor of claim 1, comprising a drift eliminator coupled to the housing and positioned downstream of the at least one packing.

3. The gas-liquid contactor of claim 2, wherein the gas moving device is a fan disposed downstream of the at least one packing at the outlet, wherein the fan is rotatable about a fan axis to draw the $CO_2$-laden gas into the inlet and through the at least one gas channel in the second direction.

4. The gas-liquid contactor of claim 1, wherein the liquid distribution system is configured to flow the $CO_2$ capture solution at a solution flow rate ranging from 1 L/min to 4 L/min.

5. The gas-liquid contactor of claim 1, the one or more support rods is mounted on one or more support beams.

6. The gas-liquid contactor of claim 5, wherein the mesh material is fixedly mounted to the one or more support rods by at least one of threading, tension, or fasteners.

7. The gas-liquid contactor of claim 6, wherein the liquid distribution system includes one or more distribution facilitator devices configured to provide the $CO_2$ capture solution onto at least a portion of the mesh material.

8. The gas-liquid contactor of claim 7, wherein the one or more distribution facilitator devices comprise at least one of one or more liquid distribution rods or one or more liquid distribution spacers.

9. The gas-liquid contactor of claim 8, wherein the one or more liquid distribution rods comprise a plurality of grooves that are operable to flow the $CO_2$ capture solution.

10. The gas-liquid contactor of claim 8, wherein the one or more liquid distribution spacers are pressed against the one or more liquid distribution rods to form at a least a portion of a top basin.

11. The gas-liquid contactor of claim 1, wherein the one or more basins comprise:

at least one top basin positioned above the at least one panel;

at least one bottom basin positioned below the at least one panel; and wherein the liquid distribution system is configured to flow at least a portion of the $CO_2$ capture solution from the at least one bottom basin to the at least one top basin.

12. The gas-liquid contactor of claim 1, wherein a first subset of rods of the one or more support rods is being offset from a second subset of rods of the one or more support rods, the second subset of rods being spaced apart from the first subset of rods in a direction perpendicular to the first dimension and to the second dimension, the continuous sheet of mesh material being tensioned about the first subset of rods and about the second subset of rods, the plurality of mesh panel segments extending between spaced-apart rods of the first subset of rods and the second subset of rods.

13. The gas-liquid contactor of claim 12, wherein the first dimension decreases in a direction parallel to a distance between the first subset of rods and second subset of rods.

14. The gas-liquid contactor of claim 1, wherein the adjacent mesh panel segments of the plurality of mesh panel segments have a non-parallel orientation with respect to one another.

15. The gas-liquid contactor of claim 1, wherein the liquid distribution system further comprises one or more flow devices configured to flow the $CO_2$ capture solution over the at least one packing, the one or more flow devices comprising at least one of nozzles, atomized sprayers, or liquid distribution rods.

16. The gas-liquid contactor of claim 1, wherein:

the at least one packing comprises two packings that are spaced apart from one another laterally within the housing; and the gas moving device comprises a fan disposed laterally between the two packings and downstream thereof at the outlet, the fan being rotatable about an upright fan axis to draw the $CO_2$-laden gas from the dilute gas source through the two packings and to output a $CO_2$-lean gas through the outlet.

17. The gas-liquid contactor of claim 1, wherein the at least one panel has an upright orientation and includes a leading edge defined relative to a flow of the $CO_2$-laden gas, the leading edge being inclined in a direction of the flow of the $CO_2$-laden gas and defining an angle relative to a vertical axis.

18. The gas-liquid contactor of claim 1, wherein:

the gas-liquid contactor is a dual-cell, cross-flow air contactor; and the at least one packing comprises two packings spaced apart from one another laterally within the housing and defining the plenum.

19. The gas-liquid contactor of claim 1, wherein the at least one panel has an upright orientation, the first dimension and the second dimension being parallel to horizontal.

20. A gas-liquid contactor for capturing carbon dioxide ($CO_2$) from a dilute gas source, the gas-liquid contactor comprising:

a housing at least partially enclosing a plenum comprising an inlet and an outlet;

at least one packing supported in the housing downstream of the inlet, the at least one packing comprising:

at least one panel having an upright orientation and comprising a plurality of mesh panel segments, each mesh panel segment of the plurality of mesh panel segments comprises a mesh material extending from a first end to a second end of each of the plurality of mesh panel segments, the first end or the second end of each mesh panel segment being continuous with the first end or the second end of an adjacent mesh panel segment of the plurality of mesh panel segments to form a continuous sheet of mesh material; and at least one gas channel defined between adjacent mesh panel segments of the plurality of mesh panel segments, the at least one gas channel having a first dimension defined along a first direction between the adjacent mesh panel segments and a second dimension defined along a second direction different than the first direction, the first dimension and the second dimension being parallel to horizontal;

a liquid distribution system configured to wet the mesh material with a $CO_2$ capture solution, the liquid distribution system comprising one or more basins configured to hold the $CO_2$ capture solution received from the mesh material; and a gas moving device configured to flow a $CO_2$-laden gas from the dilute gas source through the at least one gas channel in the second direction to contact the $CO_2$-laden gas with the $CO_2$ capture solution on the wetted mesh material.

21. The gas-liquid contactor of claim 20, comprising a structural support supported by the housing and configured to support the at least one packing, the structural support comprising one or more support rods supporting the continuous sheet of mesh material and defining the first end or the second end of each mesh panel segment.

22. The gas-liquid contactor of claim 20, wherein:

the gas-liquid contactor is a dual-cell, cross-flow air contactor; and the at least one packing comprises two packings spaced apart from one another laterally within the housing and defining the plenum.

23. The gas-liquid contactor of claim 20, wherein:

the at least one packing comprises two packings that are spaced apart from one another laterally within the housing; and the gas moving device comprises a fan disposed laterally between the two packings and downstream thereof at the outlet, the fan being rotatable about an upright fan axis to draw the $CO_2$-laden gas from the dilute gas source through the two packings and to output a $CO_2$-lean gas through the outlet.

24. The gas-liquid contactor of claim 20, comprising a drift eliminator coupled to the housing and positioned downstream of the at least one packing.

25. The gas-liquid contactor of claim 24, wherein the gas moving device is a fan disposed downstream of the at least one packing at the outlet, the fan being rotatable about a fan axis to draw the $CO_2$-laden gas into the inlet and through the at least one gas channel in the second direction.

26. The gas-liquid contactor of claim 20, wherein the liquid distribution system is configured to flow the $CO_2$ capture solution at a solution flow rate ranging from 1L/min to 4 L/min.

27. The gas-liquid contactor of claim 20, comprising a structural support supported by the housing and configured to support the at least one packing, the structural support comprising one or more support rods mounted on one or more support beams.

28. The gas-liquid contactor of claim 27, wherein the mesh material is fixedly mounted to the one or more support rods by at least one of threading, tension, or fasteners.

29. The gas-liquid contactor of claim 28, wherein the liquid distribution system includes one or more distribution facilitator devices configured to provide the $CO_2$ capture solution onto at least a portion of the mesh material.

30. The gas-liquid contactor of claim 29, wherein the one or more distribution facilitator devices comprise at least one of one or more liquid distribution rods or one or more liquid distribution spacers.

31. The gas-liquid contactor of claim 30, wherein the one or more liquid distribution rods comprise a plurality of grooves that are operable to flow the $CO_2$ capture solution.

32. The gas-liquid contactor of claim 31, wherein the one or more liquid distribution spacers are pressed against the one or more liquid distribution rods to form at a least a portion of a top basin.

33. The gas-liquid contactor of claim 20, wherein the one or more basins comprise:

at least one top basin positioned above the at least one panel;

at least one bottom basin positioned below the at least one panel; and wherein the liquid distribution system is configured to flow at least a portion of the $CO_2$ capture solution from the at least one bottom basin to the at least one top basin.

34. The gas-liquid contactor of claim 20, comprising a structural support supported by the housing and configured to support the at least one packing, the structural support comprising one or more support rods, a first subset of rods of the one or more support rods being offset from a second subset of rods of the one or more support rods, the second subset of rods being spaced apart from the first subset of rods in a direction perpendicular to the first dimension and to the second dimension, the continuous sheet of mesh material being tensioned about the first subset of rods and about the second subset of rods, the plurality of mesh panel segments extending between spaced-apart rods of the first subset of rods and the second subset of rods.

35. The gas-liquid contactor of claim 34, wherein the first dimension decreases in a direction parallel to a distance between the first subset of rods and second subset of rods.

36. The gas-liquid contactor of claim 20, wherein the adjacent mesh panel segments of the plurality of mesh panel segments have a non-parallel orientation with respect to one another.

37. The gas-liquid contactor of claim 20, wherein the liquid distribution system comprises one or more flow devices configured to flow the $CO_2$ capture solution over the at least one packing, the one or more flow devices comprising at least one of nozzles, atomized sprayers, or liquid distribution rods.

38. The gas-liquid contactor of claim 20, wherein each mesh panel segment defines a planar surface, the planar surfaces of the adjacent mesh panel segments being parallel with one another.

39. The gas-liquid contactor of claim 20, wherein at least one mesh panel segment of the adjacent mesh panel segments includes a plurality of planar portions and a plurality of protruding portions, the plurality of protruding portions extending outwardly from the planar portions in the first direction and into the at least one gas channel.

40. The gas-liquid contactor of claim 20, wherein:

the plurality of mesh panel segments are spaced apart from each other in the first direction, the plurality of mesh panel segments defining a plurality of gas channels between the adjacent mesh panel segments;

at least a first gas channel of the plurality of gas channels is defined by the first dimension and comprises a first width; and at least another gas channel of the plurality of gas channels is defined by the first dimension and comprises a second width different from the first width.

41. The gas-liquid contactor of claim 20, wherein the mesh material comprises a plurality of fibers defining a plurality of mesh pores, the mesh material configured to be wetted by the $CO_2$ capture solution to cause the $CO_2$ capture solution to bridge across at least a portion of mesh pores of the plurality of mesh pores of the wetted mesh material and define a gas-liquid interface.

42. The gas-liquid contactor of claim 20, wherein the second dimension is less than three orders of magnitude greater than the first dimension.

* * * * *